(12) United States Patent
Pausch

(10) Patent No.: US 7,883,110 B2
(45) Date of Patent: Feb. 8, 2011

(54) AIRBAG AND AIRBAG APPARATUS

(75) Inventor: Tobias Pausch, Tokyo (JP)

(73) Assignee: Takata Corporation, Tokyo (JP)

( * ) Notice: Subject to any disclaimer, the term of this patent is extended or adjusted under 35 U.S.C. 154(b) by 138 days.

(21) Appl. No.: 12/320,680

(22) Filed: Feb. 2, 2009

(65) Prior Publication Data

US 2010/0019476 A1    Jan. 28, 2010

(30) Foreign Application Priority Data

Jul. 23, 2008    (JP) .............................. 2008-189977

(51) Int. Cl.
B60R 21/276    (2006.01)
(52) U.S. Cl. .................................... 280/739; 280/743.2
(58) Field of Classification Search ................. 280/742, 280/739, 743.2
See application file for complete search history.

(56) References Cited

U.S. PATENT DOCUMENTS

| | | | |
|---|---|---|---|
| 6,773,030 B2 * | 8/2004 | Fischer ....................... | 280/739 |
| 6,962,366 B2 * | 11/2005 | Fukuda et al. ........... | 280/743.1 |
| 7,059,634 B2 * | 6/2006 | Bossecker et al. .......... | 280/739 |
| 7,328,915 B2 * | 2/2008 | Smith et al. ................. | 280/739 |
| 7,347,450 B2 * | 3/2008 | Williams et al. ............ | 280/739 |
| 7,441,802 B2 * | 10/2008 | Yamaji et al. ............... | 280/739 |
| 7,445,237 B2 * | 11/2008 | Boyle et al. ................. | 280/739 |
| 7,628,422 B2 * | 12/2009 | Fukawatase et al. ........ | 280/739 |
| 2004/0012179 A1 * | 1/2004 | Pinsenschaum et al. ..... | 280/739 |
| 2005/0248137 A1 | 11/2005 | Delventhal et al. | |
| 2006/0071462 A1 * | 4/2006 | Smith et al. ................. | 280/739 |
| 2006/0151979 A1 | 7/2006 | DePottey et al. | |
| 2007/0045997 A1 * | 3/2007 | Abe et al. .................... | 280/729 |

FOREIGN PATENT DOCUMENTS

| | | |
|---|---|---|
| EP | 1757495 A1 | 2/2007 |
| EP | 2019002 A1 | 1/2009 |
| JP | 6-127330 | 5/1994 |
| JP | 2007-099104 A | 4/2007 |
| JP | 2007-216943 A | 8/2007 |
| WO | WO 2006/041547 A2 | 4/2006 |
| WO | WO 2006/041552 A2 | 4/2006 |
| WO | WO 2008/136336 A1 | 11/2008 |

OTHER PUBLICATIONS

European Search Report mailing date of Nov. 11, 2009 for European Application No. 09002341.

* cited by examiner

*Primary Examiner*—Paul N Dickson
*Assistant Examiner*—Timothy D Wilhelm
(74) *Attorney, Agent, or Firm*—Foley & Lardner LLP

(57) ABSTRACT

An airbag includes a vent and a gas discharge limitation member to limit gas discharged from the vent. The limitation member includes at least one invertible portion on a surface on a side opposite the occupant-facing surface of the airbag and capable everting toward the outside of the airbag. The limitation member includes an interlocking member for interlocking movement of the occupant-facing surface in an occupant direction and an opposite direction and for interlocking movement of the invertible portion inward of the airbag and outward of the airbag when expanded. The limitation member includes a lid covering the vent and being pulled by the invertible portion when the invertible portion everts towards the outside of the airbag. The lid closes the vent or opens the vent by a small amount until the lid member is pulled by the invertible portion and opens the vent by at least a large amount.

11 Claims, 38 Drawing Sheets

FIG. 33
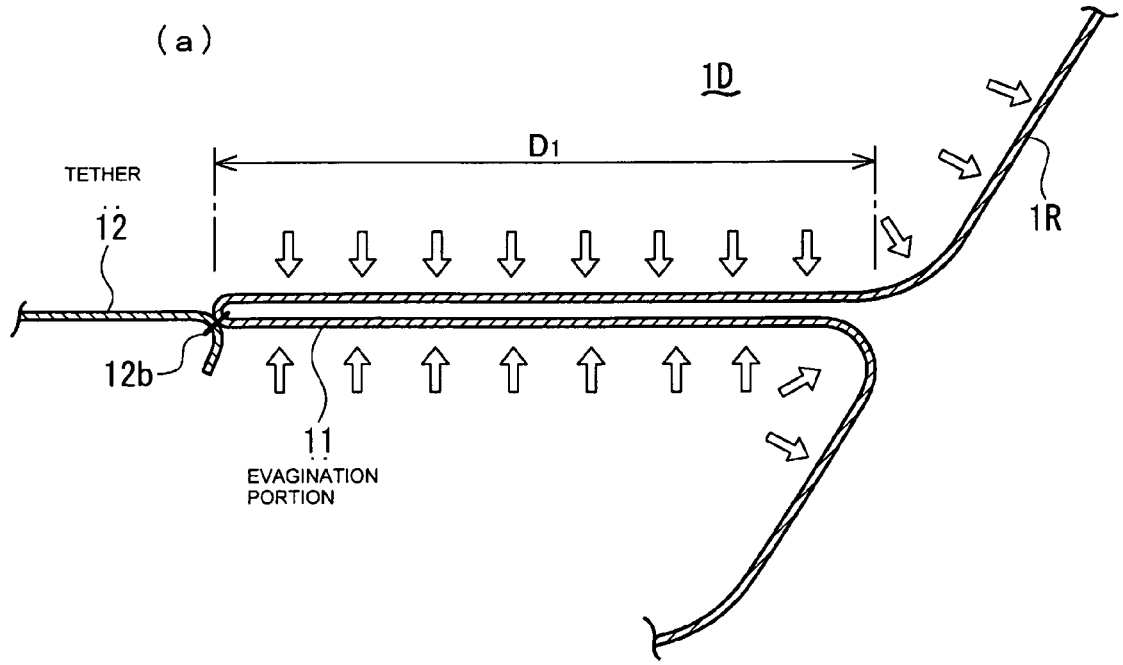
(a)
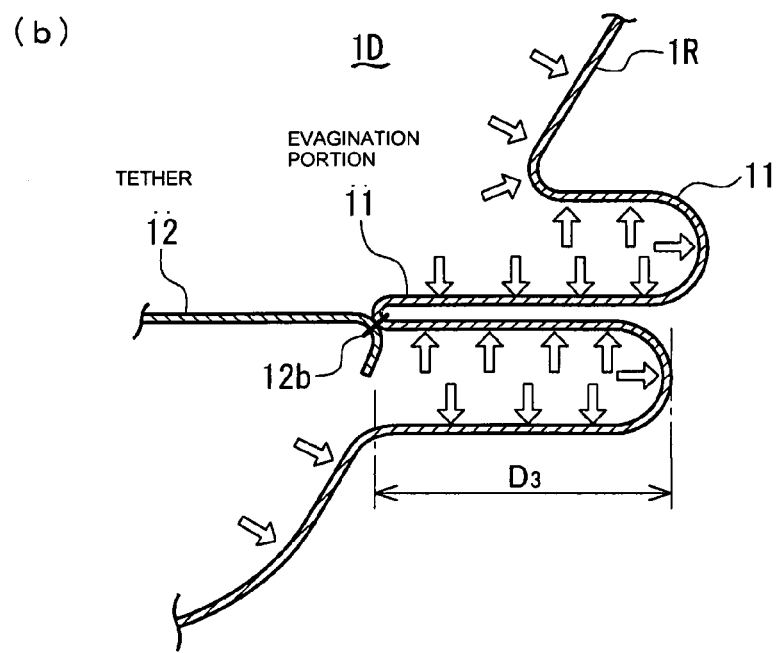
(b)

FIG. 38
(a)
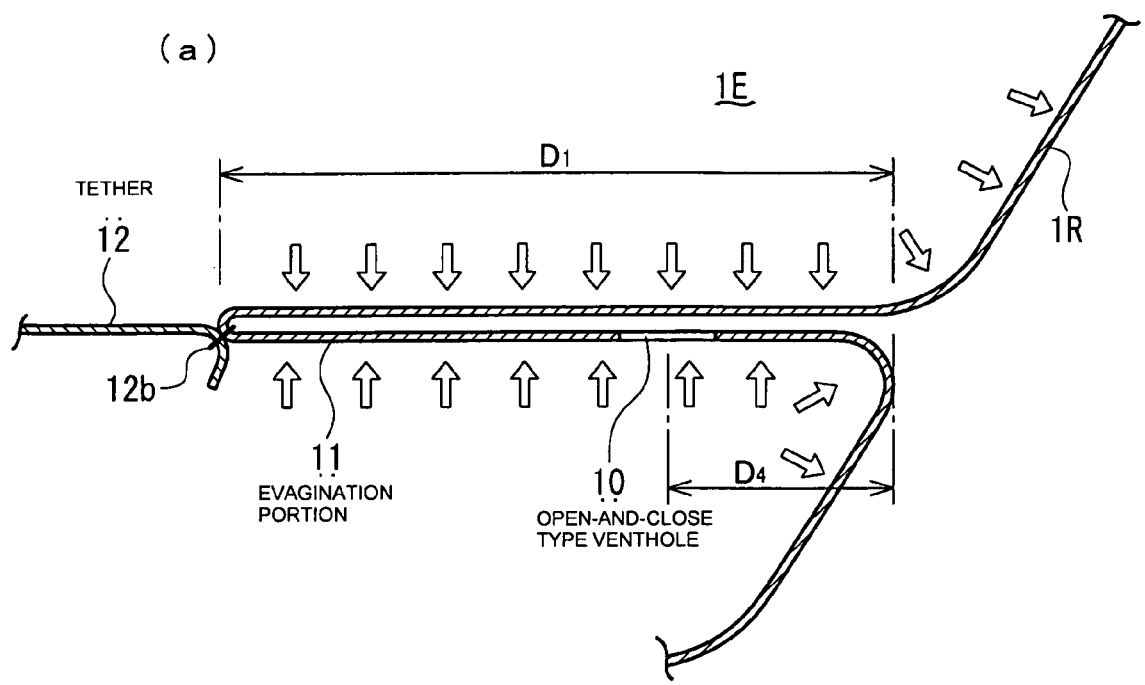
(b)
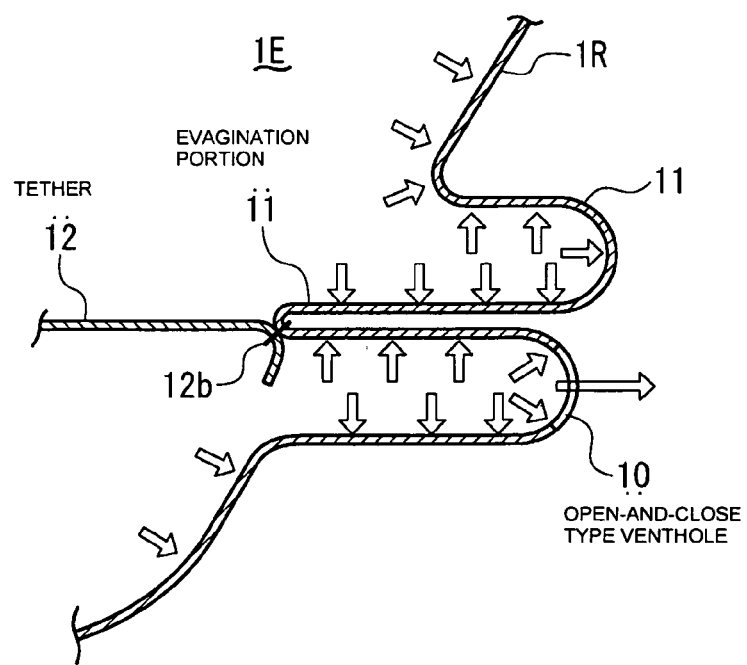

AIRBAG AND AIRBAG APPARATUS

BACKGROUND

The present disclosure relates to an airbag provided with an open-and-close type vent and a member for limiting a discharge of the gas from the vent. More specifically, it relates to an airbag constructed in such away that the vent is closed or opened by a small amount until an occupant is brought into contact with an occupant-facing surface of the expanded airbag, and the vent is opened or opened by a large amount when the expanded airbag is compressed by the occupant contacting the airbag. Further, the present invention relates to an airbag apparatus provided with the airbag.

SUMMARY

One embodiment of the disclosure relates to an airbag including an open-and-close type vent and a gas discharge limitation member configured to limit a gas discharged from the vent. The airbag is constructed in such a way that when the airbag is expanded the gas discharge limitation member closes the vent or opens the vent by a small amount when an occupant is not in contact with an occupant-facing surface of the airbag and when the occupant is brought into contact with the occupant-facing surface of the expanded airbag. The occupant-facing surface retreats in an opposite-to-occupant direction. The gas discharge limitation member opens the vent by at least a large amount and discharges the gas from the airbag through the vent. The gas discharge limitation member includes at least one invertible portion provided in a surface on a side opposite to the occupant-facing surface of the airbag or a side surface of the airbag when the airbag is expanded and capable of being everted toward the outside of the airbag. The gas discharge limitation member also includes an interlocking member for interlocking a moving operation of the occupant-facing surface in an occupant direction and an opposite-to-occupant direction and for interlocking a moving operation of the invertible portion inwardly of the airbag and outwardly of the airbag when the airbag is expanded. The gas discharge limitation member also includes a lid member covering the vent and capable of being pulled by the invertible portion when the invertible portion is everted towards the outside of the airbag. The lid member is constructed to close the vent or open the vent by a small amount until the lid member is pulled by the invertible portion and is constructed to open the vent by at least a large amount by pulling the lid member with the invertible portion.

Another embodiment of the disclosure relates to an airbag including an open-and-close type vent and a gas discharge limitation member for limiting a gas to be discharged from the vent. The airbag is constructed in such a way that when the airbag is expanded the gas discharge limitation member closes the vent or opens the vent by a small amount when an occupant is not in contact with an occupant-facing surface of the airbag. When the occupant is brought into contact with the occupant-facing surface of the expanded airbag and the occupant-facing surface is retreated toward an opposite-to-occupant direction, the gas discharge limitation member opens the vent by at least a large amount and discharges the gas outside the airbag through the vent. The gas discharge limitation member includes at least one invertible portion provided in a surface on a side opposite to the occupant-facing surface of the airbag or a side surface of the airbag when the airbag is expanded and capable of being everted outside of the airbag. The gas discharge limitation member also includes an interlocking member for interlocking a moving operation of the occupant-facing surface in the occupant direction and the opposite-to-occupant direction and for interlocking a moving operation of the invertible portion inwardly of the airbag and outwardly of the airbag when the airbag is expanded. At least one vent is provided in the invertible portion. The vent is constructed to discharge the gas in the airbag outside the airbag while passing through an inside of the invertible portion. When the airbag is expanded and when the occupant is not in contact with the occupant-facing surface, the invertible portion is disposed in an inside of the airbag and thereby the vent is closed or opened by a small amount. When the occupant is brought into contact with the occupant-facing surface of the expanded airbag and thereby the occupant-facing surface is retreated toward the opposite-to-occupant direction, the invertible portion is everted outside the airbag in conjunction with the moving operation of the occupant-facing surface and the vent is thereby exposed to an outside of the airbag and the vent is opened by at least a large amount.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 33($a$) and FIG. 33($b$) are enlarged views illustrating a part XXXIIIA of FIG. 31 and a part XXXIIIB of FIG. 32, respectively.

FIG. 38($a$) and FIG. 38($b$) are enlarged views illustrating a part XXXVIIIA of FIG. 35 and a part XXXVIIIB of FIG. 37, respectively.

DETAILED DESCRIPTION

Figure 1:
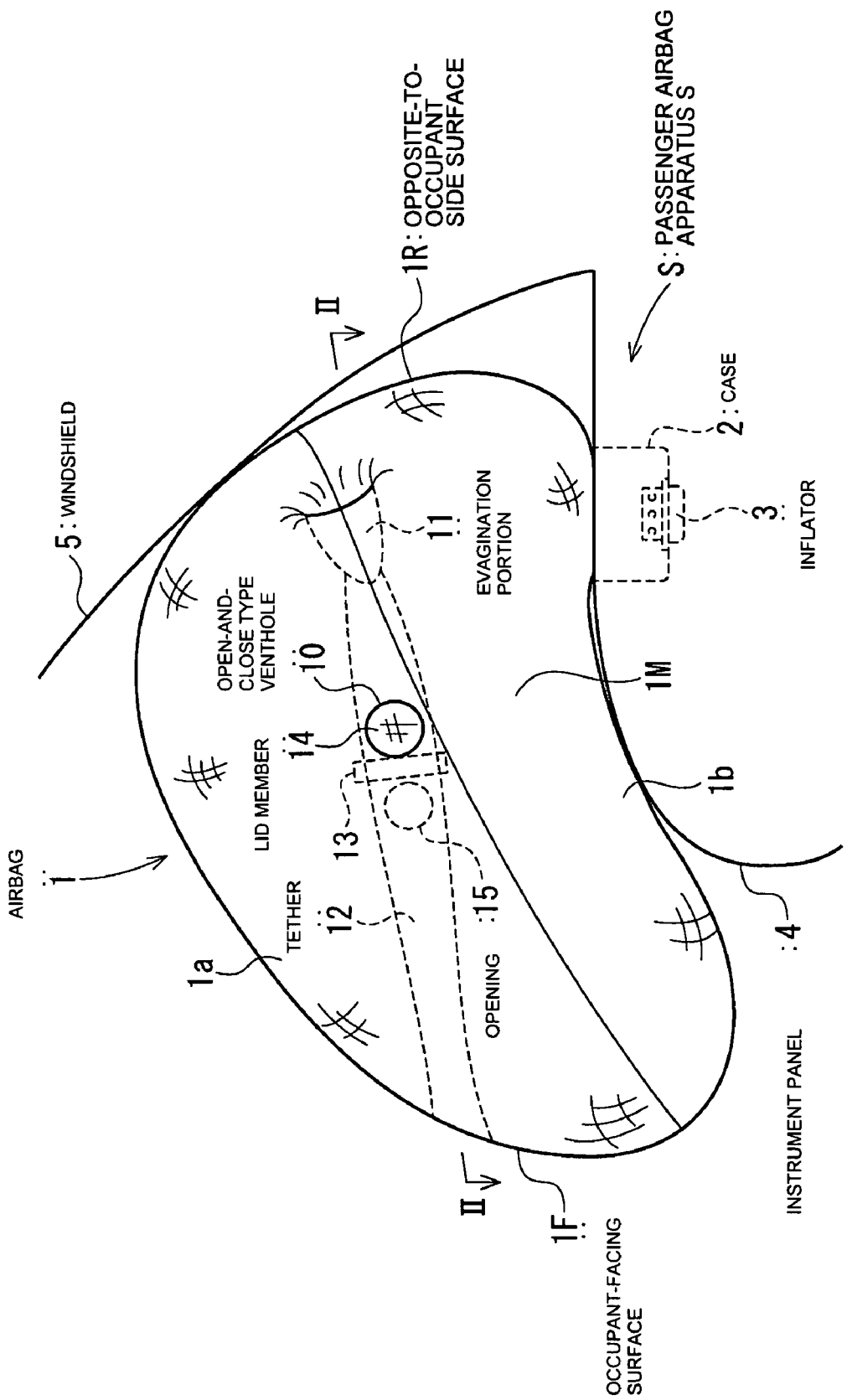
FIG. 1 is a side elevation illustrating an airbag and an airbag apparatus according to an embodiment.

Generally, an occupant-direction refers to a direction where the occupant-facing surface of the airbag is directed to the occupant when the airbag is expanded, and an opposite-to-occupant direction refers to a direction opposite thereto. In the following description, a direction towards the rear of the vehicle (e.g., backwards) will generally refer to the occupant-direction.

According to an exemplary embodiment, the airbag may be similar to the airbag described in Japanese Unexamined Patent Application Publication No. 6-127330, which is herein incorporated by reference in its entirety. The airbag is constructed in such a way that a vent is closed until an occupant is brought into contact with an occupant-facing surface of the expanded airbag, and the vent is opened when the occupant-facing surface is retreated by the occupant that is brought into contact with occupant-facing surface of the expanded airbag.

The airbag is formed into a bag-shape by stitching each of peripheral edge portions of an upper side base cloth and a lower side base cloth, which are respectively formed to have an approximately round shape. In the same publication, the upper base cloth constitutes the occupant-facing surface of the airbag. At a center of the lower side base cloth, a gas-flowing inlet where an inflator (gas generator) is inserted is provided. On an outer peripheral side of the lower side base cloth relative to the gas-flowing inlet, a vent is disposed.

In the lower side base cloth, a slit is provided in an area between the vent and the gas-flowing inlet, and a strap is inserted into the slit. One end of the strap disposed on the inside of the airbag is stitched to an airbag-inside surface of the upper side base cloth. Further, the other end of the strap disposed on an outside of the airbag is pulled around an outer peripheral side of the lower side base cloth to pass transversely across the vent from the slit, and is stitched onto the outer peripheral side of the lower side base cloth relative to the vent.

When the airbag is expanded, the strap gets tensed along the upper side base cloth and the lower side base cloth of the airbag that are separating from each other. At this moment, the aforementioned other end of the strap gets tensed along an outside surface of the airbag of the lower side base cloth, and is overlapped with the vent, and thereby the vent is closed. As a result, the gas from the vent is limited to be discharged, and pressure in the inside of the airbag rapidly becomes to high pressure. Consequently, the airbag is rapidly inflated.

When the occupant is brought into contact with the upper side base cloth of the expanded airbag and retreats the upper side base cloth toward the inside of the airbag, the strap is loosened and the aforementioned other end of the strap is separated from the vent by gas pressure in the inside of the airbag. Thereby, the vent is opened and the gas is discharged from the vent toward the outside of the airbag. As a result, the occupant is softly received by the airbag.

In a case that the occupant is brought into contact with the upper side base cloth of the expanded airbag, and the upper side base cloth is retreated toward the inside of the airbag, and the strap is thereby loosened, the aforementioned other end side of the strap is separated from the vent by the discharging gas pressure from the inside of the airbag toward the outside of the airbag while passing through the vent, and the vent is opened.

However, the gas discharged outside the airbag through the vent may be immediately circumferentially diffused and therefore, the farther the strap is separated from the vent, the smaller the discharging gas pressure applied to the strap becomes. Accordingly, there is a possibility that the strap is not sufficiently separated from the vent and an opening amount of the vent becomes to be insufficient.

It may be advantageous to provide an airbag capable of assuredly opening a vent by a predetermined opening amount in such a way that the vent is closed or opened by a small amount until an occupant is brought into contact with an occupant-facing surface of the airbag when expanded, and that the vent is opened or opened by a large amount when the occupant contacts the airbag.

According to an exemplary embodiment, an airbag includes an open-and-close type vent and a gas discharge limitation member configured to limit a gas discharged from the vent. The airbag is constructed in such a way that when the airbag is expanded the gas discharge limitation member closes the vent or opens the vent by a small amount when an occupant is not in contact with an occupant-facing surface of the airbag and when the occupant is brought into contact with the occupant-facing surface of the expanded airbag. The occupant-facing surface retreats in an opposite-to-occupant direction. The gas discharge limitation member opens the vent by at least a large amount and discharging the gas from the airbag through the vent. The gas discharge limitation member includes at least one invertible portion provided in a surface on a side opposite to the occupant-facing surface of the airbag or a side surface of the airbag when the airbag is expanded and capable of being everted toward the outside of the airbag. The gas discharge limitation member also includes an interlocking member for interlocking a moving operation of the occupant-facing surface in an occupant direction and an opposite-to-occupant direction and for interlocking a moving operation of the invertible portion inwardly of the airbag and outwardly of the airbag when the airbag is expanded. The gas discharge limitation member also includes a lid member covering the vent and capable of being pulled by the invertible portion when the invertible portion is everted towards the outside of the airbag. The lid member is constructed to close the vent or open the vent by a small amount until the lid member is pulled by the invertible portion and is constructed to open the vent by at least a large amount by pulling the lid member with the invertible portion.

According to an exemplary embodiment, in a state that an approximately entire invertible portion is everted outside the airbag, a length in an everting direction of the invertible portion is formed to be larger than a moving distance where the lid member moves from a position at which the lid member closes the vent or opens the vent by a small amount to a position at which the lid member opens by at least a large amount.

According to an exemplary embodiment, in the state that the approximately entire invertible portion is everted outside the airbag, the length in the everting direction of the invertible portion is formed to be larger than the moving distance where the lid member moves from the position at which the lid member closes the vent or opens the vent by the small amount to the position at which the lid member opens the vent by an amount between about 10 mm and about 300 mm.

According to an exemplary embodiment, the interlocking member includes a tether for connecting the occupant-facing surface and a tip end side in the everting direction of the invertible portion.

According to an exemplary embodiment, the lid member is integrally constructed with the tether. According to another exemplary embodiment, the lid member includes a halfway portion of the tether in a longitudinal direction that is overlapped with the vent. According to another exemplary embodiment, the lid member is coupled with a halfway portion of the tether in the longitudinal direction. According to another exemplary embodiment, the lid member is coupled with a tip end side of the invertible portion via a coupling portion.

According to an exemplary embodiment, an opening on a rear end side of the lid member in the moving direction overlaps the vent when the lid member is pulled by the invertible portion. According to another exemplary embodiment, there are a plurality of openings that displace respective positions in the moving direction of the lid member.

According to an exemplary embodiment, the lid member is combined with the airbag to releasably cover the vent. The combination is released when the lid member is pulled by the invertible portion with at least a predetermined tension force.

According to an exemplary embodiment, an airbag apparatus includes the airbag and an inflator for expanding the airbag.

Another embodiment of the disclosure relates to an airbag including an open-and-close type vent and a gas discharge limitation member for limiting a gas to be discharged from the vent. The airbag is constructed in such a way that when the airbag is expanded the gas discharge limitation member closes the vent or opens the vent by a small amount when an occupant is not in contact with an occupant-facing surface of the airbag. When the occupant is brought into contact with the occupant-facing surface of the expanded airbag and the occupant-facing surface is retreated toward an opposite-to-occupant direction, the gas discharge limitation member opens the vent by at least a large amount and discharges the gas outside the airbag through the vent. The gas discharge limitation member includes at least one invertible portion provided in a surface on a side opposite to the occupant-facing surface of the airbag or a side surface of the airbag when the airbag is expanded and capable of being everted outside of the airbag. The gas discharge limitation member also includes an interlocking member for interlocking a moving operation of the occupant-facing surface in the occupant direction and the opposite-to-occupant direction and for interlocking a moving operation of the invertible portion inwardly of the airbag and outwardly of the airbag when the airbag is expanded. At least one vent is provided in the invertible portion. The vent is constructed to discharge the gas in the airbag outside the airbag while passing through an inside of the invertible portion. When the airbag is expanded and when the occupant is not in contact with the occupant-facing surface, the invertible portion is disposed in an inside of the airbag and thereby the vent is closed or opened by a small amount. When the occupant is brought into contact with the occupant-facing surface of the expanded airbag and thereby the occupant-facing surface is retreated toward the opposite-to-occupant direction, the invertible portion is everted outside the airbag in conjunction with the moving operation of the occupant-facing surface and the vent is thereby exposed to an outside of the airbag and the vent is opened by at least a large amount.

According to an exemplary embodiment, the vent is provided at a halfway portion in an everting direction of the invertible portion. According to another exemplary embodiment, in a state that the approximately entire invertible portion is everted outside the airbag, the vent is disposed at a position spaced apart from a base end side in the everting direction of the invertible portion by about 5% to about 90% of the length in the everting direction of the invertible portion.

According to an exemplary embodiment, the interlocking member includes a tether for connecting the occupant-facing surface and a tip end side in the everting direction of the invertible portion.

According to an exemplary embodiment, an airbag apparatus includes the airbag and an inflator for expanding the airbag.

According to an exemplary embodiment, when the airbag is expanded, the invertible portion moves toward the inside of the airbag in conjunction with the rear surface of the airbag moving toward the occupant. Therefore, the lid member is not moved by being pulled by the invertible portion, and the vent is generally closed or opened by only a small amount by the lid member. Thereby, vent generally restricts the discharge of the gas, and the airbag is rapidly expanded.

When the occupant contacts the rear surface of the expanded airbag, and the rear surface is pushed forward (e.g., toward the front of the vehicle), the invertible portion is turned out toward the outside of the airbag in conjunction with the movement of the rear surface. Thereby, the lid member pulled by the invertible portion, and the vent is at least partially opened, allowing gas to be discharged from the vent toward the outside of the airbag to more softly receive the occupant.

As the airbag cushion receives the occupant, a gas pressure generally equal to that of the inner pressure of the airbag is constantly applied to the invertible portion, pushing it to an inside-out position (e.g., toward the outside of the airbag). Therefore, since the lid member is strongly pulled by the invertible portion with comparable force as that of the inner pressure of the airbag, the lid member is moved to the predetermined position, and thereby the vent is opened by the predetermined opening amount.

In the state that the approximately entire invertible portion is turned outside the airbag, it is preferable that the length of the invertible portion (e.g., in the length along the lid member or tether) is formed to be larger than the moving distance of the lid member (e.g., the distance the lid member is moved from the position at which the vent is substantially closed, to the position at which the vent is substantially open). According to an exemplary embodiment, in the state that the approximately entire invertible portion is turned outside the airbag, the length of the invertible portion is formed to be larger than the moving distance of the lid member by about 10 mm to about 300 mm, and more preferably, by about 40 mm to about 200 mm.

Therefore, even when the occupant contacts and presses in on the rear surface of the expanded airbag, and the lid member is pulled and moved by the invertible portion until the vent is at least partially opened, the invertible portion is not completely turned out and does not completely extend outside the airbag such that the tip end side of the invertible portion is still positioned in the inside of the airbag or in the inside of the base end side of the invertible portion. According to one exemplary embodiment, the tip end side of the invertible portion remains in the inside of the airbag or in the inside of the base end side of the invertible portion across a length of, from about 5 mm to about 150 mm, and preferably, from about 20 mm to about 100 mm. Thereby, since a force remains acting on the invertible portion to further extend it outside the airbag even after the vent is opened, the lid member continues to be pulled, holding the vent in an open position.

The tether may connect the rear surface to the tip end of the invertible portion to provide a simply constructed member to interlock the moving operation of the rear surface and the invertible portion. Forming the lid member and the tether as a single body may reduce the number of components constituting the airbag and simplifies the manufacture of the airbag.

The halfway portion in the longitudinal direction of the tether may be overlapped with the vent, and by constructing the halfway portion to serve as the lid member, the construction of the airbag can be simplified.

The lid member may be coupled with the tether and be moved by the invertible portion via the tether. The lid member may be coupled with the tip end side of the invertible portion via the coupling portion.

When the lid member is moved by being pulled by the invertible portion, the opening provided at the rear end side in the moving direction of the lid member may be overlapped with the vent, and the gas is brought to be discharged outside the airbag while passing through the opening and the vent.

A plurality of openings may be provided for the vent on the airbag cushion and the lid member. The opening amount of the vent can be varied by the controlled movement of the lid member to displace the respective positions of the openings.

The vent can be closed or opened by a small amount at the initial expansion of the airbag because the lid member and the airbag cooperate to cover the vent until the lid member is pulled by the invertible portion with the predetermined tension force or more.

When the airbag is being expanded, the invertible portion can be moved toward the inside of the airbag as the rear surface of the airbag moves toward the occupant. The invertible portion is disposed in the airbag. During the initial expansion of the airbag, the vent is closed or opened by only a small amount. When the occupant contacts the rear surface of the expanded airbag and pushes the rear surface toward the front of the vehicle, the invertible portion is turned out toward the outside of the airbag in conjunction with the moving operation of the occupant-facing surface. The movement of the rear surface and the invertible portion exposes the vent to the outside of the airbag. Thereby, the vent is opened or opened by a large amount, and the gas is discharged from the vent toward the outside of the airbag. The discharging of the vent allows the airbag to more softly receive the occupant.

As the airbag cushion receives the occupant, a gas pressure generally equal to that of the inner pressure of the airbag can be constantly applied to the invertible portion, pushing it to an inside-out position (e.g., toward the outside of the airbag). Therefore, since the lid member is strongly pulled by the invertible portion with comparable force as that of the inner pressure of the airbag, the lid member is moved to the predetermined position, and thereby the vent is opened by the predetermined opening amount.

According to an exemplary embodiment, it is preferable that the vent be provided at a halfway portion in the everting direction of the invertible portion. In the state that the entire invertible portion is everted outside the airbag, it is preferable that the vent is disposed at a position spaced apart from the base end side in the everting direction of the invertible portion by about 5% to about 90%, and more preferably, by about 20% to about 50% of the length in the everting direction of the invertible portion.

Even when the occupant is brought into contact with the occupant-facing surface of the expanded airbag, the occupant-facing surface is retreated toward the opposite-to-occupant direction, and the invertible portion is everted outside the airbag until the vent is exposed to the outside of the airbag, the invertible portion may not be completely everted outside the airbag and the tip end side of the airbag may still be positioned in the inside of the airbag or in the inside of the base end side of the invertible portion. Even after the invertible portion is everted outside the airbag until the vent is exposed to the outside of the airbag, the invertible portion may continue to try to be further everted outside the airbag, and thereby the vent is held in the state where the vent is assuredly exposed to the outside of the airbag.

Providing a tether that connects the rear surface to the tip end of the invertible portion may provide a simply constructed member to interlock the moving operation of the rear surface and the invertible portion.

Hereinbelow, various exemplary embodiments of the present invention will be explained with reference to the drawings. In the below explanation, a left and right direction is a vehicle width direction and is in conformity with a left and right relative to an occupant seated in a passenger seat.

Figure 2:
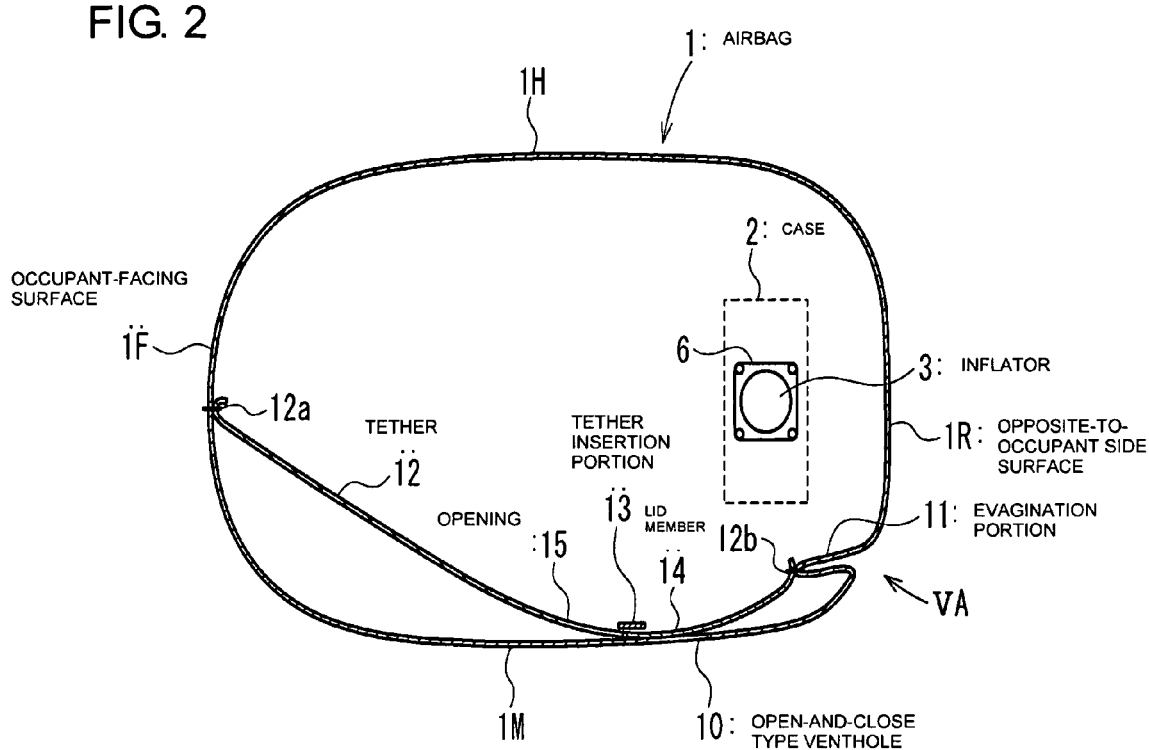
FIG. 2 is a cross-sectional view taken along a line II-II in FIG. 1.
Figure 3:
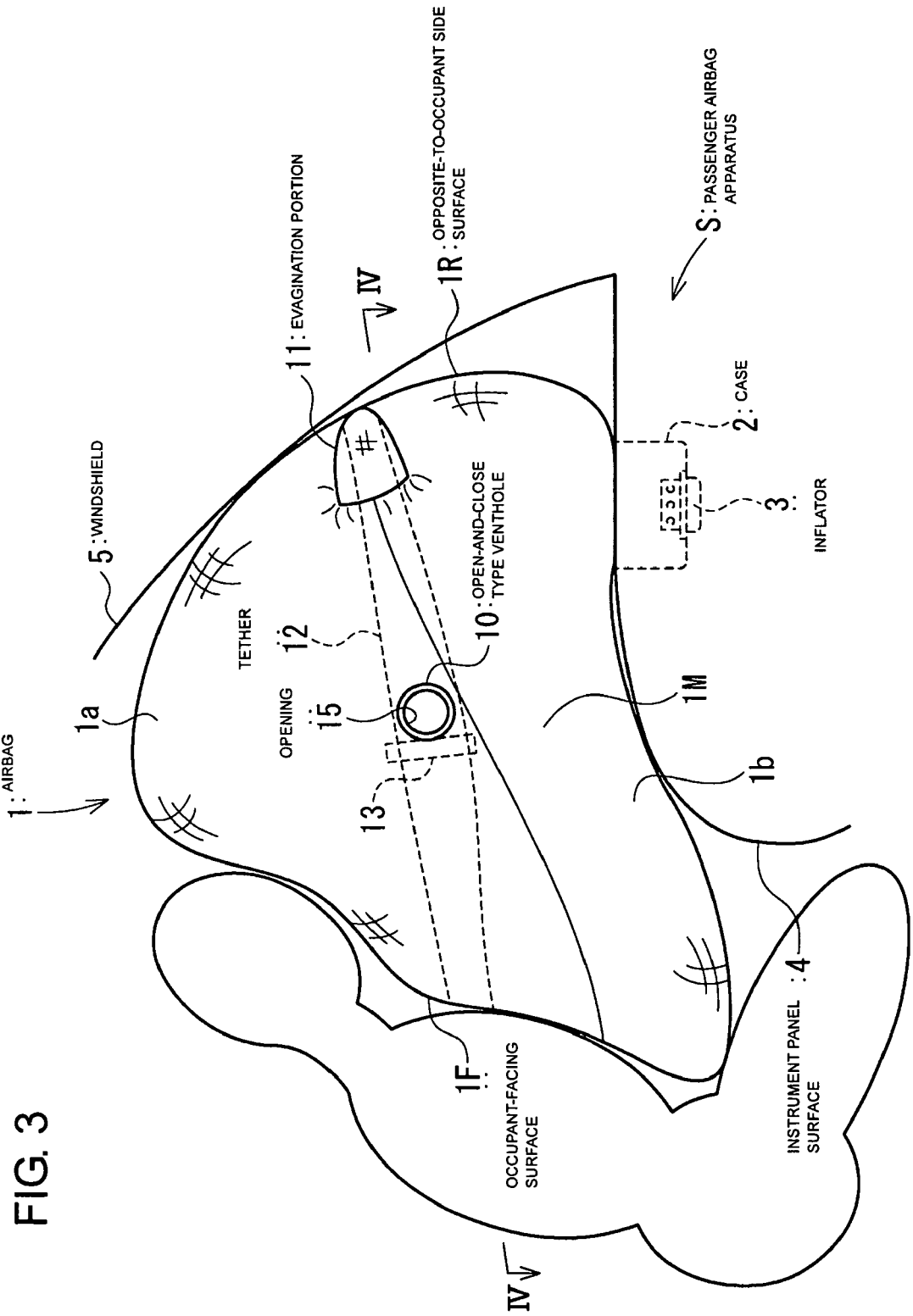
FIG. 3 is a side elevation illustrating the airbag and the airbag apparatus of FIG. 1.
Figure 4:
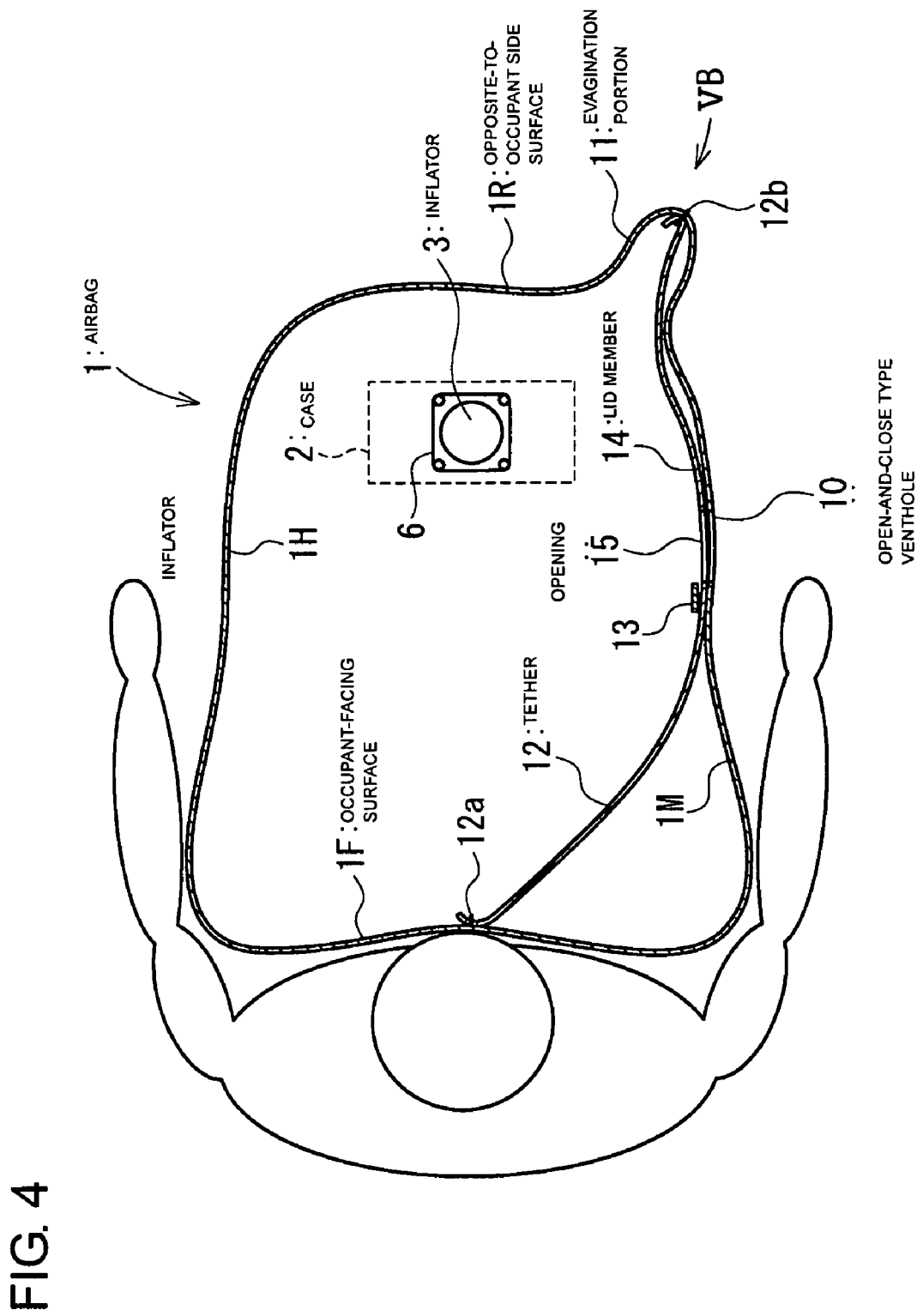
FIG. 4 is a cross-sectional view taken along a line IV-IV in FIG. 3.
Figure 5:
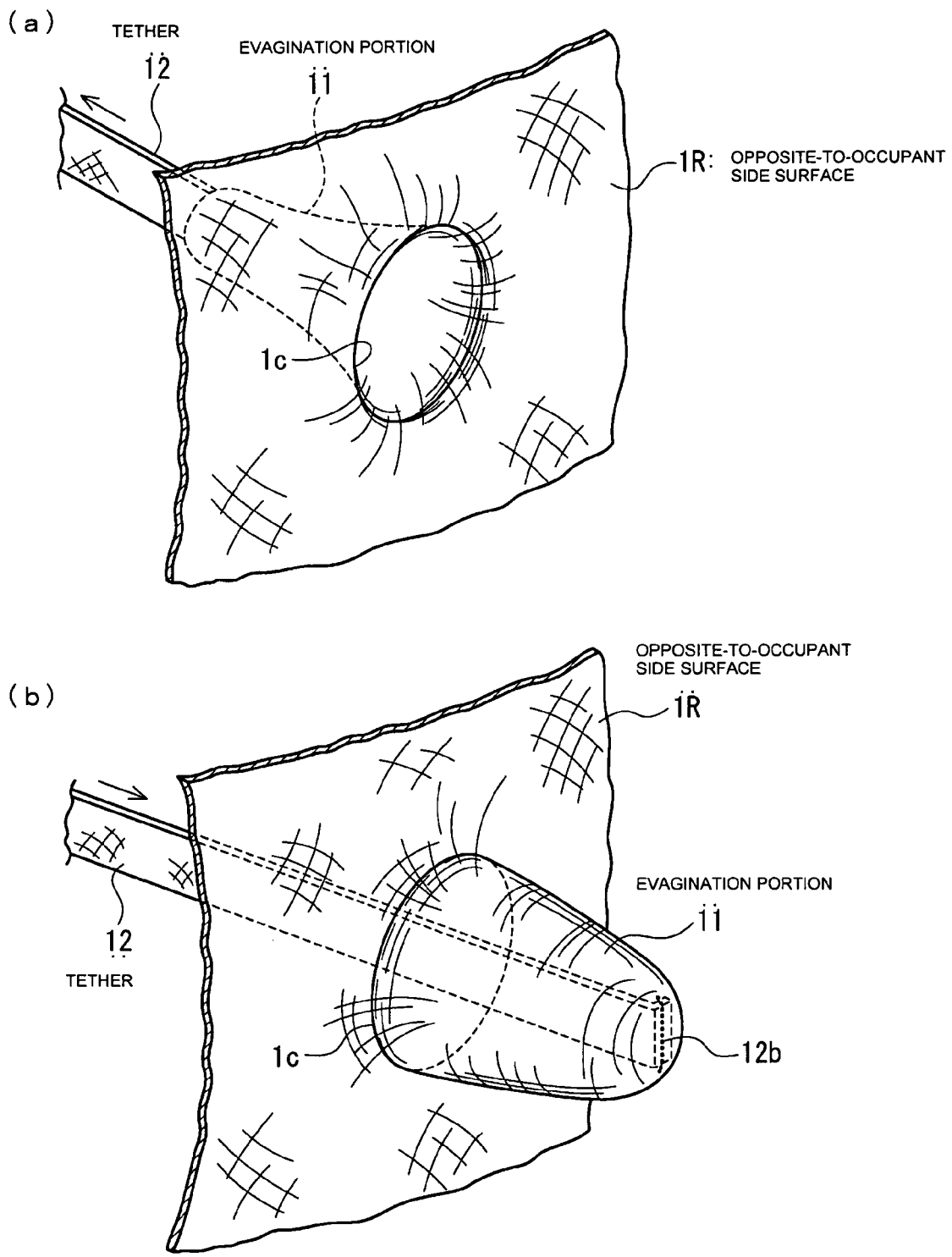
FIG. 5(*a*) and FIG. 5(*b*) are perspective views illustrating a part VA in FIG. 2 and a part VB in FIG. 4, respectively.

FIG. 1 is a side elevation illustrating an airbag and an airbag apparatus according to an exemplary embodiment. FIG. 2 is a cross-sectional view (approximately horizontal cross-sectional view) taken along a line II-II in FIG. 1. FIGS. 1 and 2 illustrate a state before the occupant is brought into contact with the expanded airbag. FIG. 3 is a side elevation illustrating the airbag and the airbag apparatus of FIG. 1. FIG. 4 is a cross-sectional view (approximately horizontal cross-sectional view) taken along a line IV-IV in FIG. 3, and FIG. 5(a) and FIG. 5(b) are perspective views illustrating a part VA in FIG. 2 and a part VB in FIG. 4 (in the vicinity of the invertible or evagination portion), respectively. FIGS. 3 and 4 illustrate a state after the occupant is brought into contact with the expanded airbag. FIG. 5(a) illustrates a state in which the invertible portion is pulled into the airbag, and FIG. 5(b) illustrates a state in which the invertible portion is turned outside the airbag.

According to an exemplary embodiment, an airbag 1 refers to a passenger airbag of a vehicle. A passenger airbag apparatus S is provided with the airbag 1, a case 2, an inflator 3, or the like. The airbag 1 is housed in the case 2 upon being folded back, and is expanded by the inflator 3. The case 2 is a container whose upper surface is opened, and the upper surface thereof is covered with a lid (illustration is omitted). The passenger airbag apparatus S is installed in an upper surface portion of an instrument panel 4 of an automobile. A windshield 5 is provided above the instrument panel 4. The lid may be a part of the instrument panel 4 or may be a plate in a separate body from the instrument panel 4.

As illustrated in FIG. 1, the airbag 1 is filled by a gas supplied from the inflator and expands upward from the upper surface of the instrument panel 4 to fill a space between the instrument panel 4 and the windshield 5. A rear side of the airbag 1 in a front and rear direction of a vehicle body expands toward the rear side of the vehicle body, namely an occupant seated in the passenger seat. A surface of the expanded airbag 1 facing the rear side of the vehicle body is an rear surface 1F (e.g., occupant-facing surface) and a surface facing a front side of the vehicle body is a front surface 1R (e.g. opposite-to-occupant side surface). In a state that the airbag 1 is expanded, a lower portion of the rear surface 1F faces in the vicinity of a waist portion of the occupant seated in the passenger seat.

The airbag 1 is an airbag formed into a bag shape by combining each of peripheral edge portions of an upper panel 1a and a lower panel 1b by a stitching work or the like. When the airbag is expanded, the upper panel 1a forms the upper surface side and the lower panel 1b forms the lower surface side. An opening (not shown) for an inflator is provided in the vicinity of a front end of the lower panel 1b through which the inflator 3 is disposed in the airbag 1. A peripheral edge portion of the opening is fixed to the case 2 by a pressing ring 6 (refer to FIGS. 2 and 4).

The airbag 1 is provided with a vent 10 for discharging the gas from the inside of the airbag 1 to the outside of the airbag 1, an invertible portion 11 (e.g., evagination portion) provided in the front surface 1R of the airbag 1, which is allowed to be turned outside the airbag 1 toward the outside by the gas-pressure in the airbag 1, and a tether 12 serving as an interlocking member for connecting the rear surface 1F of the airbag 1 and a tip end of the invertible portion 11 passing through the inside of the airbag 1. A part of the tether 12 constitutes a lid member for covering the vent 10. A construction of the tether 12 will be described later in detail.

As illustrated in FIGS. 2 and 4, according to an exemplary embodiment, the vent 10 is provided in a right side surface 1M at a time when the airbag 1 is expanded. Further, the invertible portion 11 is provided in the vicinity of a corner portion of the front surface 1R and the right side surface 1M at the time when the airbag 1 is expanded. The vent 10 and the invertible portion 11 are respectively disposed in the vicinity of a middle portion in an upper and lower direction of the right side surface 1M and the front surface 1R in a state that the airbag 1 is expanded. According to other exemplary embodiments, the disposition of the vent 10 and the invertible portion 11 is not limited to the above-described. Furthermore, although the vent 10 is configured to form a round opening, the shape of the opening of the vent 10 is not limited thereto.

The invertible portion 11 is disposed at a position in the expanded airbag 1 where the invertible portion 11 is not brought into contact with an interior member in the vehicle room, such as the windshield 5, the instrument panel 4, and so forth even when the invertible portion 11 is inverted outside the airbag 1.

The invertible portion 11 is constructed by forming a base cloth into approximately a dome shape or a bag shape. The invertible portion 11 is formed of a base cloth in a separate body from the aforementioned upper panel 1a and the lower panel 1b. An opening 1c for attaching an invertible portion (refer to FIGS. 5(a) and (b)) is provided in the front surface 1R of the airbag 1, and a peripheral edge portion of the invertible portion 11 is combined with a peripheral edge portion of the opening 1c by the stitching work (illustration is omitted), or the like. A construction of the invertible portion 11 is not limited thereto. For example, the base cloth constituting the invertible portion 11 may be integrally provided in at least one of the aforementioned upper panel 1a and the lower panel 1b.

As illustrated in FIGS. 3 and 4, in a state that an approximately entire invertible portion 11 is everted outside the airbag 1, a length in the everting direction of the invertible portion 11, namely a distance from a base end side in the everting direction of the invertible portion 11 to a tip end side thereof is preferably from about 20 mm to about 150 mm, and specifically, from about 50 mm to about 100 mm.

One end (hereinbelow referred to as base end) side of the tether 12 is combined with an airbag-inside surface of the rear surface 1F by the stitching work or the like, and the other end (hereinbelow referred to as tip end) side thereof is combined with the airbag-inside surface of a tip end portion in the everting direction of the invertible portion 11 by the stitching work or the like. Reference numerals 12a and 12b denote seams where both end sides of the tether 12 are respectively stitched to the rear surface 1F and the invertible portion 11. A combining method for combining both end sides of the tether 12 with the rear surface 1F and the invertible portion 11 is not limited to the stitching work.

A combining position of the base end side of the tether 12 with the rear surface 1F is located in the vicinity of a center in the left and right direction of the rear surface 1F, and at a height allowed to face the vicinity of a chest portion of the occupant seated in the passenger seat in a state that the airbag 1 is expanded.

When the airbag 1 is expanded, as illustrated in FIGS. 1 and 2, along with an expanding out operation of the rear surface 1F of the airbag 1 in a direction toward the occupant, a tip end side of the invertible portion 11 is pulled into the airbag 1 by being pulled in the direction toward the occupant by the rear surface 1F via the tether 12. A length of the tether 12 is, as illustrated in FIGS. 1 and 2, at a time when an expanding operation of the airbag 1 is completed, formed into a dimension where the approximately entire invertible portion 11 is pulled into the airbag 1 via the tether 12.

As illustrated in FIGS. 3 and 4, when the rear surface 1F of the expanded airbag 1 is contacted and pressed by the occupant, the invertible portion 11 is also allowed to move in the opposite-to-occupant direction by just that much via the tether 12, and the invertible portion 11 is brought to be inverted outside the airbag 1 by the gas-pressure in the airbag 1.

The tether 12 is constructed with a belt-shaped base cloth and is disposed in such a way that a width direction thereof corresponds to an approximately upper and lower direction in the airbag 1.

A tether retainer 13 is provided in the vicinity of the vent 10 in the right side surface 1M of the airbag 1. As illustrated in FIG. 1, the tether retainer 13 is disposed on a side of the rear surface 1F relative to the vent 10, and at an approximately the same height as that of the vent 10 in a state that the airbag 1 is expanded. The tether retainer 13 is formed with a small cloth having an approximately rectangular shape. This small cloth is overlapped with the airbag-inside surface of the aforementioned right side surface 1M in such a way that the longitudinal direction thereof corresponds to an approximately upper and lower direction, and both end sides of the longitudinal direction thereof is combined with the right side surface 1M by the stitching work (illustration is omitted) or the like. The tether 12 is inserted under the tether retainer 13, namely a space between the small cloth and the airbag-inside surface of the right side surface 1M such that it may slide in a front and rear direction.

The construction of the tether retainer 13 is not limited to the above-described. For example, although not shown, a pair of slits extending in parallel with each other may be provided in the right side surface 1M of the airbag 1 to serve as a tether retainer. The tether 12 may be passed through from one slit to the other slit. According to other exemplary embodiments, a wide variety of other retaining mechanisms may be used.

As illustrated in FIGS. 1 and 2, a portion of the tether 12 on the invertible portion 11 side (e.g., between the invertible portion and the tether retainer 13) extends across the vent 10 and faces the vent 10 from the inside of the airbag 1. When the airbag 1 is expanded, a portion of the tether 12 is pressed to the airbag-inside surface of the right side surface 1M by the gas pressure in the airbag 1, and closes the vent 10. That is, a portion of the tether 12 constitutes the lid member for covering the vent 10 at the time when the airbag 1 is expanded. Hereinbelow, the lid member 14 will refer to the portion in the tether 12 which faces the vent 10 when the airbag 1 is expanded and when the approximately entire invertible portion 11 is pulled into the airbag 1 by the tether 12.

A width of the portion of the tether 12 including the lid member 14 is formed to be larger than an inner diameter of the vent 10. Therefore, when the lid member 14 is overlapped with the vent 10, the entire vent 10 is covered with the lid member 14, and the vent 10 is completely closed. However, according to other exemplary embodiments, the lid member 14 may have a width that is smaller than the inner diameter of the vent 10, such that even when the lid member 14 is overlapped with the vent 10, the vent 10 is partially opened.

An opening 15 is formed in the tether 12 on the rear surface side (e.g., between the rear surface 1F and the lid member 14). The opening 15 overlaps with the vent 10 when the tether 12 moves to allow the invertible portion 11 to be inverted (e.g., turned to the outside of the airbag as shown in FIGS. 3 and 4). The opening 15 is a round opening approximately the same size as the vent 10. The opening 15 is disposed to be allowed to be overlapped in approximately concentric manner with the vent 10 when the approximately entire invertible portion 11 is inverted outward from the airbag 1 as illustrated in FIGS. 3 and 4. According to other exemplary embodiments, the opening may be a variety of different shapes and may be larger or smaller than the vent 10.

When the airbag 1 is folded back (e.g., before deployment), the approximately entire invertible portion 11 is previously intruded into the airbag 1, and the airbag 1 is folded back in a state where the tether 12 is moved to the side of the rear surface 1F and the lid member 14 covers the vent 10. Therefore, a wide variety of folding methods may be used to stow the airbag 1 before deployment.

At a time when the vehicle on which the passenger airbag apparatus S is mounted encounters a collision, the inflator 3 is activated. The inflator 3 expels a gas into the airbag 1 to inflate the airbag 1. The airbag 1 pushes open the lid and expands away from the upper surface of the instrument panel 4 towards the occupant seated in the seat.

The airbag 1 is in a state that the vent 10 is closed by the lid member 14 from an initial stage of the expanding operation of the airbag 1, and the gas is limited to be discharged from the vent 10. Thereby, the airbag 1 is rapidly expanded.

The rear surface 1F moves toward the occupant as the airbag 1 expands, and thereby the tether 12 is pulled toward the side of the occupant, preventing the invertible portion 11 from being inverted outside the airbag 1. Thereby, as illustrated in FIGS. 1 and 2, until the occupant seated in the passenger seat contacts the rear surface 1F of the expanded airbag 1, the vent 10 is kept closed by the lid member 14 and the inside of the airbag 1 is kept at high inner pressure.

As illustrated in FIGS. 3 and 4, when the occupant seated in the passenger seat contacts the rear surface 1F of the expanded airbag 1 and pushes the rear surface 1F forward, the invertible portion 11 is inverted outside the airbag 1 by the gas pressure in the airbag 1. Since the invertible portion 11 pulls the tether 12 forward as it is inverted outside the airbag, the opening 15 is moved to overlap the vent 10. Thereby, the gas is allowed to be discharged outside the airbag 1 through the opening 15 and the vent 10, and the occupant seated in the passenger seat is softly received by the airbag 1.

The inner pressure of the airbag 1 is constantly acting on the invertible portion 11 from the inside of the airbag 1, forcing it to an inverted configuration outside of the airbag 1. Therefore, until the invertible portion 11 is inverted, the tether 12 is strongly pulled to the invertible portion 11 side by the invertible portion 11 with the comparable force as that of the inner pressure of the airbag 1. Thereby, the tether 12 is pulled by the invertible portion 11, and the vent 10 becomes opened by a predetermined opening amount. The amount the opening 15 overlaps the vent 10 is determined by the distance the tether 12 moves towards the invertible portion 11 side (e.g., the distance the rear surface 1F is pushed forward relative to the front side). Thereby, the amount of the gas discharged from the vent 10 and the amount of impact-absorption can be changed to accommodate occupant of various sizes, collision of various speeds, or the like.

In a case that an occupant is out-of-position when the airbag 1 is expanded (e.g., where the occupant seated in the passenger seat is seated at a position situated nearer a front side in relation to the regular seating position) the occupant seated in the passenger seat contacts the rear surface 1F at a stage before the expanding operation of the airbag 1 is completed. The premature contact prevents the rear surface 1F from being moved to the occupant side further, and thereby the invertible portion 11 is allowed to be inverted outside the airbag 1, opening the vent 10 and more softly receiving the occupant.

Although the vent 10 is provided in the right side surface 1M of the airbag 1, the vent 10 may be provided in a left side surface 1H of the airbag 1. Alternatively, the vents 10 may also be respectively provided in both of the left and right side surfaces 1M and 1H of the airbag 1. Other than the vent 10, a constant open type vent, which is not opened and closed by the lid member 14, may also be provided. In this case, at a portion in the lid member 14, which is overlapped with the vent 10, an opening having a smaller diameter than that of the vent 10 may be formed to serve as the constant open type vent. Although the invertible portion 11 is provided one in number, two or more invertible portions 11 may be provided. Although the invertible portion 11 is provided in the front surface 1R of the airbag 1, and is configured to be everted toward the front side of the vehicle body, the disposition and the everting direction of the invertible portion 11 is not limited thereto. For example, the invertible portion 11 may be provided in a side surface of the airbag 1, and configured to be everted toward a lateral side of the airbag 1. The same is true for the below described exemplary embodiments.

Figure 6:
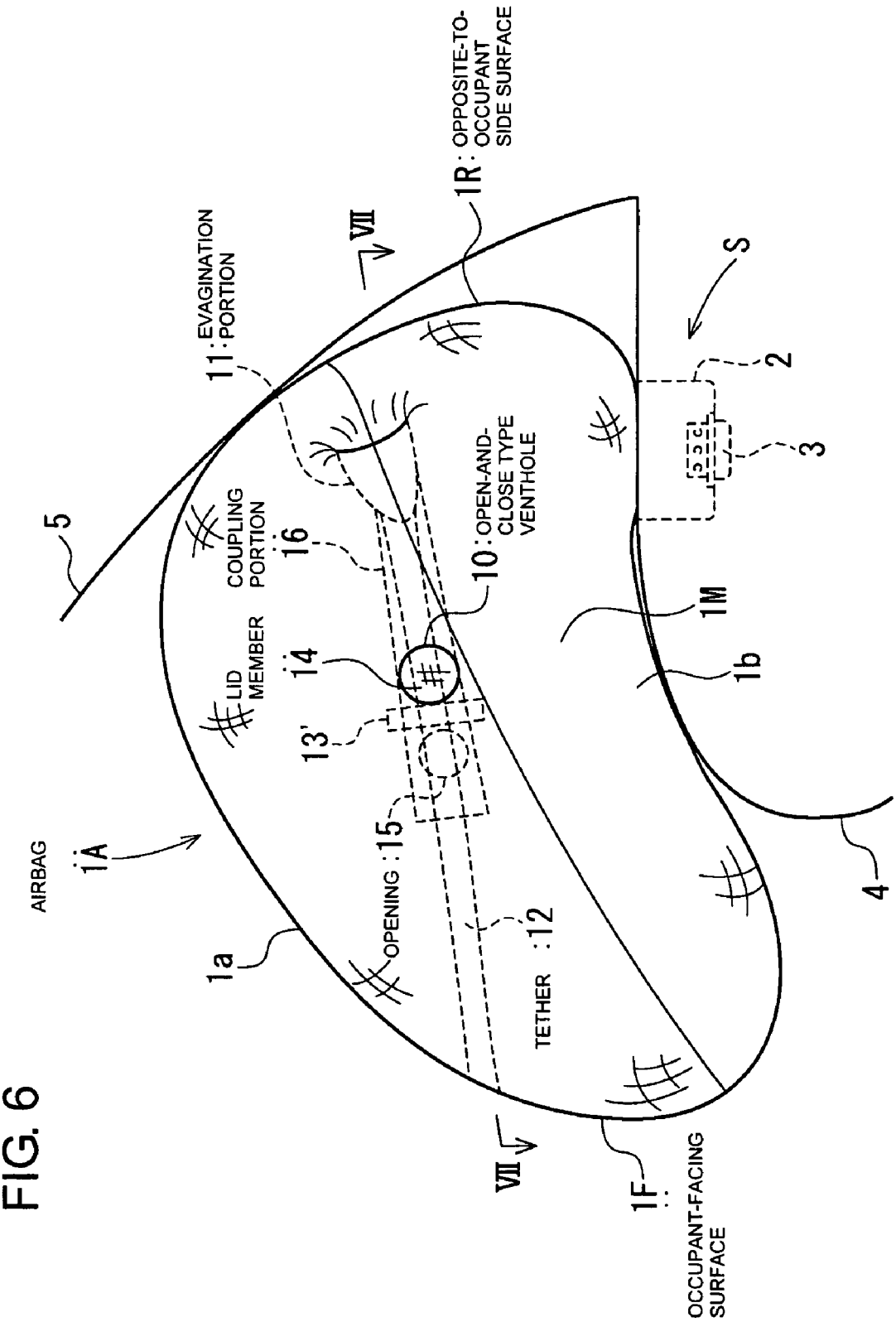
FIG. 6 is a side elevation illustrating the airbag and the airbag apparatus according to another embodiment.
Figure 7:
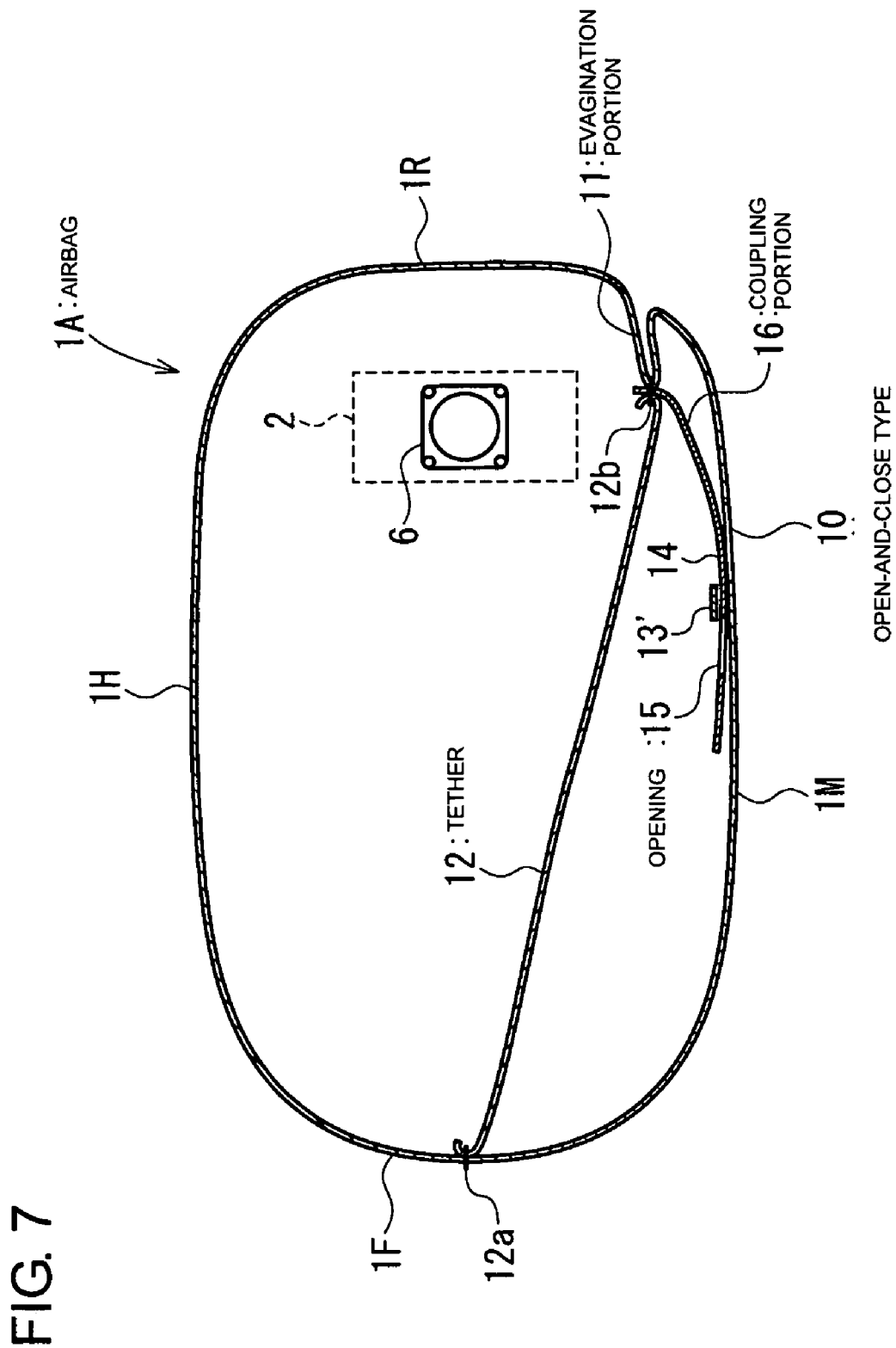
FIG. 7 is a cross-sectional view taken along a line VII-VII in FIG. 6

FIG. 6 is a side elevation illustrating the airbag and the airbag apparatus according to another exemplary embodiment. FIG. 7 is a cross-sectional view (approximately horizontal cross-sectional view) taken along a line VII-VII in FIG. 6. FIGS. 6 and 7 illustrate a state before the occupant is brought into contact with the expanded airbag.

Figure 8:
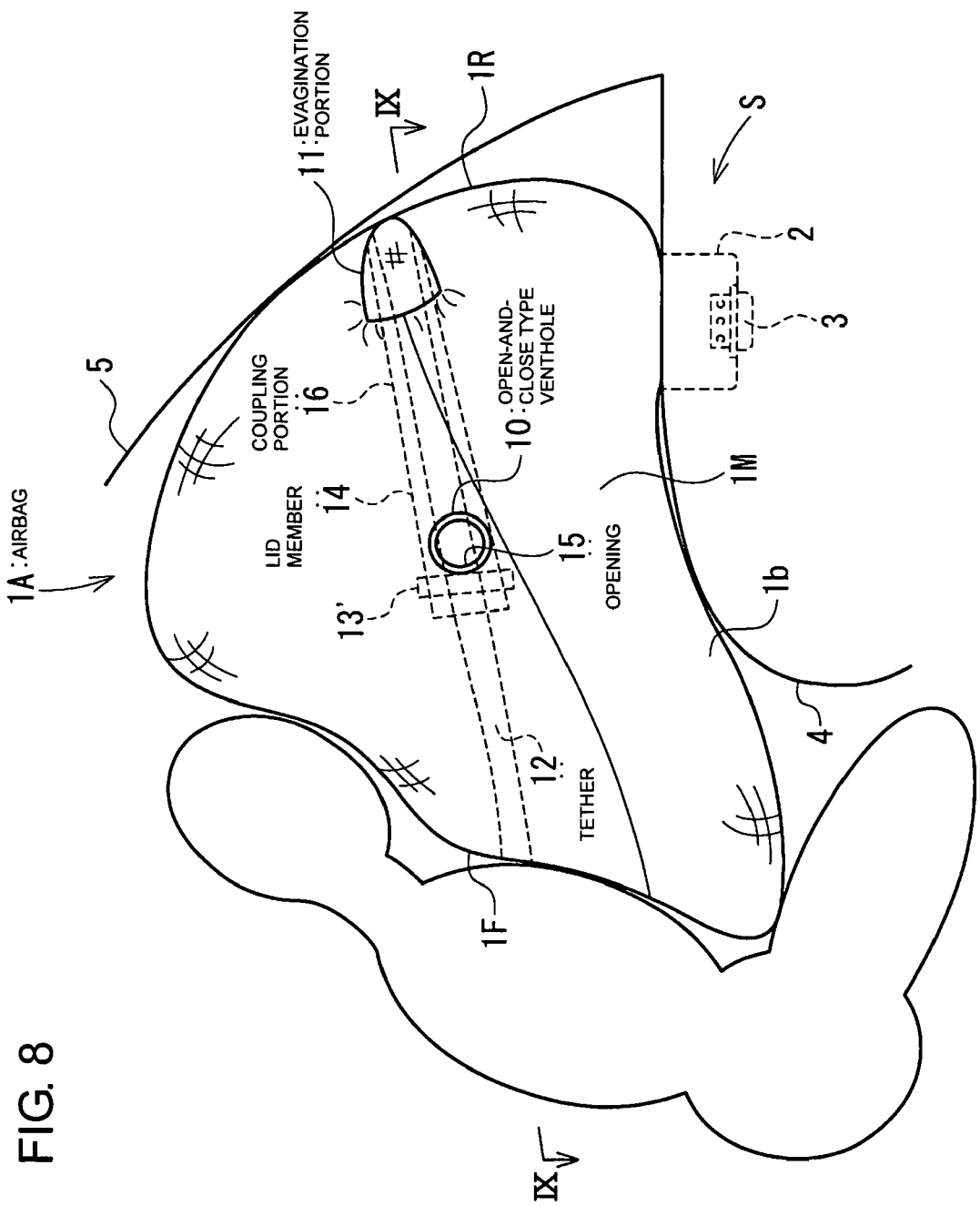
FIG. 8 is a side elevation illustrating the airbag and the airbag apparatus of FIG. 6.
Figure 9:
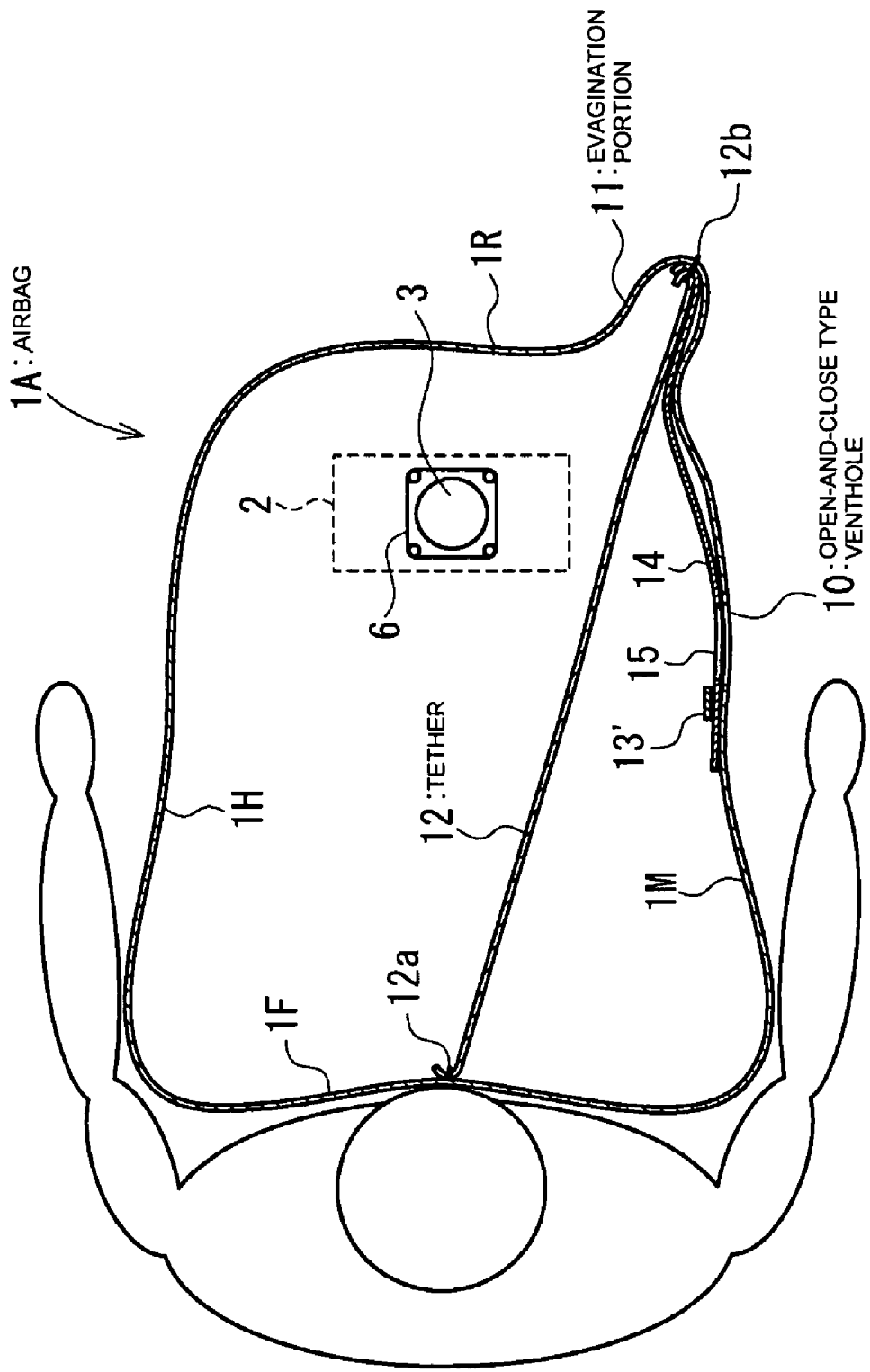
FIG. 9 is a cross-sectional view taken along a line IX-IX in FIG. 8.

FIG. 8 is a side elevation illustrating the airbag and the airbag apparatus of FIG. 6. FIG. 9 is a cross-sectional view (approximately horizontal cross-sectional view) taken along a ling IX-IX in FIG. 8. FIGS. 8 and 9 illustrate a state after the occupant is brought into contact with the expanded airbag.

In an airbag 1A according to an exemplary embodiment, the lid member 14 for covering the vent 10 is provided as a separate body from the tether 12. The lid member 14 is constructed with a belt-shaped base cloth. The lid member 14 covers the vent 10 from an inside of the airbag 1A. The lid member 14 is disposed while passing transversely across the vent 10 in an approximately front and rear direction along the airbag-inside surface of the right side surface 1M of the airbag 1A, and a portion overlaps with the vent 10. The width of the lid member 14 is also larger than the inner diameter of the vent 10 such that the lid member 14 can overlap the vent 10 and completely close the vent 10. However, in a similar manner as that of the above-described embodiments, the width of the lid member 14 may be smaller than the diameter of the vent 10.

A lid member retainer 13' is provided proximate to the vent 10 in the right side surface 1M of the airbag 1A. As illustrated in FIG. 6, the lid member retainer 13' is disposed on the side of the rear surface 1F relative to the vent 10, and at an approximately the same height as that of the vent 10 in a state where the airbag 1A is expanded. The lid member 14 on the side of the rear surface 1F relative to the vent 10 is slidably inserted between the lid member retainer 13' and the right side surface 1M. The lid member retainer 13' has a similar construction as that of the tether retainer 13 in the above-described embodiments, except that the lid member 14 that is a separate body from the tether 12 is inserted into the lid member retainer 13' instead of the tether 12. The tether 12 is stretched between the rear surface 1F and the tip end of the invertible portion 11 in the airbag 1A without inserting the tether 12 into the retainer 13.

A belt-shaped coupling portion 16 continues into the side of the front surface 1R (hereinbelow referred to as tip end side) of the lid member 14. The tip end side of the coupling portion 16 is coupled to the tip end of the invertible portion 11. As illustrated in FIG. 2, the tip end side of the coupling portion 16 is overlapped with a tip end side of the tether 12 and is integrally stitched to the invertible portion 11 with the tether 12 by a seam 12b. However, the combining method for combining the coupling portion 16 with the invertible portion 11 is not limited to the above-described.

Although the lid member 14 and the coupling portion 16 are integrally formed by a common base cloth, the lid member 14 and the coupling portion 16 may be formed in a separate body, and a rear end side of the coupling portion 16 may be combined with the lid member 14 by the stitching work or the like. In a case that the invertible portion 11 is inverted outside the airbag 1A, the lid member 14 is pulled by the invertible portion 11 via the coupling portion 16, and is moved to the invertible portion 11 side. The coupling portion 16 is formed to have length such that it is tensed (tightly stretched) between the tip end of the invertible portion 11 and the lid member 14 when the airbag 1A is expanded and the approximately entire invertible portion 11 is pulled into the inside of the airbag 1A by the tether 12, as illustrated in FIGS. 6 and 7.

The opening 15 is formed at a rear end side of the lid member 14 that overlaps the vent 10 when the lid member 14 is moved towards the invertible portion 11. The opening 15 is formed of a round opening at approximately the same size as that of the vent 10. Further, the opening 15 is disposed in such a way that the opening 15 can be approximately concentrically overlapped with the vent 10 when the approximately entire invertible portion 11 is inverted outside the airbag 1A, as illustrated in FIGS. 8 and 9.

When the airbag 1A is folded back, the approximately entire invertible portion 11 is also previously intruded into the airbag 1A, and the airbag 1A is folded back in a state where the lid member 14 covers the vent 10.

The construction of the airbag 1A other than the above-described is the same as that of the above-described airbag 1 in FIGS. 1 through 5, and the same reference numerals as that in FIGS. 1 through 5 used in FIGS. 6 through 9 denote the same elements.

At a time when the vehicle where the passenger airbag apparatus S is mounted encounters a collision, or the like, the inflator 3 is activated to blow out the gas and the airbag 1A starts to be expanded by the gas from the inflator 3. The airbag 1A pushes open the lid and is expanded and developed toward the occupant seated in the passenger seat from an upper surface of the instrument panel 4.

The vent 10 is also closed by the lid member 14 from a time the airbag 1A starts to be expanded and the gas is limited to be discharged from the vent 10. Thereby, the airbag 1 is rapidly expanded.

The rear surface 1F is developed toward the side of the occupant seated in the passenger seat along with an expanding operation of the airbag 1A, and thereby the tether 12 is pulled toward the side of the occupant seated in the passenger seat and the invertible portion 11 is blocked to be everted outside the airbag 1A. Therefore, as illustrated in FIGS. 6 and 7, until the occupant seated in the passenger seat contacts the rear surface 1F of the expanded airbag 1A, the vent 10 is kept closed by the lid member 14 and the inside of the airbag 1A is kept at high inner pressure.

As illustrated in FIGS. 8 and 9, when the occupant seated in the passenger seat contacts the rear surface 1F of the expanded airbag 1A and the rear surface 1F is retreated by being pressed by the occupant seated in the passenger seat, the invertible portion 11 is allowed to be everted toward the opposite-to-occupant and the invertible portion 11 is everted outside the airbag 1A by the gas pressure in the airbag 1A. Since the lid member 14 is moved toward the invertible portion 11 side by being pulled by the invertible portion 11 with the everting operation of the invertible portion 11, the opening 15 overlaps with the vent 10. Therefore, the gas is discharged outside the airbag 1A through the opening 15 and the vent 10 and the occupant seated in the passenger seat is more softly received by the airbag 1A.

In the airbag 1A, the gas pressure may be comparable to that of the inner pressure of the airbag 1A and is may be constantly affecting the invertible portion 11 from the inside of the airbag 1A to the outside of the airbag 1. Therefore, until the everting operation of the invertible portion 11 is completed, the lid member 14 may be strongly pulled to the invertible portion 11 side by the invertible portion with the comparable force as that of the inner pressure of the airbag 1A. The lid member 14 is more assuredly moved up to a predetermined position by being pulled by the invertible portion 11 and the vent 10 becomes more assuredly opened by a predetermined opening amount.

In the airbag 1A, because the lid member 14 is provided in a separate body from the tether 12, there may be no need to dispose the vent 10 and the tether 12 at positions allowing them to face each other. The vent 10 and the tether 12 can be disposed at high flexibility.

In each of the exemplary embodiments in the aforementioned FIGS. 1 through 5, and FIGS. 6 through 9, although the opening 15 is provided only one in number at the rear end side of the lid member 14, two or more openings 15 may be provided.

Figure 10:
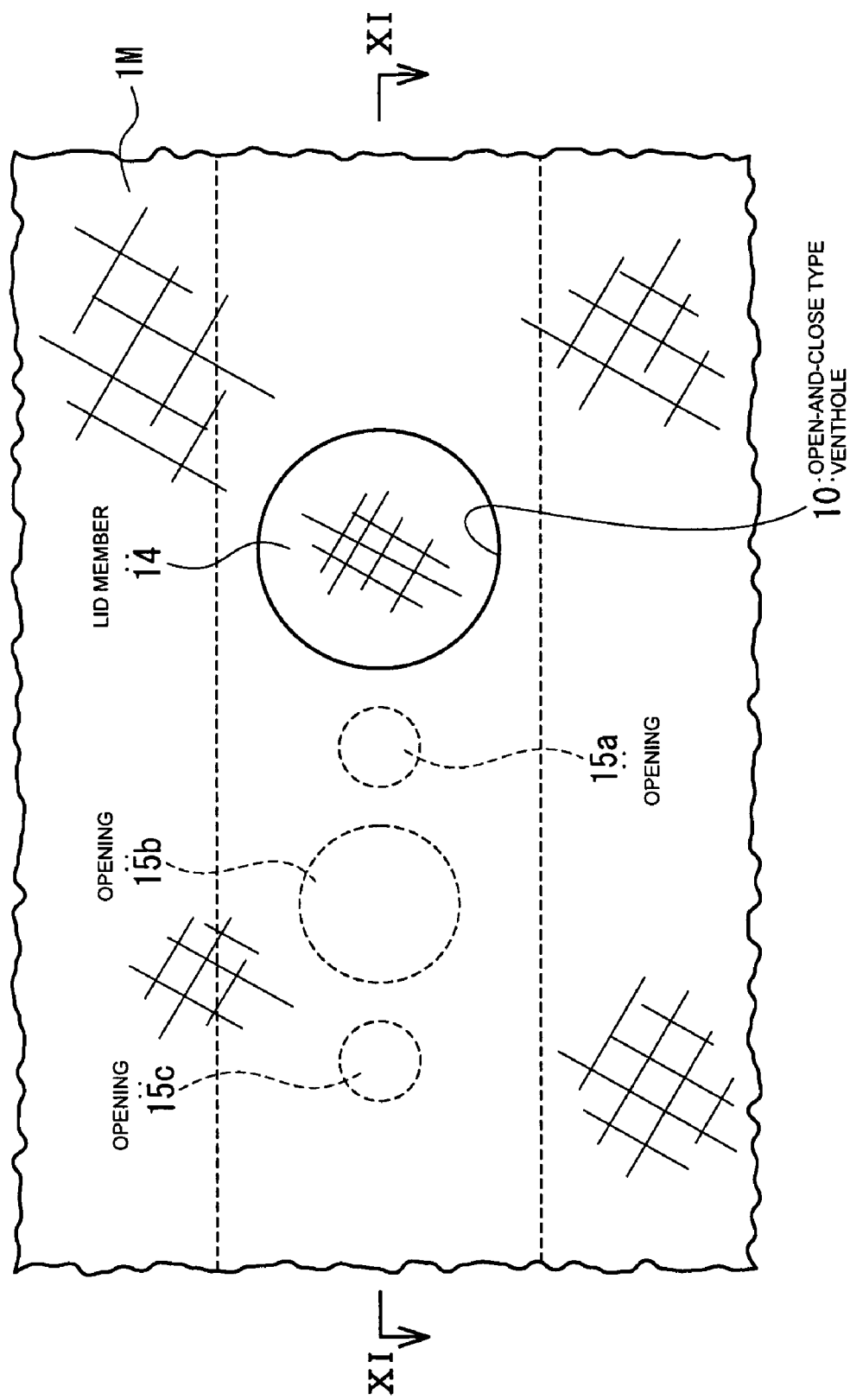
FIG. 10 is a side elevation illustrating the vicinity of a vent of the airbag according to the embodiment.
Figure 11:
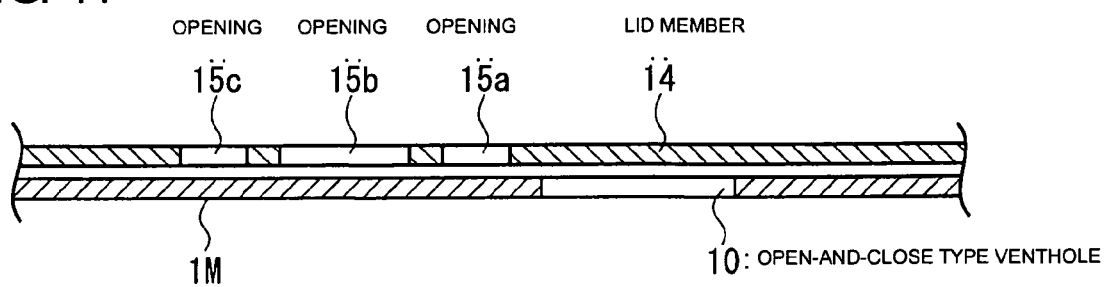
FIG. 11 is a cross-sectional view taken along a line XI-XI in FIG. 10.
Figure 12:
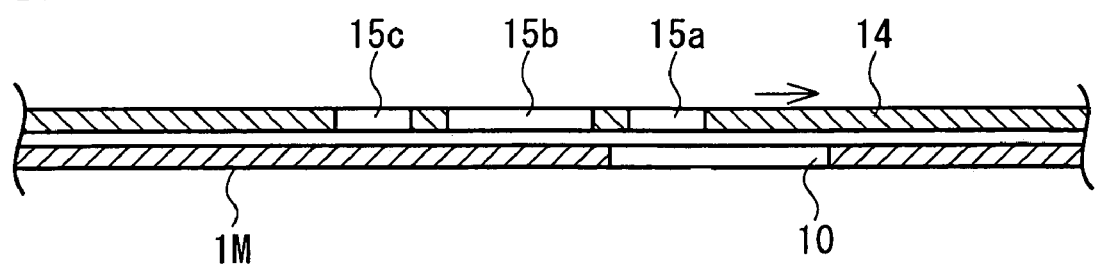
FIG. 12 is a cross-sectional view of the same part as that in FIG. 11 illustrating an opening operation of the vent.
Figure 13:
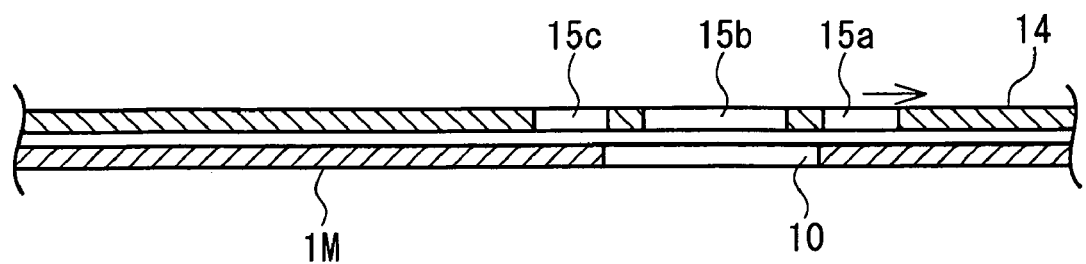
FIG. 13 is a cross-sectional view of the same part as that in FIG. 11 illustrating the opening operation of the vent.
Figure 14:
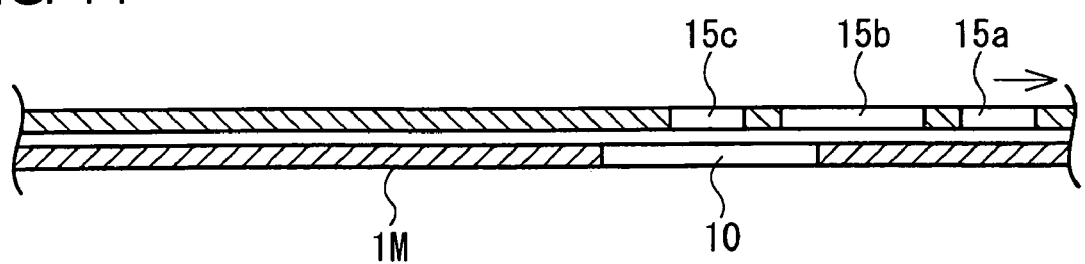
FIG. 14 is a cross-sectional view of the same part as that in FIG. 11 illustrating the opening operation of the vent.

FIG. 10 is a side elevation illustrating the vicinity of a vent of an airbag according to an exemplary embodiment. FIG. 11 is a cross-sectional view taken along a line XI-XI in FIG. 10. FIGS. 12 through 14 are cross-sectional views illustrating the same part as that in FIG. 11, illustrating an opening operation of the vent. FIGS. 10 and 11 illustrate a closed state of the vent, FIG. 12 illustrates a state where a first opening is overlapped with the vent, FIG. 13 illustrates a state where a second opening is overlapped with the vent, and FIG. 14 illustrates a state where a third opening is overlapped with the vent 10. In FIGS. 10 through 14, a left side in the drawings corresponds to the rear surface at the time when the airbag is expanded, and a right side in the drawings corresponds to the side of the opposite-to-occupant side surface.

In the embodiments in FIGS. 10 through 14, on the rear end side of the lid member 14, three openings 15*a*, 15*b*, and 15*c* are disposed at different positions from each other in the approximately front and rear direction. Hereinbelow, in openings 15*a*, 15*b*, and 15*c*, the opening 15*a* located at the first nearest position to the vent 10 is referred to as a first opening, the opening 15*b* located at the second nearest position to the vent 10 is referred to as a second opening, and the opening 15*c* located at the third nearest position is referred to as a third opening 15*c*.

In this embodiment, a first opening 15*a* and the third opening 15*c* have the approximately same inner diameter, and a second opening 15*b* is configured to have a larger inner diameter than that of the openings 15*a* and 15*c*. Any of the openings 15*a* through 15*c* is configured to have smaller inner diameter than that of the vent 10. Further, distances between the openings 15*a* and 15*b*, and the openings 15*b* and 15*c* are configured to have a smaller inner diameter than that of the vent 10.

The construction of exemplary embodiment may be similar in each of the exemplary embodiments in the above-described FIGS. 1 through 5, or FIGS. 6 through 9.

According to an exemplary embodiment, in a state that the approximately entire invertible portion 11 is pulled into the airbag, as illustrated in FIGS. 10 and 11, the lid member 14 is also overlapped with the vent 10 and any of the openings 15*a* through 15*c* is not overlapped with the vent 10. When the rear surface 1F of the expanded airbag is retreated by being pressed by the occupant, the invertible portion 11 is everted outside the airbag in conjunction therewith, and the lid member 14 is moved to the invertible portion 11 side by being pulled by the invertible portion 11, as illustrated in FIGS. 12 through 14, the first opening 15*a*, the second opening 15*b*, and the third opening 15*c* are overlapped with the vent 10 in sequence. Because the inner diameters of the respective openings 11*a* through 15*c* are different each other, the discharge amount of the gas from the vent 10 is changed depending on which one of the openings 15*a* through 15*a* is overlapped with the vent 10. Therefore, the impact-absorbing amount can be changed corresponding to the retreating amount of the rear surface 1F of the airbag.

Although any of the openings 15*a* through 15*c* can be formed to have a round opening shape, the opening shapes of the respective openings 15*a* through 15*c* are not limited thereto. Furthermore, two, four, or more openings may be provided on the rear end side of the lid member 14. At least a part of openings may be arranged in an upper and lower direction, obliquely upper and lower direction, or the like to each other.

Figure 15:
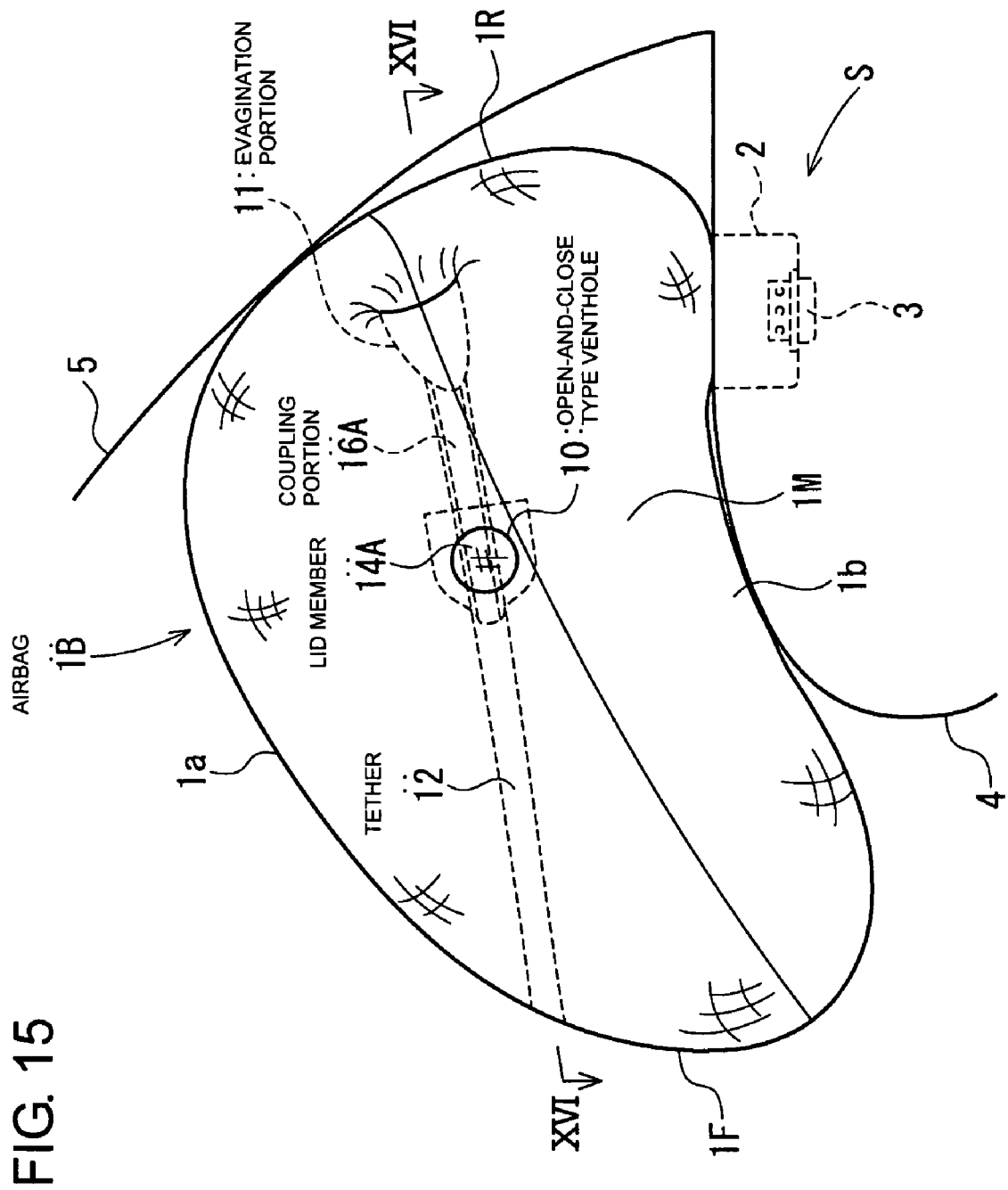
FIG. 15 is a side elevation illustrating the airbag and the airbag apparatus according to the embodiment.
Figure 16:
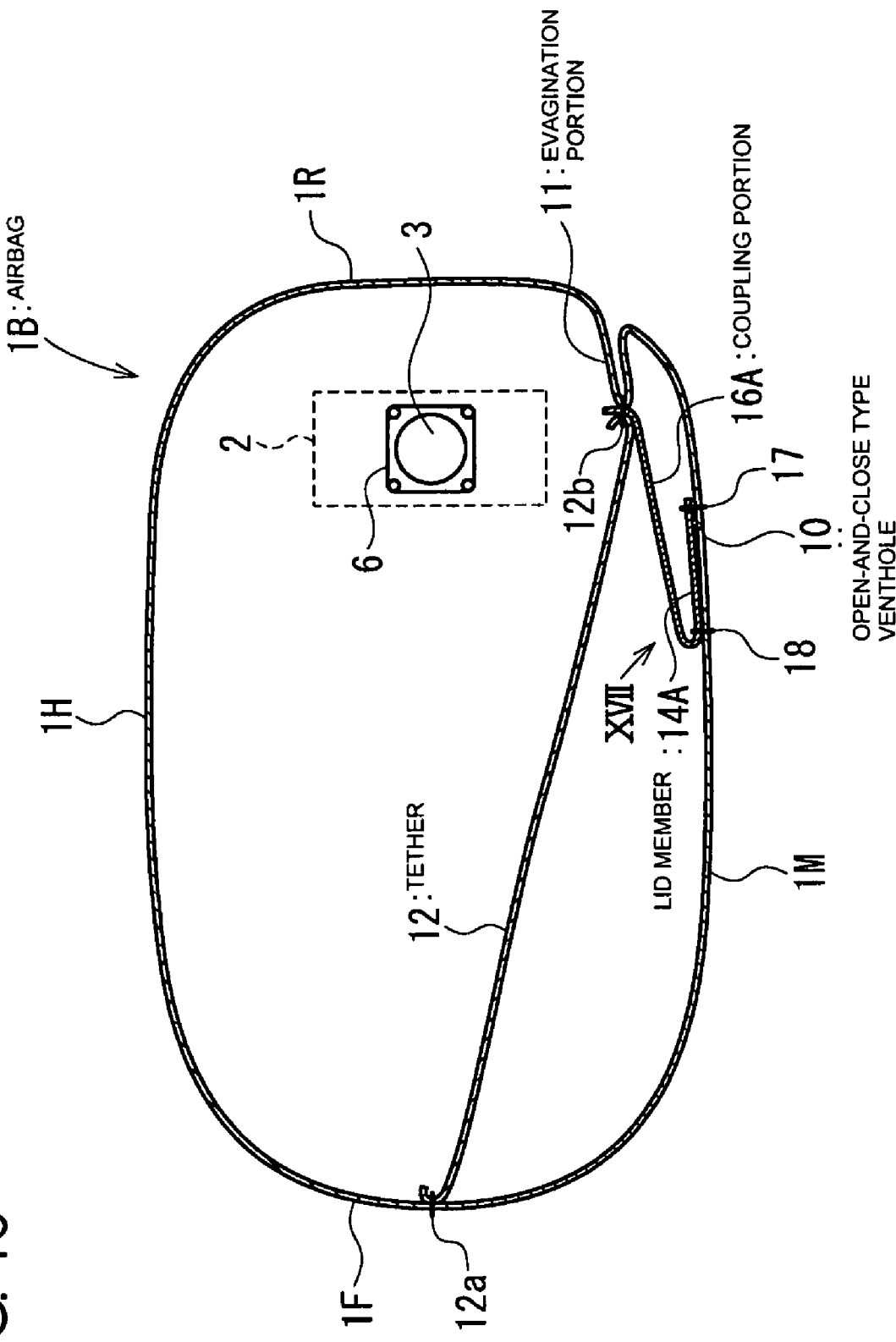
FIG. 16 is a cross-sectional view taken along a line XVI-XVI in FIG. 15.
Figure 17:
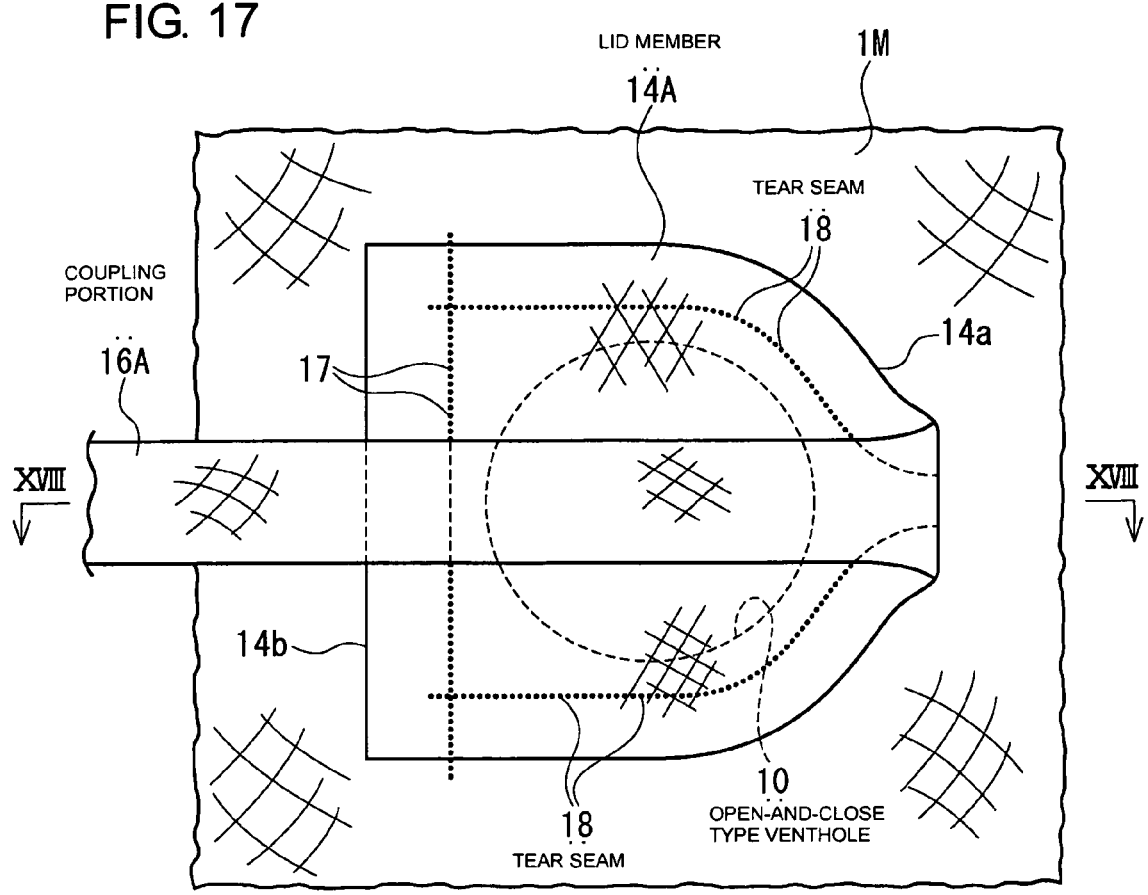
FIG. 17 is a side elevation illustrating a part XVII in FIG. 16.
Figure 18:
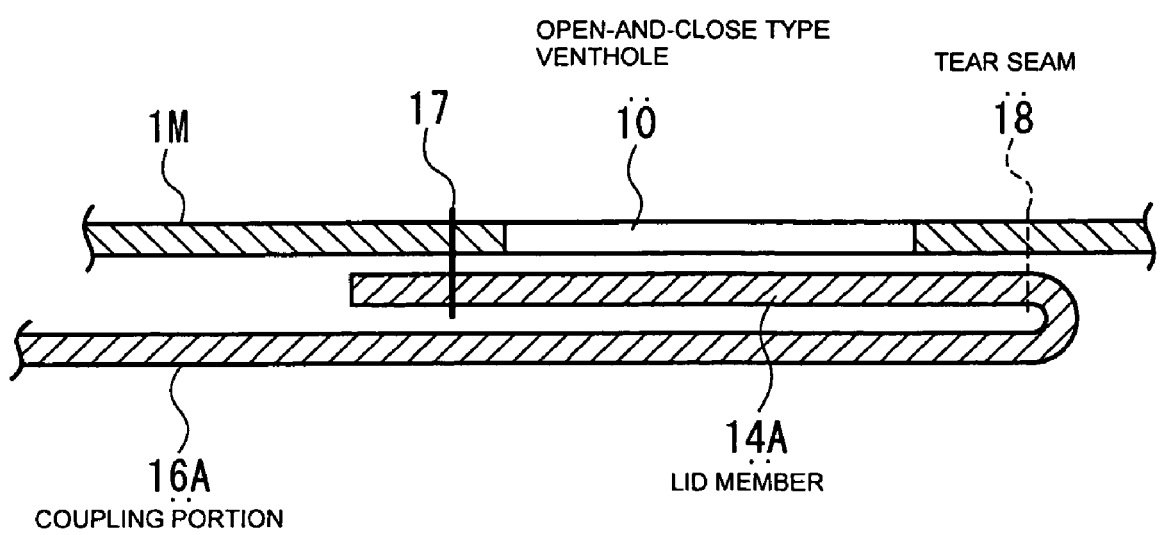
FIG. 18 is a cross-sectional view taken along a line XVIII-XVIII in FIG. 17.
Figure 19:
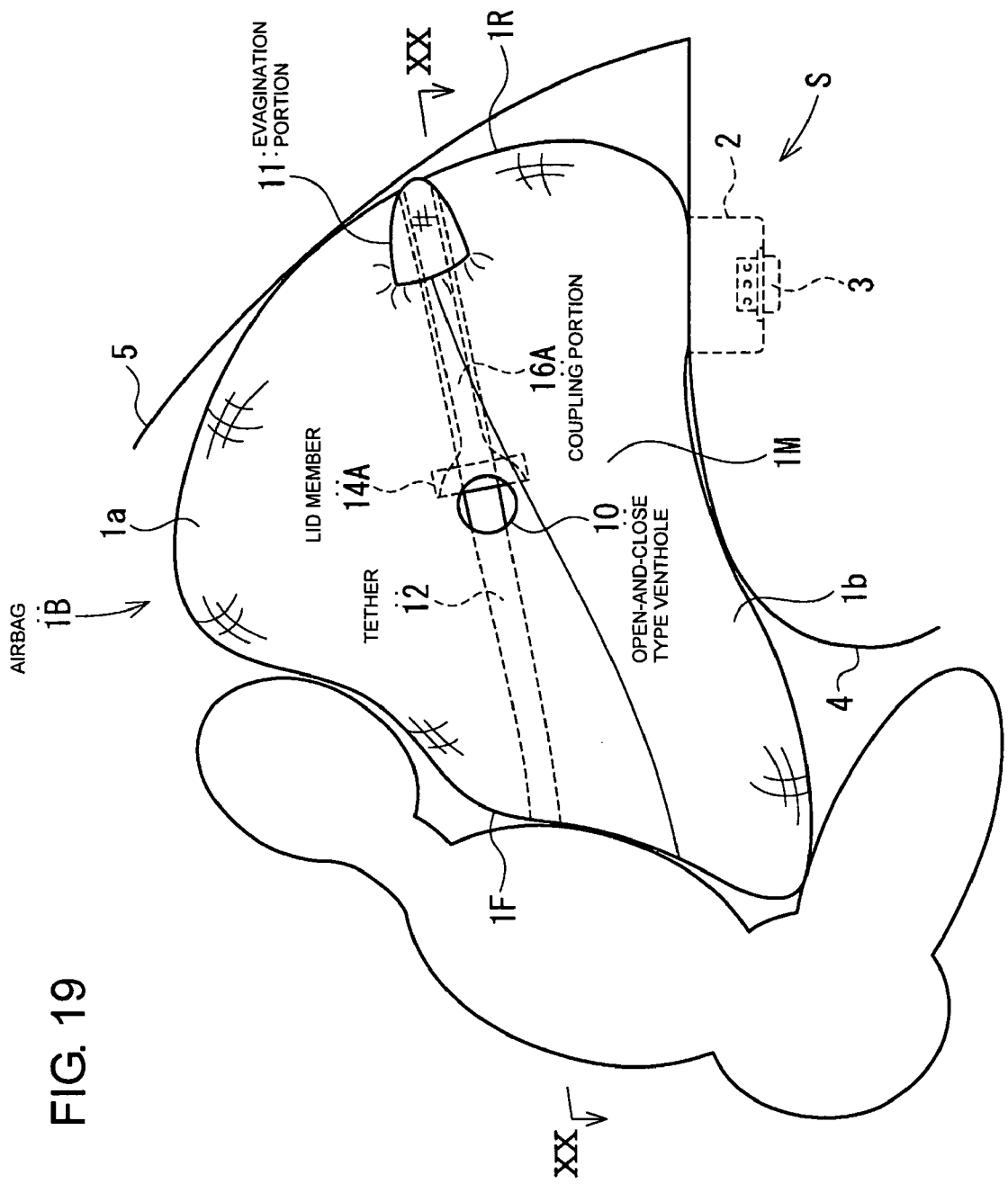
FIG. 19 is a side elevation illustrating the airbag and the airbag apparatus of FIG. 15.
Figure 20:
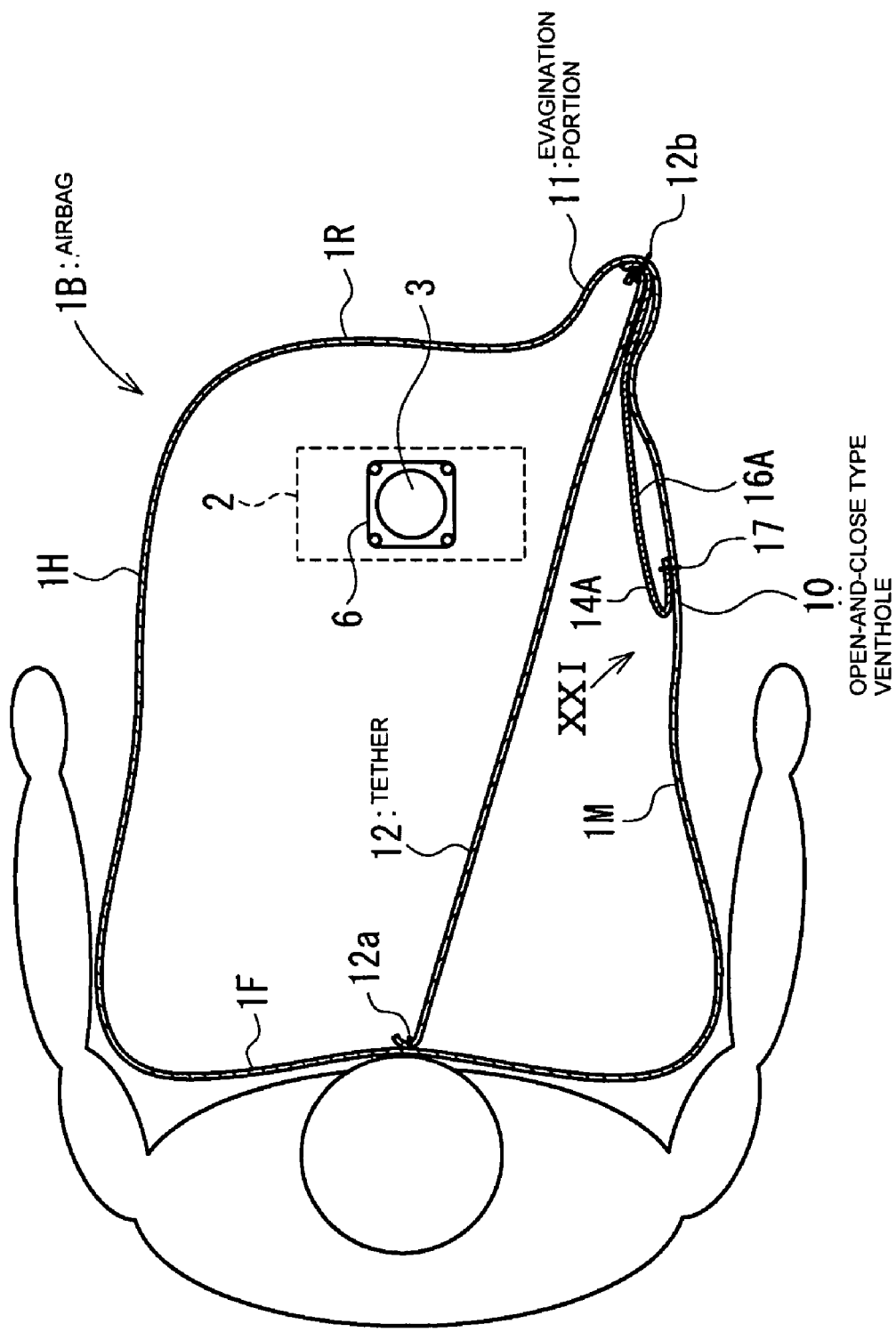
FIG. 20 is a cross-sectional view taken along a line XX-XX in FIG. 19.
Figure 21:
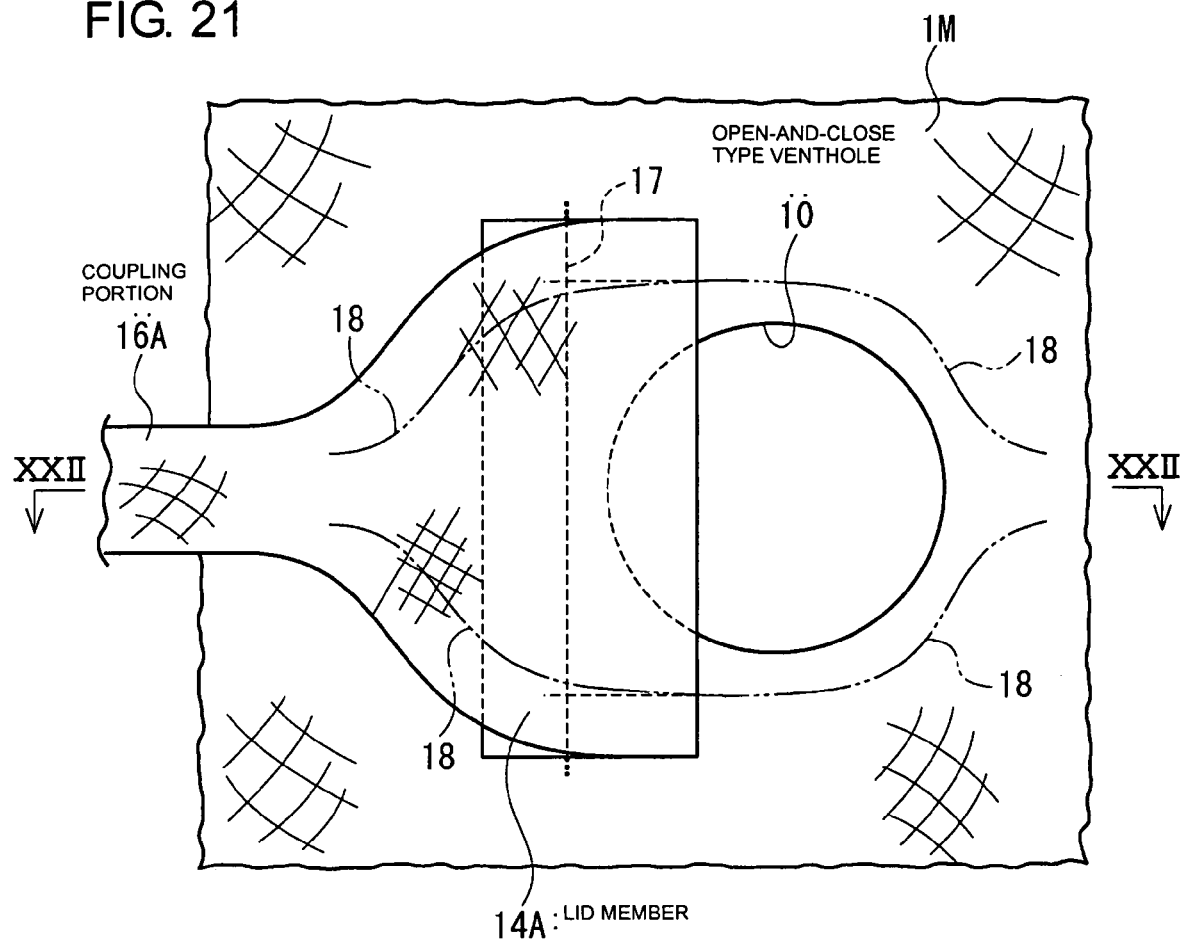
FIG. 21 is a side elevation illustrating a part XXI in FIG. 20.
Figure 22:
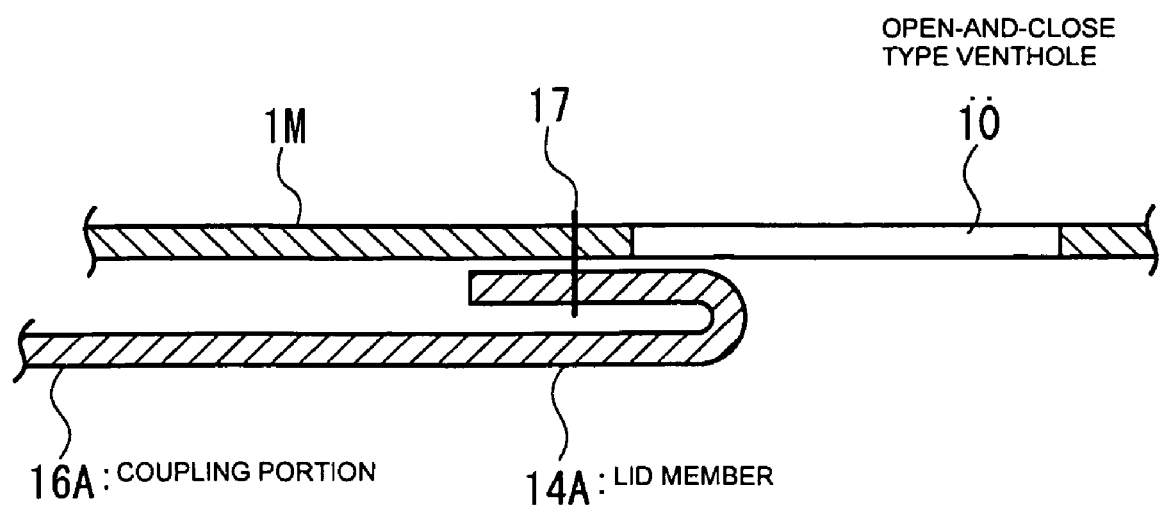
FIG. 22 is a cross-sectional view taken along a line XXII-XXII in FIG. 21.

FIG. 15 is a side elevation illustrating the airbag and the airbag apparatus according to the embodiment, FIG. 16 is a cross-sectional view (approximately horizontal cross-sectional view) taken along a line XVI-XVI in FIG. 15, FIG. 17 is a side elevation illustrating a part XVII (in the vicinity of the lid member) in FIG. 16 looking from an inside of the airbag, FIG. 18 is a cross-sectional view taken along a line XVIII-XVIII in FIG. 17, FIG. 19 is a side elevation illustrating the airbag and the airbag apparatus of FIG. 15, FIG. 20 is a cross-sectional view (approximately horizontal cross-sectional view) taken along a line XX-XX in FIG. 19, FIG. 21 is a side elevation illustrating a part XXI (in the vicinity of the lid member) in FIG. 20 looking from the inside of the airbag, and FIG. 22 is a cross-sectional view taken along a line XXII-XXII in FIG. 21.

According to an exemplary embodiment, an airbag 1B includes a lid member 14A for covering the vent 10 that is also separately provided from the tether 12 serving as an interlocking member for connecting the rear surface 1F of the airbag 1B and a tip end side in the everting direction of the invertible portion 11.

The lid member 14A may have an approximately semicircular plane-view shape including an approximately semicircular arc edge 14*a* and a string-shaped edge 14*b* connecting both ends of the semicircular arc edge 14*a*. The lid member 14A is overlapped with the vent 10 from an inside of the airbag 1B in a posture in which the vicinity of the middle in an extending direction of the semicircular arc edge 14*a* faces the side of the rear surface 1F of the airbag 1B and the string-shaped edge 14*b* faces the side of the front surface 1R. As illustrated in FIG. 17, the lid member 14A may be of sufficient size to cover the entire vent 10.

According to an exemplary embodiment, the lid member 14A may be, as illustrated in FIG. 17, stitched to a peripheral edge portion of the vent 10 along the string-shaped edge 14*b* by a seam 17 formed of a stitching thread having relatively high strength in such a way that a combination thereof cannot be easily released. The lid member 14A is stitched to the peripheral edge portion of the vent 10 along the semicircular arc edge 14*a* by a tear seam 18 formed of a stitching thread having relatively low strength in such a way that the combination thereof can be released. The seam 17 and the tear seam 18 are extended to surround the vent 10. As illustrated in FIG. 17, the tear seam 18 is cut off in the vicinity of the middle in an extending direction of the semicircular arc edge 14*a* and both end portions of the tear seam 18 facing the cut off portion extend toward an outer peripheral side of the lid member 14A upon changing the directions.

The tear seam 18 is constructed to release the combination of the lid member 14A and the peripheral edge portion of the vent 10 by being ruptured when predetermined force or more is applied in a direction for peeling off the lid member 14A from the peripheral edge portion of the vent 10. The seam 17 may be configured not to be ruptured even when predetermined tension force or more is applied.

In the vicinity of the middle in the extending direction of the semicircular arc edge 14*a* of the lid member 14A, namely on the side of the rear surface 1F of the lid member 14A, a belt-shaped coupling portion 16A continues. An end portion (tip end) of the coupling portion 16A on a side opposite to the lid member 14 is combined with the airbag-inside surface on a tip end side in the everting direction of the invertible portion 11. As illustrated in FIG. 16, the tip end side of the coupling portion 16A is also overlapped with the tip end side of the tether 12 and stitched to the invertible portion 11 in an integral manner by the seam 12b. However, the combination method of the coupling portion 16A with the invertible portion 11 is not limited thereto.

Although the lid member 14A and the coupling portion 16A are formed in an integral manner by a common base cloth, the lid member 14A and the coupling portion 16A may be formed in a separate body and a construction may be made in such a way that a rear end side of the coupling portion 16A is combined with the lid member 14a by the stitching work or the like.

The tether 12 is also stretched between the rear surface 1F and the everting direction of the invertible portion 11 in the airbag 1A without inserting the halfway portion thereof into the tether insertion portion. In a case that the invertible portion 11 is everted outside the airbag 1B, the lid member 14A is also moved toward the invertible portion 11 side by being pulled by the invertible portion 11 via the coupling portion 16A.

The length of the coupling portion 16A is, as illustrated in FIG. 16, formed to have a dimension such as that at a time when the airbag 1B is expanded and in a state that the approximately entire invertible portion 11 is pulled into the inside of the airbag 1B by the tether 12. The coupling portion 16A is tensed (tightly stretched) between the tip end side of the invertible portion 11 and the lid member 14A.

According to an exemplary embodiment the airbag 1B may also be folded back in a state that the approximately entire invertible portion 11 is previously intruded into the airbag 1B when folded back. The other portions of the airbag 1B may be the same as that in the airbag 1 in the exemplary embodiments in FIGS. 1 through 5 described above.

An operation of the passenger airbag apparatus S provided with the airbag 1B is as follows. At a time when the vehicle where the passenger airbag S is mounted encounters a collision or the like, the inflator 3 is activated to blow out the gas and the airbag 1B starts to be expanded by the gas from the inflator 3. This airbag 1B pushes open the lid and is expanded and developed from the upper surface of the instrument panel 4 toward the occupant seated in the passenger seat.

Because the lid member 14A is stitched to the peripheral edge portion of the vent 10 by the seam 17 and tear seam 18 in a state of covering the vent 10, the vent 10 is closed by the lid member 14A from an initial stage of an expanding operation of the airbag 1B and a discharge of the gas from the vent 10 is limited. Therefore, the airbag 1B can be rapidly expanded.

The tether 12 is pulled to the side of the occupant seated in the passenger seat by the rear surface 1F that is developed to the side of the occupant seated in the passenger seat along with the expanding operation of the airbag 10B and the invertible portion 11 becomes to be blocked to be everted outside the airbag 1B. As illustrated in FIGS. 15 and 16, until the occupant seated in the passenger seat contacts the rear surface 1F of the expanded airbag 1B, the invertible portion 11 does not pull the lid member 14A and the vent 10 is kept closed by the lid member 14A and the inside of the airbag 1B is kept at high inner pressure.

As illustrated in FIGS. 19 and 20, when the occupant seated in the passenger seat contacts the rear surface 1F of the expanded airbag 1B, and the rear surface 1F is pressed by the occupant seated in the passenger seat and retreated, the invertible portion 11 is allowed to be everted to the opposite-to-occupant side and the invertible portion 11 is everted outside the airbag 1B by the gas pressure in the airbag 1B. Along with the everting operation of the invertible portion 11, the lid member 14 is pulled by the invertible portion 11 via the coupling portion 16A. When the pulling force applied to the lid member 14A by the invertible portion 11 reaches a predetermined strength or greater, the tear seam 18 is ruptured, the lid member 14A is peeled off from the peripheral edge portion of the vent 10 as illustrated in FIGS. 17 and 18, and the vent 10 is opened. The gas becomes to be discharged outside the airbag 1B through the vent 10 and the occupant seated in the passenger seat may be softly received by the airbag 1B.

In the airbag 1B, a gas pressure comparable to that of the inner pressure of the airbag 1B may be constantly affecting the invertible portion 11 from the inside of the airbag 1B to the outside of the airbag 1B. Therefore, until the everting operation of the invertible portion 11 is completed, the lid member 14A is strongly pulled to the invertible portion 11 side by the invertible portion with the comparable force as that of the inner pressure of the airbag 1B. Thereby, the lid member 14A is more assuredly peeled off to a predetermined position by being pulled by the invertible portion 11 and the vent 10 becomes more assuredly opened by a predetermined opening amount.

The lid member 14A is stitched to the peripheral edge portion of the vent 10 by the tear seam 18. The lid member 14A closes the vent 10 without being peeled off from the peripheral edge portion of the vent 10 until the lid member 14A is pulled by the invertible portion 11 via the coupling portion 16A with the predetermined force or more, namely until the inside of the airbag 1B has the predetermined pressure or more. Thereby, the occupant seated in the passenger seat may firmly receive the occupant seated in the passenger seat by the airbag 1B whose inner pressure is fully raised.

Figure 23:
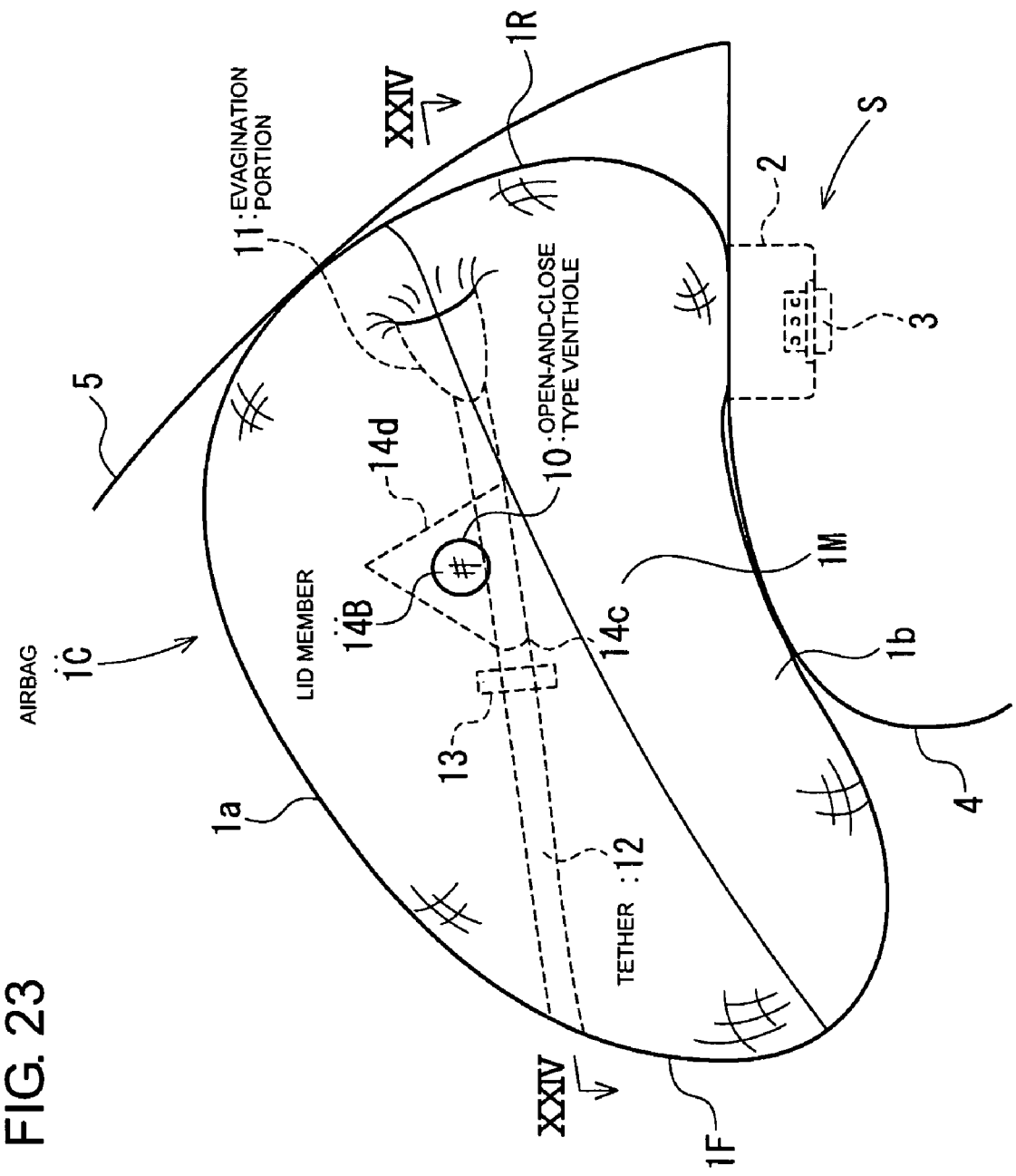
FIG. 23 is a side elevation illustrating the airbag and the airbag apparatus according to the embodiment.
Figure 24:
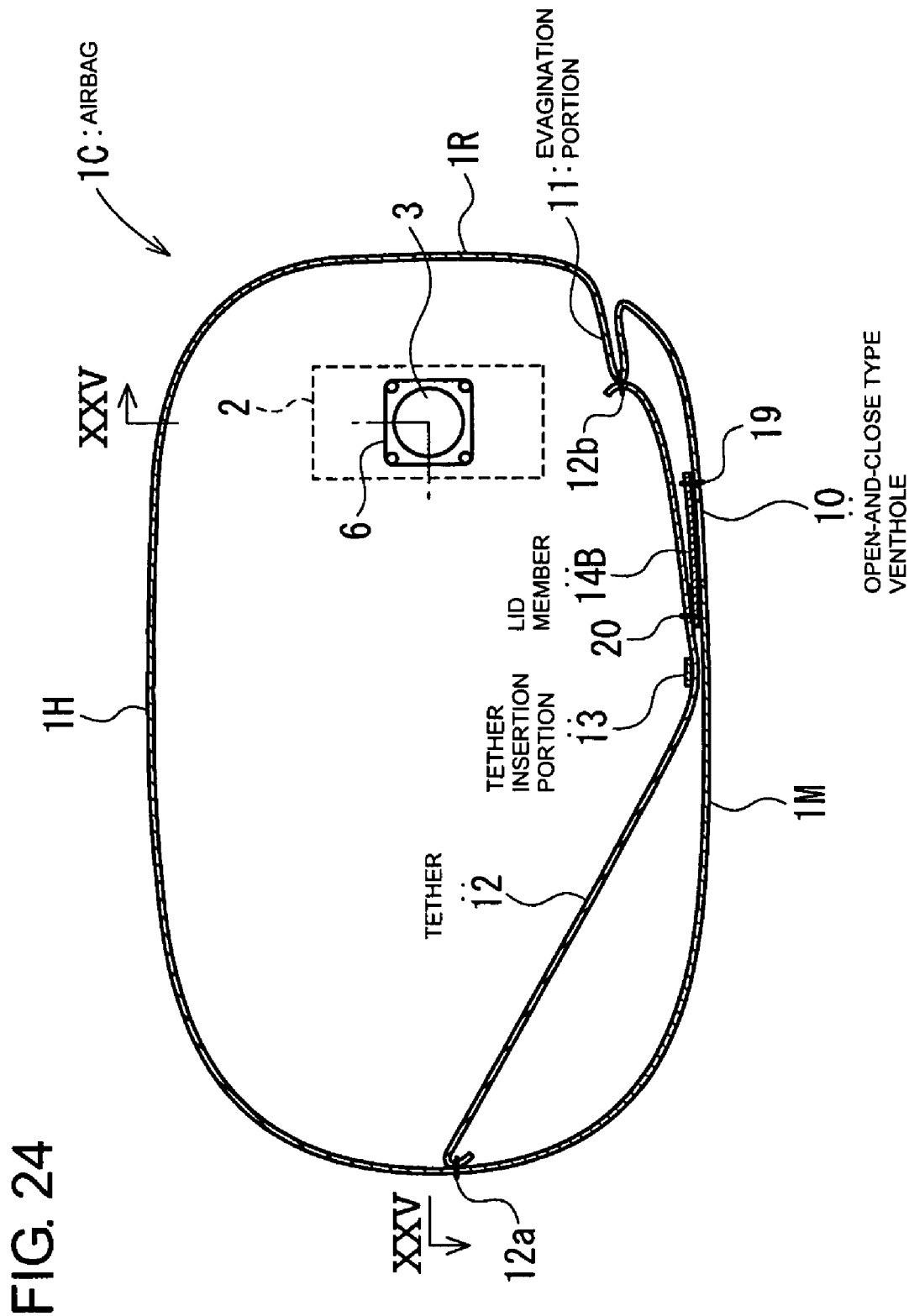
FIG. 24 is a cross-sectional view taken along a line XXIV-XXIV in FIG. 23.
Figure 25:
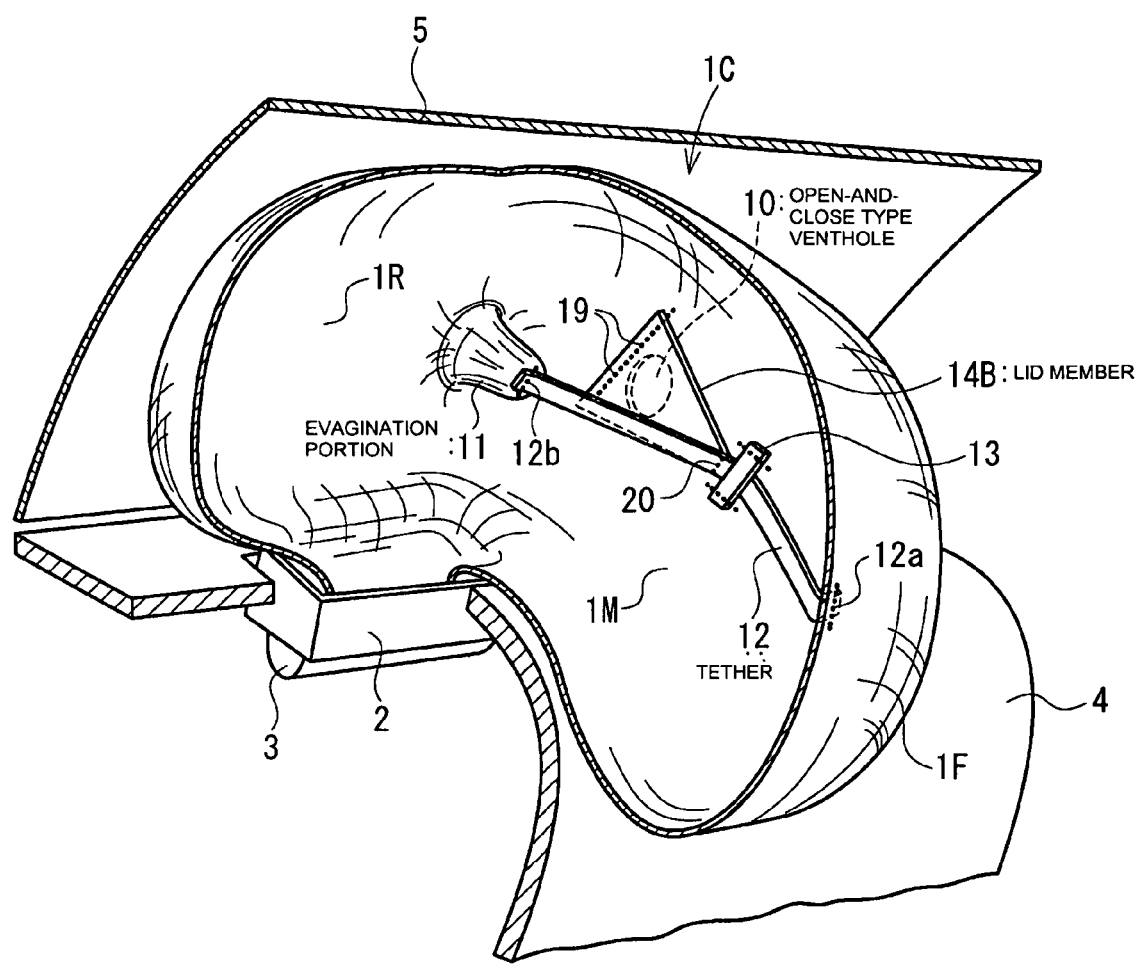
FIG. 25 is a cross-sectional perspective view taken along a line XXV-XXV in FIG. 24.
Figure 26:
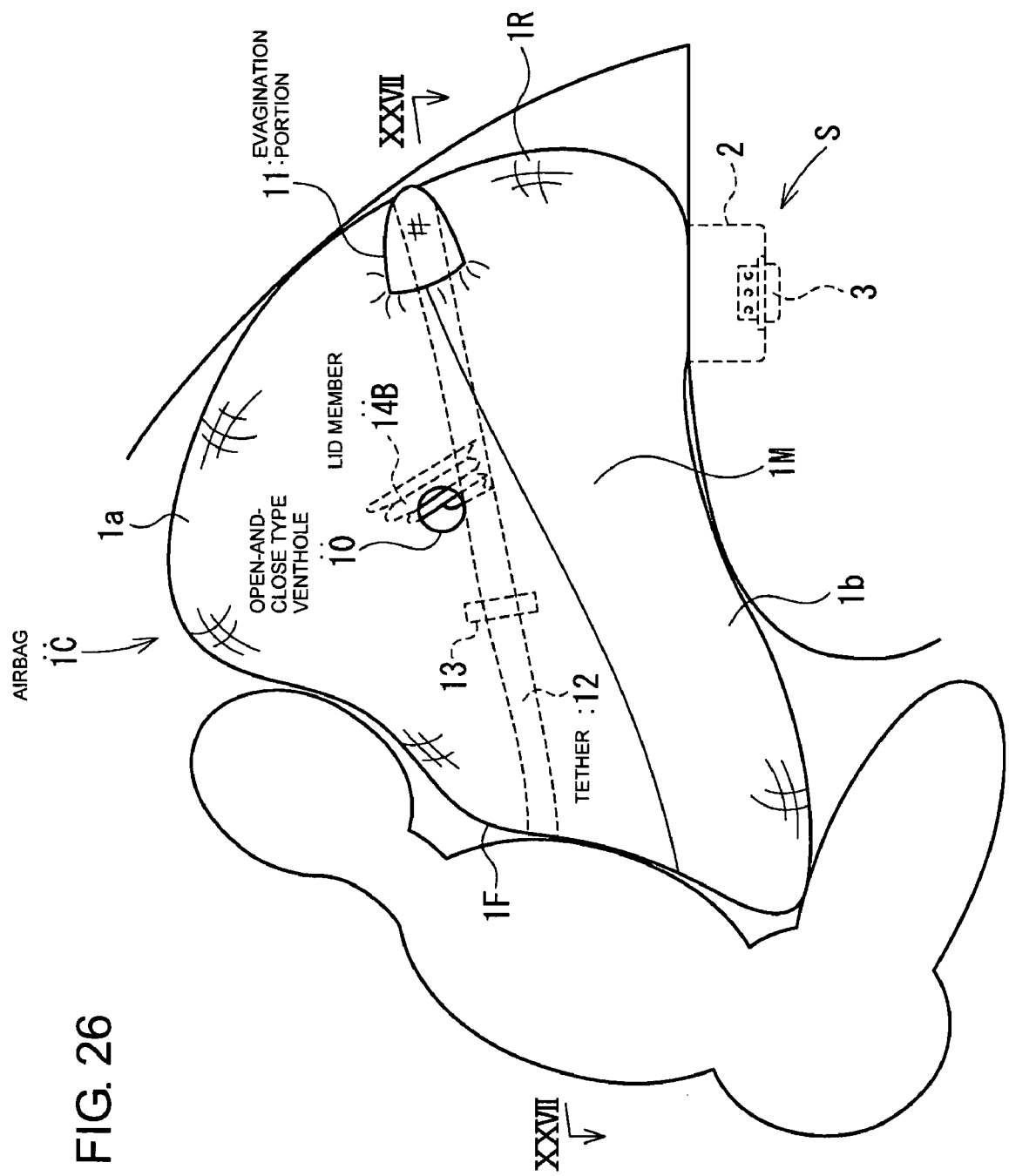
FIG. 26 is a side elevation illustrating the airbag and the airbag apparatus of FIG. 23.
Figure 27:
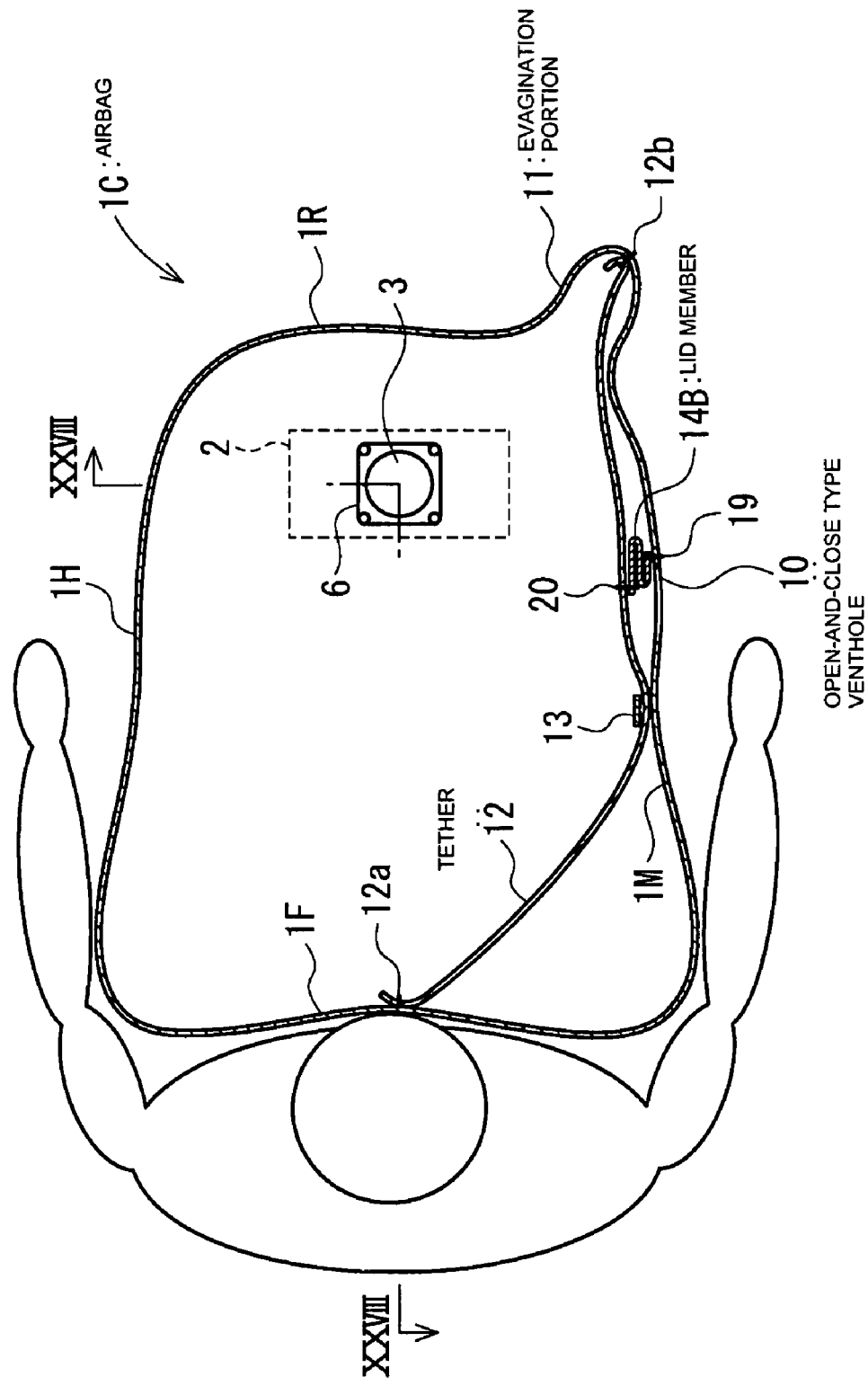
FIG. 27 is a cross-sectional view taken along a line XXVII-XXVII in FIG. 26.
Figure 28:
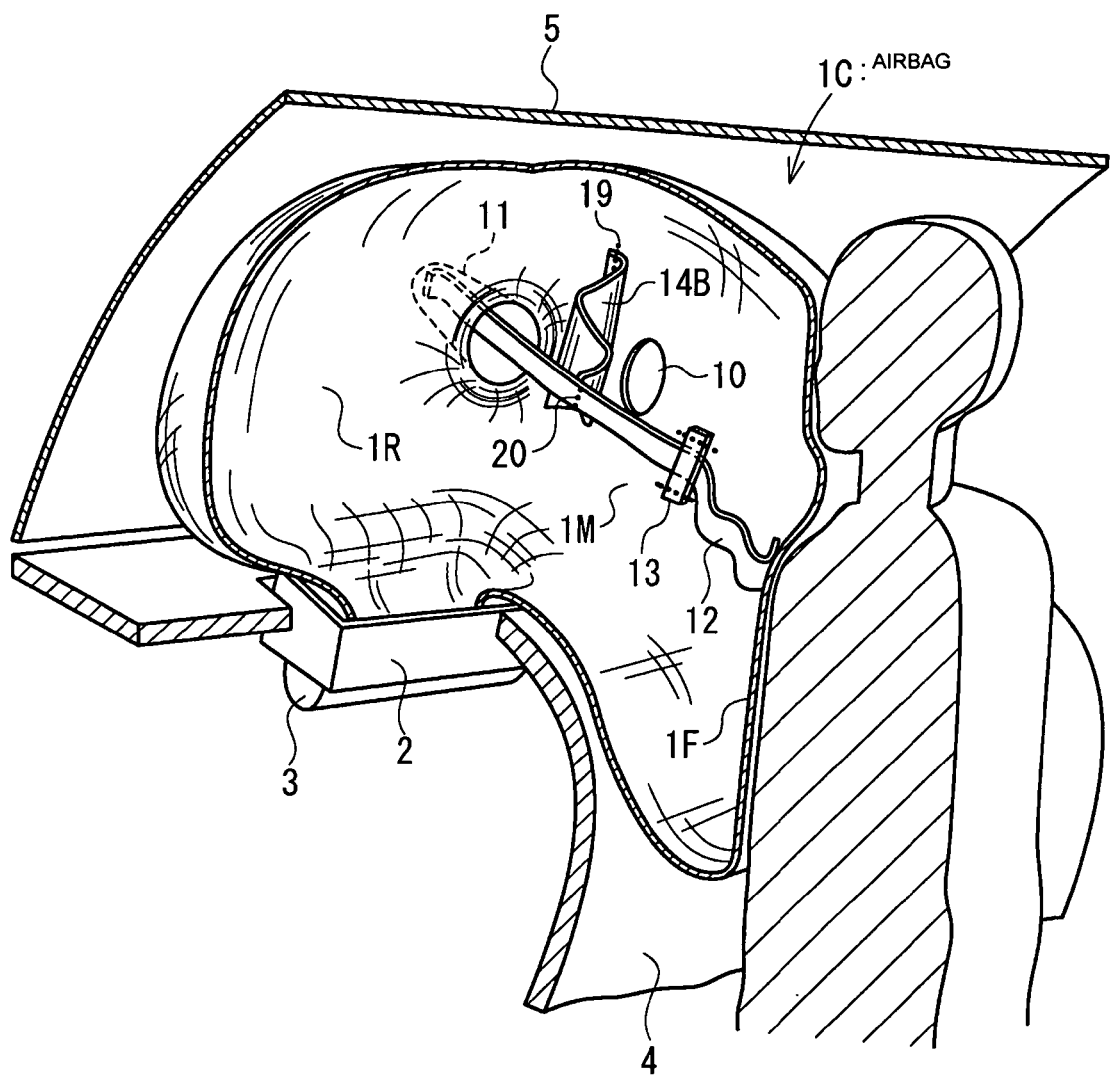
FIG. 28 is a cross-sectional perspective view taken along a line XXVIII-XXVIII in FIG. 24.

FIG. 23 is a side elevation illustrating the airbag and the airbag apparatus according to an exemplary embodiment, FIG. 24 is a cross-sectional view (approximately horizontal cross-sectional view) taken along a line XXIV-XXIV in FIG. 23, FIG. 25 is a cross-sectional perspective view taken along a line XXV-XXV in FIG. 24, FIG. 26 is a side elevation illustrating the airbag and the airbag apparatus of FIG. 23, FIG. 27 is a cross-sectional view (approximately horizontal cross-sectional view) taken along a line XXVII-XXVII in FIG. 26, and FIG. 28 is a cross-sectional perspective view taken along a line XXVIII-XXVIII in FIG. 27. FIGS. 23 through 25 illustrate a state before the occupant is brought into contact with the expanded airbag and FIGS. 26 through 28 illustrate a state after the occupant is brought into contact with the expanded airbag.

According to an exemplary embodiment, an airbag 1C includes a lid member 14B for covering the vent 10 and is coupled with a halfway portion of the tether 12 in a longitudinal direction serving as an interlocking member for connecting the rear surface 1F of the airbag 1B and a tip end side in the everting direction of the invertible portion 11.

The lid member 14B is constructed with an approximately triangular base cloth that is formed in a separate body from the tether 12. The lid member 14B is overlapped with the vent 10 from the inside of the airbag 1C in a posture in which, a corner portion 14c faces the side of the rear surface 1F of the airbag 1C, and an edge 14d that faces the corner portion 14c faces the side of the front surface 1R. As illustrated in FIG. 23, the lid member 14B has a size to cover the entire vent 10. The shape or the like of the lid member 14B is not limited to the above-described.

The lid member 14B is stitched to the peripheral edge portion of the vent 10 along the edge 14d on the side of the front surface 1R by a seam 19 formed from a stitching thread having relatively high strength, as illustrated in FIGS. 24 and 25, in such a way that a combination thereof cannot be released. The part of the lid member 14B other than the above-described is not combined with the peripheral edge portion of the vent 10.

The corner portion 14c of the lid member 14B is combined with the halfway portion in the longitudinal direction of the tether 12 by the stitching work or the like. A reference numeral 20 denotes the seam formed by the stitching work.

In the same manner as that of the above-described exemplary embodiments in FIGS. 1 through 5, the tether retainer 13 is provided at a portion in the vicinity of the vent 10 of the right side surface 1M of the airbag 1C and the halfway portion of the tether 12 is inserted into the tether retainer 13.

The approximately entire invertible portion 11 is also previously intruded into the airbag 1C when the same is folded back, and the airbag 1C is folded back in a state that the lid member 14B is overlapped with the vent 10. The construction of the airbag 1C other than the above-described portions may be generally similar to that of the airbag 1 in the above-described embodiments in FIGS. 1 through 5.

An operation of the passenger airbag apparatus S provided with the airbag 1C is as follows. At a time when the vehicle on which the passenger airbag apparatus S is mounted encounters a collision or the like, the inflator 3 is activated to blow out the gas and the airbag 1C starts to be expanded by the gas from the inflator 3. The airbag 1C pushes open the aforementioned lid and is expanded and developed from the upper surface of the instrument panel 4 to the occupant seated in the passenger seat.

Because the airbag 1C is also folded back in a state where the lid member 14B previously covers the vent 10, the airbag 1C is in a state that the vent 10 is closed by the lid member 14B from the initial stage of the expanding operation and a discharge of the gas from the vent 10 is limited. Thereby, the airbag 1C can be rapidly expanded.

The rear surface 1F is developed toward the side of the occupant seated in the passenger seat along with an expanding operation of the airbag 1C and thereby the tether 12 is pulled toward the side of the occupant seated in the passenger seat and the invertible portion 11 is blocked to be everted outside the airbag 1C, as illustrated in FIGS. 23 through 25. Further, the corner portion 14c side of the lid member 14B is pulled toward a direction separating from the edge 14d side by the tether 12 and the lid member 14B is brought to a state to be tensed along the airbag-inside surface of the aforementioned right side surface 1M of the airbag 1C. Thereby, the vent 10 is kept closed by the lid member 14B and the inside of the airbag 1C is kept at high inner pressure.

As illustrated in FIGS. 26 and 28, when the occupant seated in the passenger seat contacts the rear surface 1F of the expanded airbag 1C and the rear surface 1F is retreated by being pressed by the occupant seated in the passenger seat, the invertible portion 11 is allowed to be everted toward the opposite-to-occupant side by just that much and the invertible portion 11 is everted outside the airbag 1C by the gas pressure in the airbag 1C. Along with the everting operation of the invertible portion 11, the tether 12 is moved to the invertible portion 11 side by being pulled by the invertible portion 11, and following this operation the corner portion 14c side of the lid member 14B is moved to the invertible portion 11 side in a riding up manner. Thereby, the vent 10 is opened and the gas is discharged outside the airbag 1C. Thereby, the occupant seated in the passenger seat may be softly received by the airbag 1C.

In the airbag 1C, the gas pressure may be comparable to that of the inner pressure of the airbag 1C and is also constantly affecting the invertible portion 11 from the inside of the airbag 1C to the outside of the airbag 1C. Therefore, until the everting operation of the invertible portion 11 is complete, the lid member 14B is strongly pulled to the invertible portion 11 side by the invertible portion with the comparable force as that of the inner pressure of the airbag 1C. Thereby, the lid member 14B may be more assuredly moved to a predetermined position by being pulled by the invertible portion 11 and the vent 10 becomes more assuredly opened by a predetermined opening amount.

Figure 29:
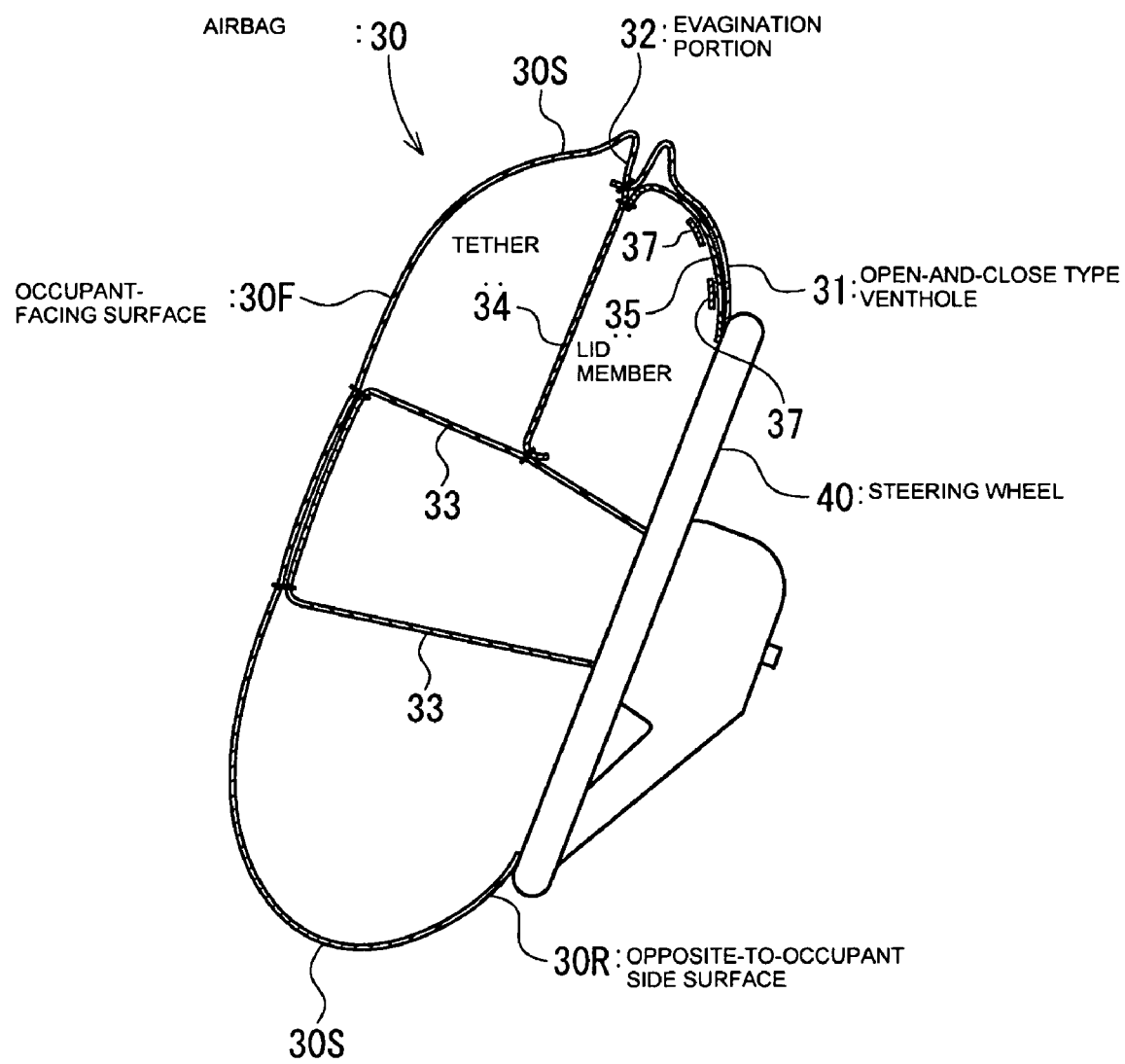
FIG. 29 is a cross-sectional view illustrating the airbag and the airbag apparatus according to the embodiment.
Figure 30:
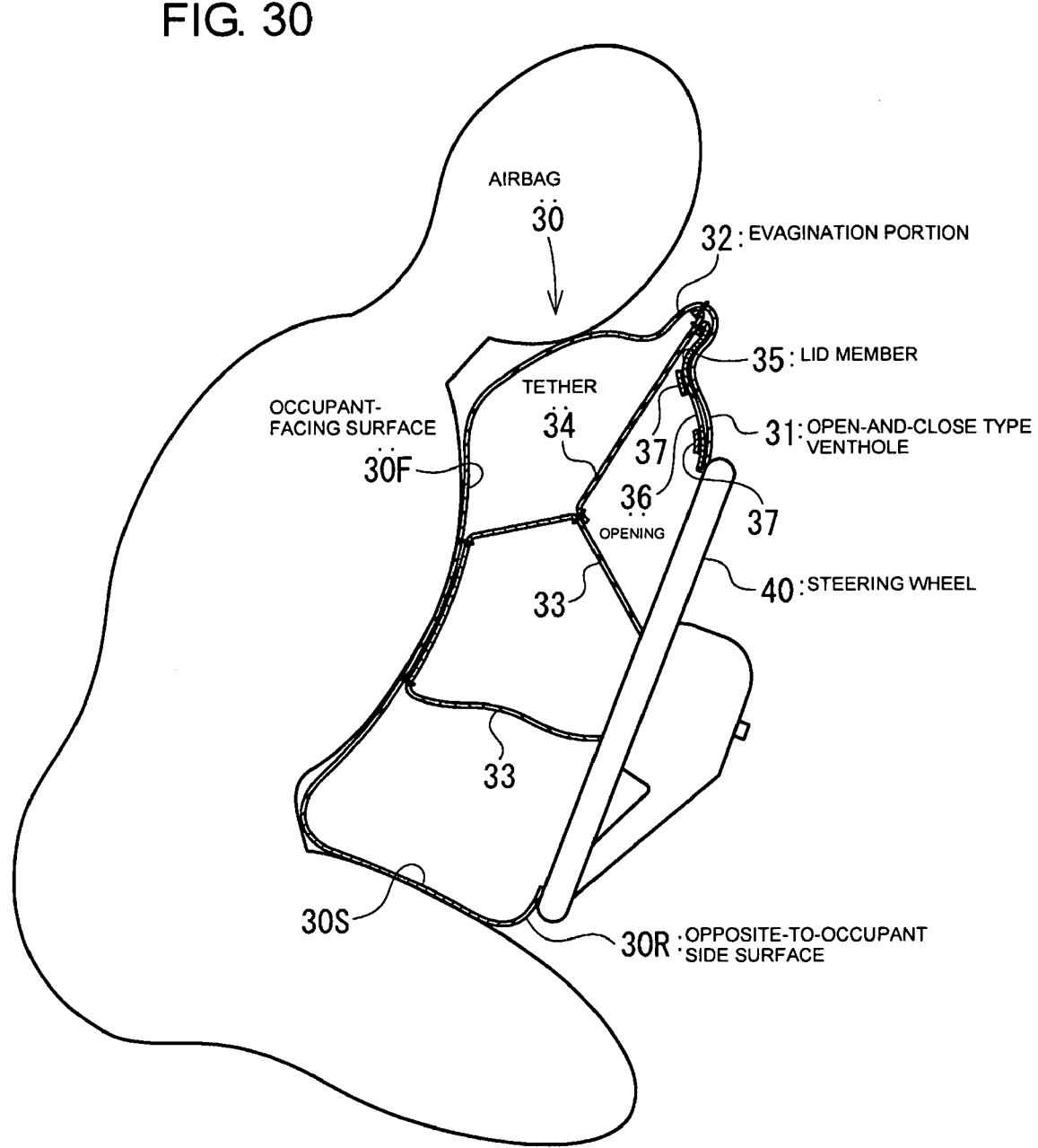
FIG. 30 is a cross-sectional view illustrating the airbag and the airbag apparatus of FIG. 29.

Although each of the aforementioned exemplary embodiments illustrates an example of the present invention to the passenger airbag and the passenger airbag apparatus of the vehicle, according to other exemplary embodiments the present invention is also applicable to airbags and the airbag apparatus other than is described above. FIGS. 29 and 30 illustrate an exemplary embodiment of the airbag for use in a driver's seat and an airbag apparatus for use in the driver's seat. FIGS. 29 and 30 are longitudinal cross-sectional views illustrating the airbag for use in the driver's seat and the airbag apparatus for use in the driver's seat according to an exemplary embodiment, respectively. FIG. 29 illustrates a state before the occupant is brought into contact with the expanded airbag, and FIG. 30 illustrates a state after the occupant is brought into contact with the expanded airbag.

The airbag 30 for use in the driver's seat is configured to be expanded to cover an occupant side of the steering wheel 40 of the vehicle. A vent 31 is provided in the opposite-to-occupant side surface 30R at a time when the airbag 30 is expanded, namely in a surface on the steering wheel 40 side. An invertible portion 32 capable of everting outside the airbag 30 is provided in a side peripheral surface at the time when the airbag 30 is expanded.

As illustrated in FIGS. 29 and 30, the vent 31 is disposed at an upper part relative to a center portion of the opposite-to-occupant side surface 30R in a state where the steering wheel 40 takes a steering posture at a time when the vehicle goes straight ahead. The invertible portion 32 (e.g., an evagination portion) is disposed on an upper surface of the airbag 30 at this time. However, the disposition of the vent 31 and the invertible portion 32 is not limited thereto. Hereinbelow, an upper and lower direction of the airbag 30 refers to an upper and lower direction in a state where the steering wheel 40 takes the steering posture at the time when the vehicle goes straight ahead.

A hanging strap 33 that couples the vicinity of a center of the rear surface 30F is provided in the airbag 30 at a time when the airbag 30 is expanded and the vicinity of a center of the opposite-to-occupant side surface 30R. The airbag 30 may include two hanging straps 33 while displacing the positions thereof in the upper and lower direction of the airbag 30. However, the number and the disposition of the hanging straps 33 are not limited thereto.

One end side of the tether 34 serves as an interlocking member and is coupled at a halfway portion of the upper side hanging strap 33. The other end of the tether 34 is coupled with a tip end side in the everting direction of the invertible portion 32. The one end side of the tether 34 may be directly coupled with an airbag-inside surface of the rear surface 30F.

A lid member 35 that covers the vent 31 is disposed on an inside of the airbag 30. The lid member 35 is formed into a belt-like shape and extends while passing transversely across the vent 31 in an airbag 30 in a radial direction of the airbag 30. An end portion of the lid member 35 on an airbag-outer periphery side is coupled with a tip end side in the everting direction of the invertible portion 32. In this airbag 30, the lid member 35 is moved toward an outer periphery side of the airbag 30 by being pulled by the invertible portion 32 when the invertible portion 32 is everted outside the airbag 30.

An opening 36 is provided at an end portion of the lid member 35 on the airbag-inner periphery side and overlaps with the vent 31 at a time when the lid member 35 is moved toward the airbag-outer periphery side.

Lid member insertion portions 37 are provided on the airbag-outer periphery side and the airbag-inner periphery side in the airbag-inside surface of the opposite-to-occupant side surface 30R, while sandwiching the vent 31. The airbag-outer periphery side and the airbag-inner periphery side of the lid member 35 relative to the vent 31 are respectively inserted into the lid member insertion portions 37.

When the airbag 30 is folded back, the approximately entire invertible portion 32 may be previously intruded into the airbag 30 and the airbag 30 is folded back in a state where the lid member 35 covers the vent 31.

A folded-back body of the airbag 30 and the inflator (illustration is omitted) are attached to the retainer (illustration is omitted), and a module cover (illustration is omitted) covers the folded-back body of the airbag 30 so the airbag apparatus can be used in the driver's seat. The airbag apparatus for use in the driver's seat can be installed on an occupant side of a center portion of the steering wheel 40.

An operation of the airbag apparatus for use in the driver's seat is as follows. When the vehicle encounters a collision or the like, the inflator is activated to blow out the gas and the airbag 30 starts to be expanded by the gas from the inflator. The airbag 30 pushes open the aforementioned module cover and is expanded and developed to cover the occupant side of the steering wheel 40.

Because the airbag 30 is also folded back in a state where the lid member 35 previously covers the vent 31, the airbag 30 is in a state that the vent 31 is closed by the lid member 35 from a time the airbag 30 starts to be expanded and the gas is limited to be discharged from the vent 31. Thereby, the airbag 30 can be rapidly expanded.

The rear surface 30F is developed toward the side of the occupant seated in the driver's seat along with the expanding operation of the airbag 30, and thereby the hanging strap 33 is tensed between the rear surface 30F and the opposite-to-occupant side surface 30R, the tether 34 is pulled toward an airbag-center side along with this operation, and the invertible portion 32 is blocked to be everted outside the airbag 30. As illustrated in FIG. 29, until the occupant seated in the driver's seat contacts the rear surface 30F of the expanded airbag 30, the vent 31 is kept closed by the lid member 35 and the inside of the airbag 30 is kept at high inner pressure.

As illustrated in FIG. 30, when the occupant seated in the driver's seat contacts the rear surface 30F of the expanded airbag 30 and the rear surface 30F is retreated by being pressed by the occupant seated in the driver's seat, the hanging strap 33 is loosened, the invertible portion 32 is allowed to be everted by just that much, and the invertible portion 32 is everted outside the airbag 30 by the gas pressure in the airbag 30. Because the lid member 35 is moved toward the airbag-outer periphery side by being pulled by the invertible portion 32 along with the everting operation of the invertible portion 32, the opening 36 overlaps the vent 31. Thereby, the gas is discharged outside the airbag 30 through the opening 36 and the vent 31 and the occupant seated in the driver's seat may be softly received by the airbag 30.

In the airbag 30, the gas pressure may be comparable with that of the inner pressure of the airbag 30 and may constantly affect the invertible portion 32 from the inside of the airbag 30 to the outside of the airbag 30. Therefore, until the everting operation of the invertible portion 32 is completed, the lid member 35 is strongly pulled to the airbag-outer periphery side by the invertible portion with the comparable force as that of the inner pressure of the airbag 30. Thereby, the lid member 35 is assuredly moved up to a predetermined position by being pulled by the invertible portion 32, and the vent 31 becomes to be assuredly opened by a predetermined opening amount.

Figure 31:
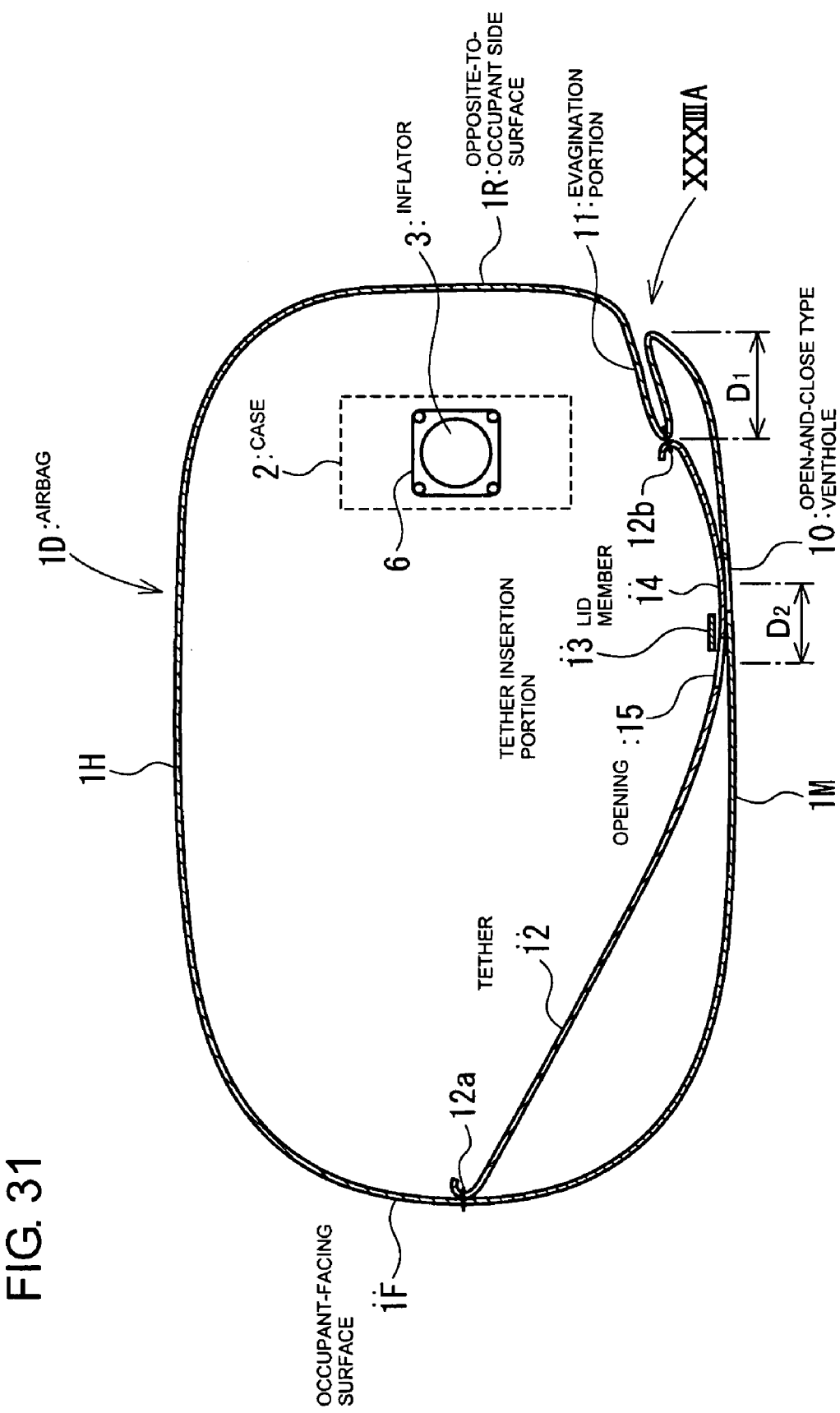
FIG. 31 is a horizontal cross-sectional view illustrating the airbag and the airbag apparatus according to still another embodiment.
Figure 32:
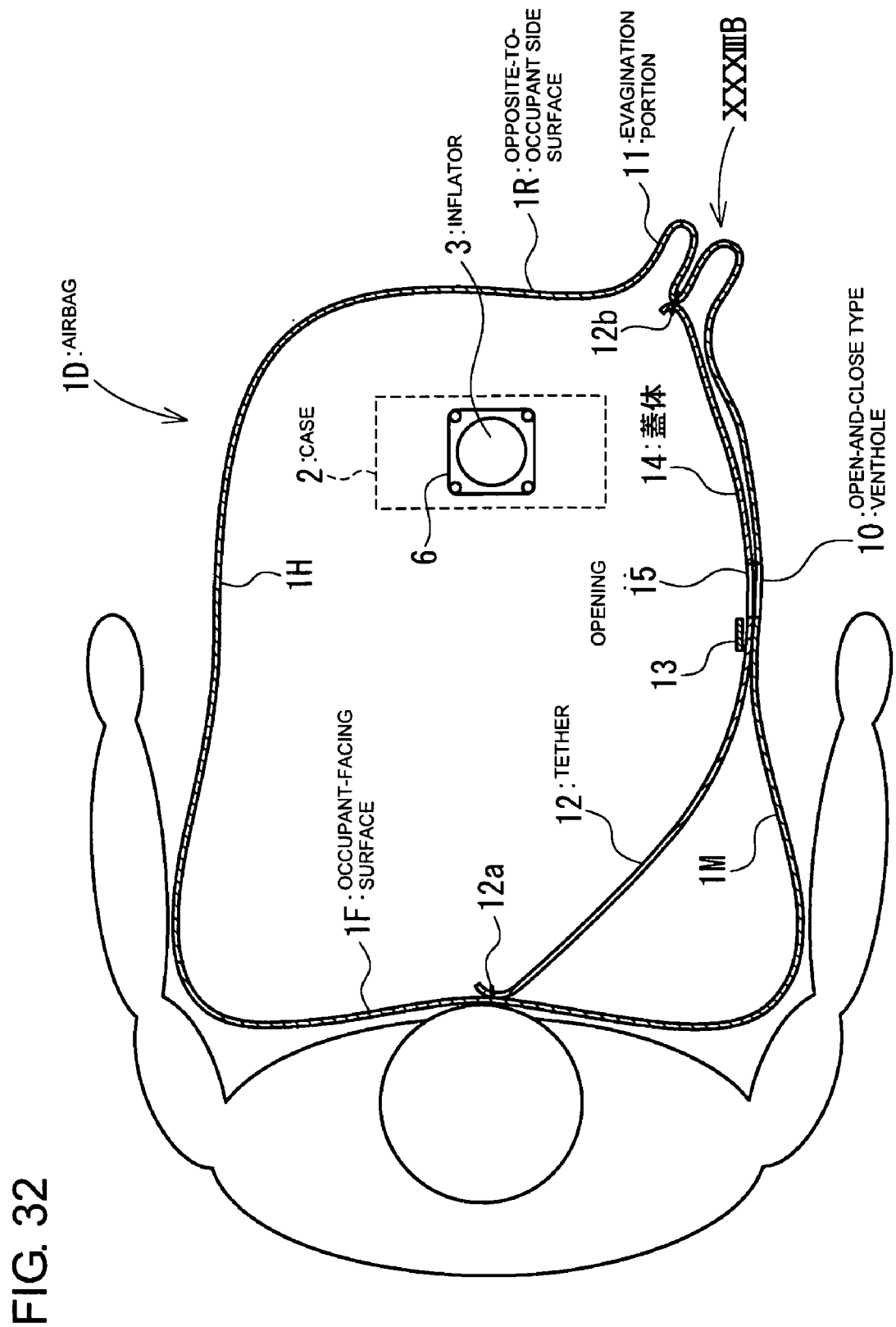
FIG. 32 is a horizontal cross-sectional view illustrating the airbag and the airbag apparatus of FIG. 31.

FIGS. 31 and 32 are approximately horizontal cross-sectional views illustrating the airbag and the airbag apparatus according to still another exemplary embodiment, FIGS. 33(a) and 33(b) are enlarged views illustrating a part XXXIIIA of FIG. 31 and a part XXXIIIB (in the vicinity of invertible portion) of FIG. 32, respectively. FIG. 31 illustrates a state before the occupant is brought into contact with the expanded airbag and FIG. 32 illustrates a state after the occupant is brought into contact with the expanded airbag. FIG. 33(a) illustrates a state where the invertible portion is pulled into the airbag and FIG. 33(b) illustrates a state where the invertible portion is everted outside the airbag until the vent is opened.

According to an exemplary embodiment, an airbag 1D has a length D1 in the everting direction of the invertible portion 11 (refer to FIG. 31 and FIG. 33(a)) that is configured to be larger than a moving distance D2 in which the lid member 14 moves from a position where the lid member 14 closes the vent 10 to a position where the opening 15 on the rear end side of the lid member 14 is overlapped with the vent 10 in an approximately concentric manner, when the airbag 1D is in a state that the approximately entire invertible portion 11 is everted outside the airbag 1D. It is preferable to form a maximum everting length D1 of the invertible portion 11 to be longer than the moving direction D2 of the lid member 14 by about 10 mm to about 300 mm or by about 40 mm to about 200 mm.

The construction of the airbag 1D other than the structure described above is similar to that of the airbag 1 in FIGS. 1 through 5 and the same numerals as that in FIGS. 1 through 5 used in FIGS. 31 and 32 denote the same elements.

An operation of the passenger airbag apparatus provided with the airbag 1D may be similar to that of the embodiments in FIGS. 1 through 5 except that when the invertible portion 11 is everted outside the airbag 1D, the lid member 14 is moved up to a position where the opening 15 is overlapped with the vent 10 before the approximately entire invertible portion 11 is everted outside the airbag 1D.

That is, at a time when the vehicle encounters a collision or the like, the inflator 3 is also activated to blow out the gas, and the airbag 1D starts to be expanded by the gas from the inflator 3. The airbag 1D pushes open the lid and is expanded and developed from the upper surface of the instrument panel 4 to the occupant seated in the passenger seat.

The airbag 1D is also folded back in a state that the lid member 14 previously covers the vent 10. Therefore, the airbag 1D is in a state where the vent 10 is closed by the lid member 14 from a time the airbag 1D starts to be expanded and the gas is limited to be discharged from the vent 10. Thereby, the airbag 1D can be rapidly expanded.

The rear surface 1F is developed toward the side of the occupant seated in the passenger seat along with an expanding operation of the airbag 1D and thereby the tether 12 is pulled toward the side of the occupant seated in the passenger seat and the invertible portion 11 is blocked to be everted outside the airbag 1D. As illustrated in FIG. 31, until the occupant seated in the passenger seat contacts the rear surface 1F of the expanded airbag 1D, the vent 10 is kept closed by the lid member 14 and the inside of the airbag 1D is kept at high inner pressure.

As illustrated in FIG. 32, when the occupant seated in the passenger seat contacts the rear surface 1F of the expanded airbag 1D and the rear surface 1F is retreated by being pressed by the occupant seated in the passenger seat, the invertible portion 11 is allowed to be everted toward the opposite-to-occupant side by just that much and the invertible portion 11 is everted outside the airbag 1D by the gas pressure in the airbag 1D. Since the tether 12 is moved toward the invertible portion 11 side by being pulled by the invertible portion 11 along with the everting operation of the invertible portion 11, the opening 15 becomes to be overlapped with the vent 10. The gas is discharged outside the airbag 1D through the opening 15 and the vent 10 and the occupant seated in the passenger seat may be softly received by the airbag 1D.

In the airbag 1D, the gas pressure is comparable to that of the inner pressure of the airbag 1D and may constantly affect the invertible portion 11 from the inside of the airbag 1D to the outside of the airbag 1D. Therefore, the tether 12 is strongly pulled to the invertible portion 11 side by the invertible portion with the comparable force as that of the inner pressure of the airbag 1D. The tether 12 may be more assuredly moved up to a predetermined position by being pulled by the invertible portion 11 and the vent 10 may be more assuredly opened by a predetermined opening amount.

In the airbag 1D, the maximum everting length D1 of the invertible portion 11 is formed to be longer than the moving direction D2 in which the lid member 14 moves from the position where the lid member 14 closes the vent 10 to the position where the opening 15 is overlapped with the vent 10. Accordingly, as illustrated in FIG. 32, even when the lid member 14 is pulled and moved by the invertible portion 11 until the opening 15 is overlapped with the vent 10, the invertible portion 11 may not be completely everted outside the airbag 1D and the tip end side thereof may still be positioned in the inside of the airbag 1D or in the inside of a base end side of the invertible portion 11.

As described above, it is preferable that the maximum everting length D1 of the invertible portion 11 is longer then the moving distance D2 of the lid member 14 by about 10 mm to about 300 mm or by about 40 mm to about 200 mm. In this case, after the lid member 14 is moved until the vent 10 is opened, the tip end side of the invertible portion 11 remains in the inside of the airbag 1D or in the inside of the base end side of the invertible portion 11 across a length D3 (refer to FIG. 33(b)) of, preferably, from about 5 mm to about 150 mm, and more preferably, from about 20 mm to about 100 mm without being everted outside the airbag 1D.

Because the invertible portion 11 also continues to pull the tether 12 to try to be further everted outside the airbag 1D even after the lid member 14 is moved until the vent 10 is opened, the lid member 14 is more assuredly held at a vent-open position.

The airbag 1D may have a comparable operation and the advantages of the airbag 1 in FIGS. 1 through 5. Although the airbag 1D may be constructed in a similar way to the airbag 1 in FIGS. 1 through 5, the maximum everting length D1 of the invertible portion 11 is configured to be larger than the moving distance D2 of the lid member 14, even in each of the exemplary embodiments in the above described FIGS. 6 through 9, FIGS. 10 through 14, FIGS. 15 through 22, FIGS. 23 through 28, and FIGS. 29 and 30 the maximum everting lengths of the respective invertible portions 11 and 32 are configured to be larger than the moving distances of the lid members 14, 14A, 14B, and 35, respectively, until the vents 10 and 31 are opened by respective predetermined amounts. Even in a case that the invertible portions 11 and 32 are brought into contact with the interior members in a vehicle room such as the windshield 5 or the like when being everted, the tethers 12 and 34 may be constantly pulled in the everting direction of the invertible portion 11.

Figure 34:
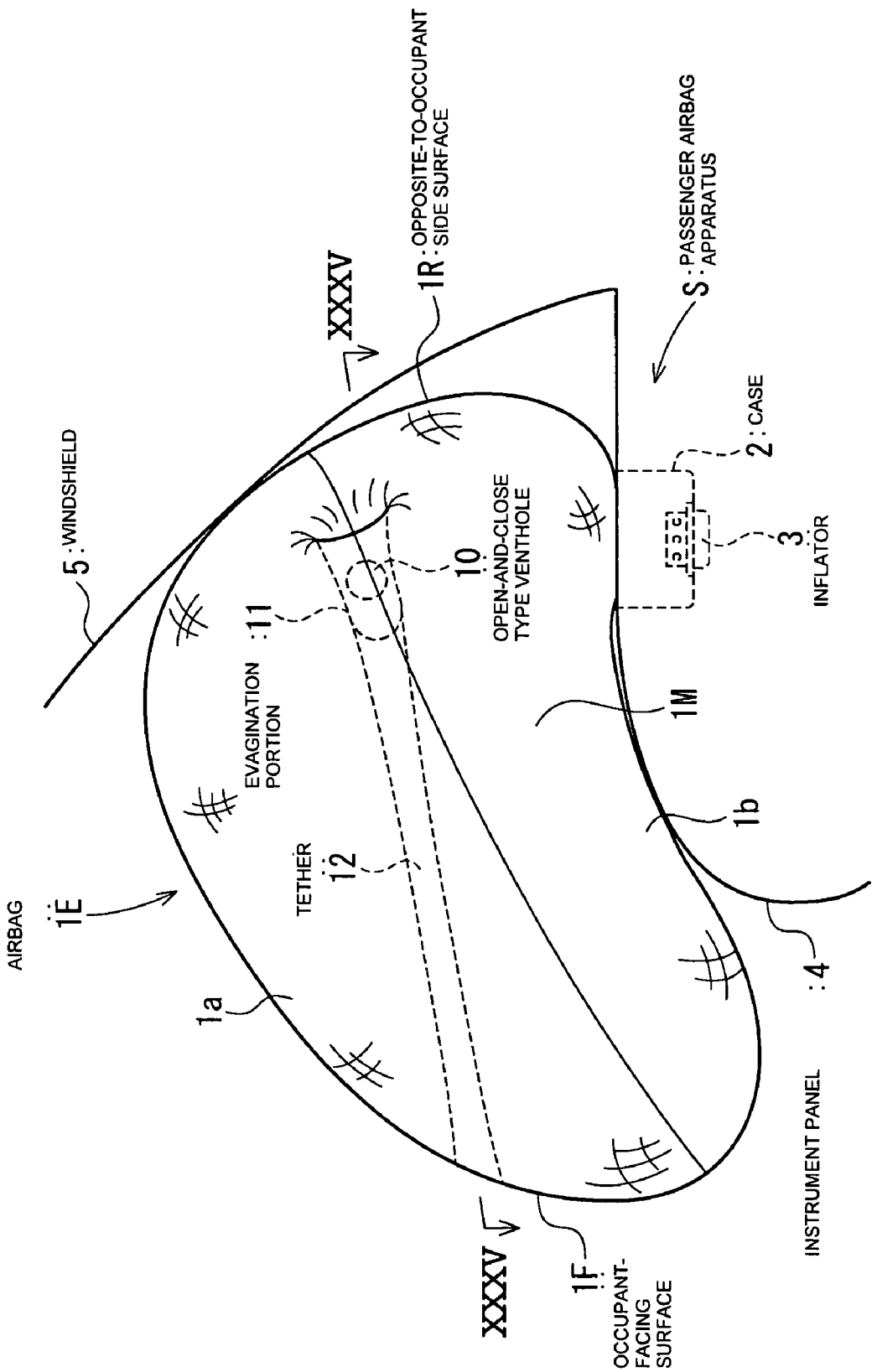
FIG. 34 is a cross-sectional view illustrating the airbag and the airbag apparatus according to another embodiment.
Figure 35:
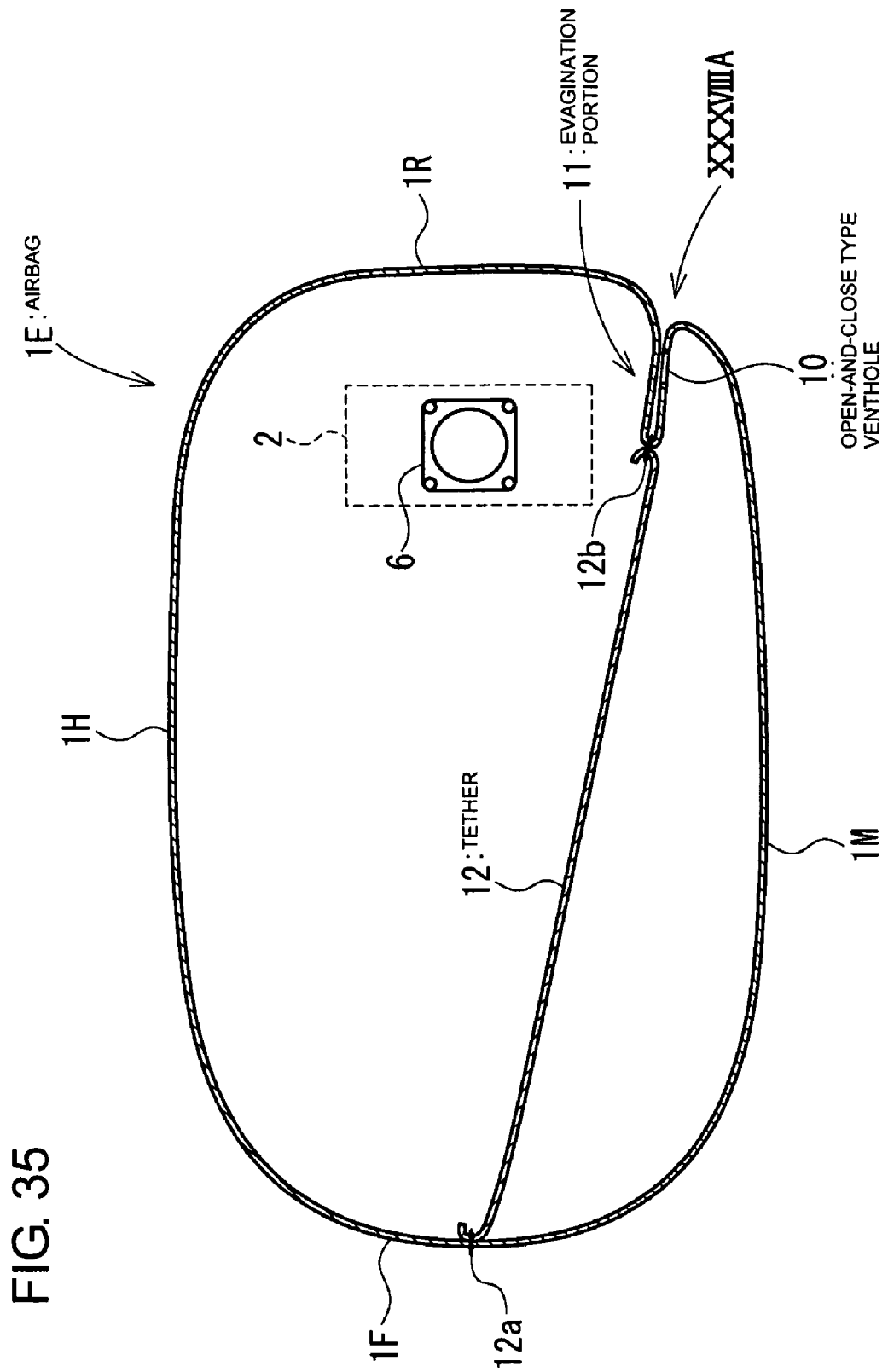
FIG. 35 is a cross-sectional view taken along a line XXXV-XXXV in FIG. 34.
Figure 36:
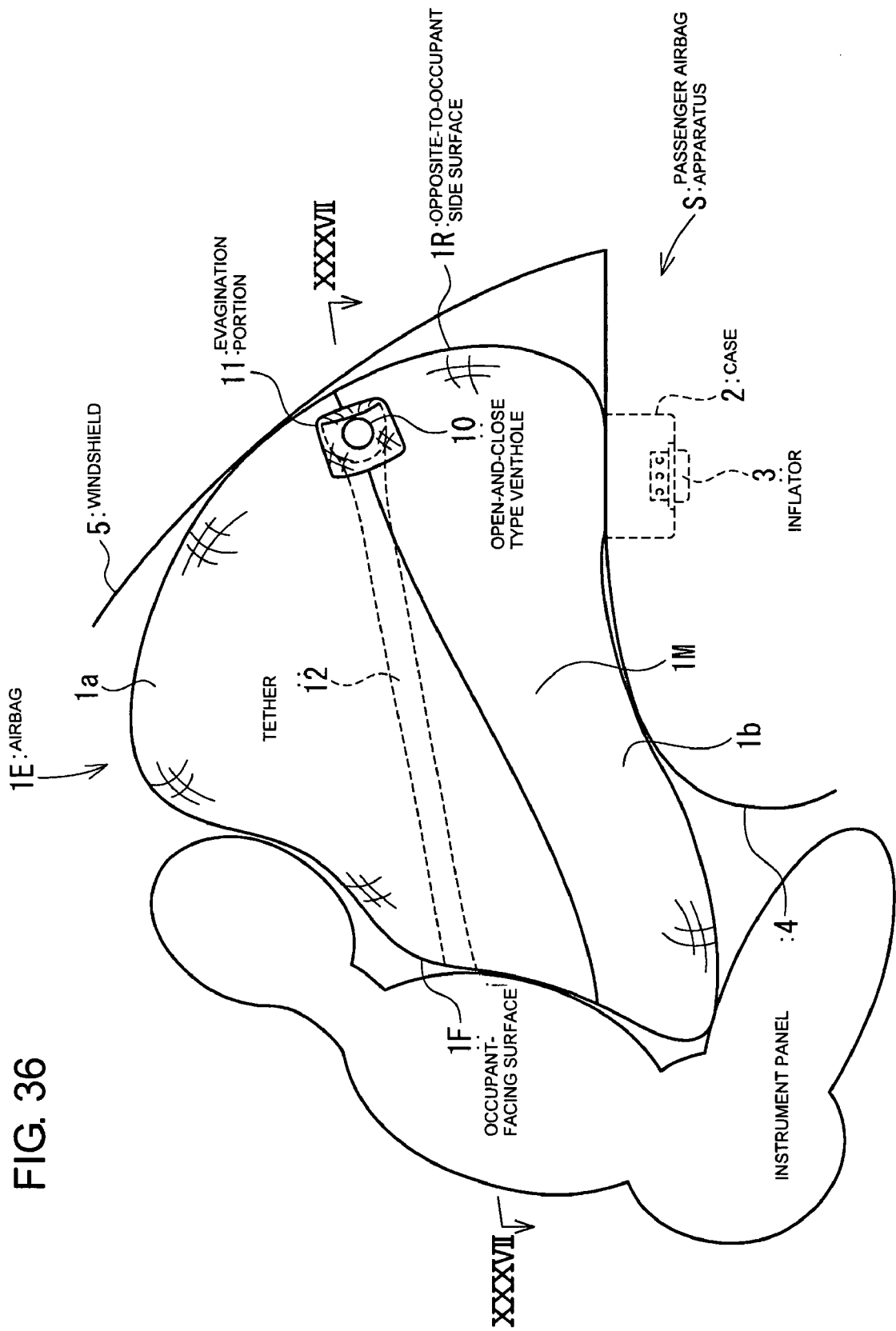
FIG. 36 is a side elevation illustrating the airbag and the airbag apparatus of FIG. 34.
Figure 37:
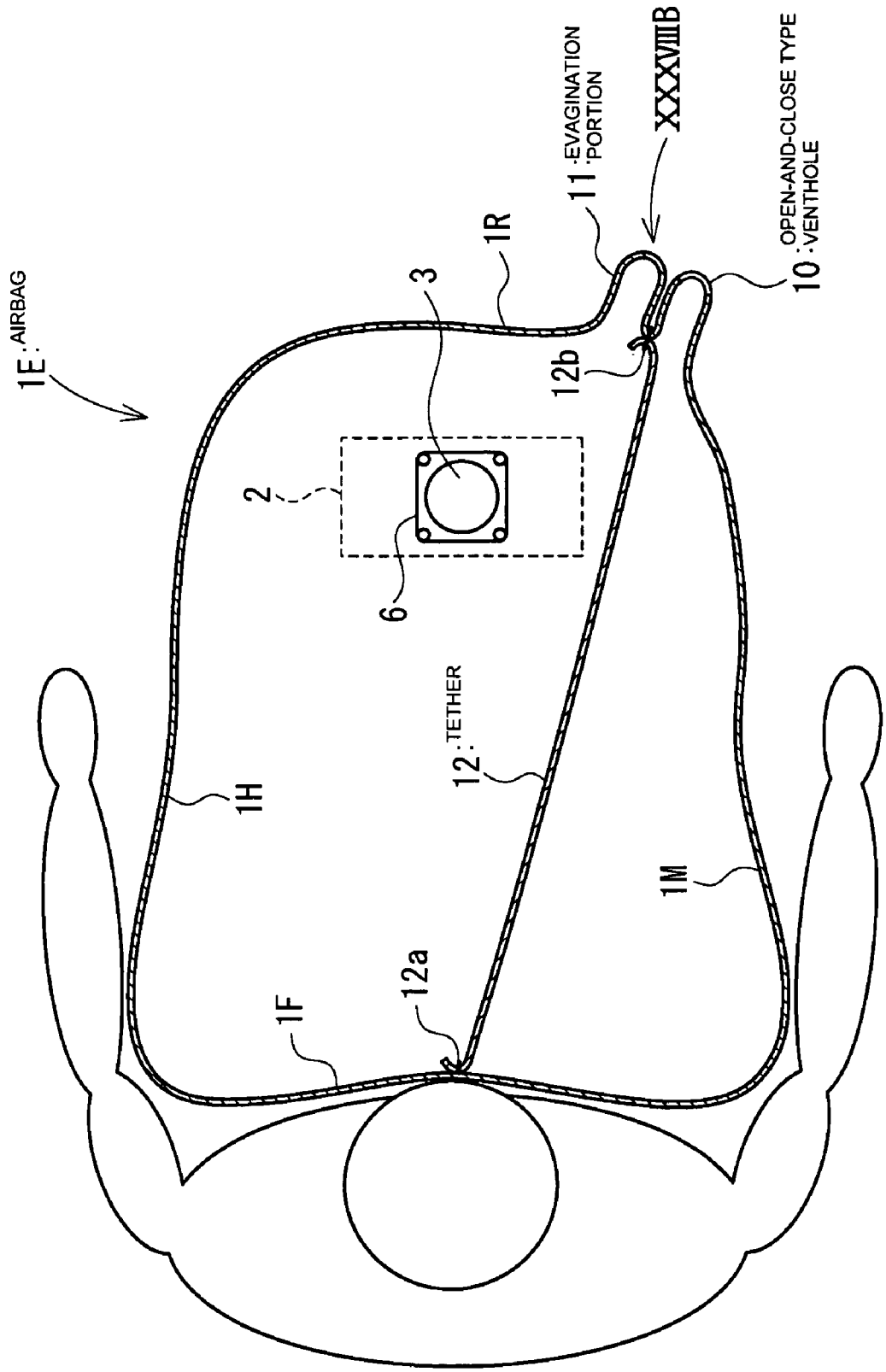
FIG. 37 is a cross-sectional view taken along a line XXXVI-XXXVI in FIG. 35.

FIG. 34 is a cross-sectional view illustrating the airbag and the airbag apparatus according to another exemplary embodiment, FIG. 35 is a cross-sectional view (approximately horizontal cross-sectional view) taken along a line XXXV-XXXV in FIG. 34, and FIG. 36 is a side elevation illustrating the airbag and the airbag apparatus of FIG. 34. FIG. 37 is a cross-sectional view (approximately horizontal cross-sectional view) taken along a line XXXVII-XXXVII in FIG. 36, and FIG. 38(a) and FIG. 38(b) are enlarged views illustrating a part XXXVIIIA of FIG. 35 and a part XXXVIIIB (in the vicinity of invertible portion) of FIG. 37, respectively. FIGS. 34 and 35 illustrate a state before the occupant is brought into contact with the expanded airbag, and FIGS. 36 and 37 illustrate a state after the occupant is brought into contact with the expanded airbag. Further, FIG. 38(a) illustrates a state where the invertible portion is pulled into the inside of the airbag, and FIG. 38(b) illustrates a state where the invertible portion is everted outside the airbag until the vent is exposed to the outside of the airbag.

According to an exemplary embodiment, an airbag 1E may be a passenger airbag of a vehicle. The airbag 1E is provided with the vent 10 for causing the gas to be discharged outside the airbag 1E from the inside of the airbag 1E. The invertible portion 11 is provided in the front surface 1R of the airbag 1E and capable of everting toward the outside from the airbag 1E by the gas pressure in the airbag 1E. The tether 12 is an interlocking member for connecting the rear surface 1F of the airbag 1E and the tip end side in the everting direction of the invertible portion 11 while passing through inside the airbag 1E.

In the airbag 1E, the vent 10 is provided in the invertible portion 11 and is formed to allow the inside and outside of the invertible portion 11 to communicate with each other. The vent 10 is configured to cause the gas to be discharged from the inside of the airbag 1E to the outside thereof while passing through the inside of the invertible portion 11.

As illustrated in FIGS. 34, 35, and 38(a) the vent 10 is provided in a halfway portion of the invertible portion 11 in the everting direction. As illustrated in FIG. 38(a), it is preferable to form a distance D4 from the base end side of the invertible portion 11 to a center of the vent 10 to be about 5% to about 90% of the maximum everting length D1 of the invertible portion 11, and specifically, from about 20% to about 50% thereof.

Although a vent for allowing the inside and outside of the airbag 1B to communicate with each other is not provided in a portion other than that in the invertible portion 11 of the airbag 1E, the vent may also be provided in the portion other than that in the invertible portion 11.

When the airbag 1B is folded back, the airbag 1B is folded back in a state where the approximately entire invertible portion 11 is previously intruded into the airbag 1E. Incidentally, the folding back method of the airbag 1E is arbitrary and is not limited to a specific folding back method.

The construction of the airbag 1E other than structure of the above-described exemplary embodiments may be the same as that of the above-described airbag 1 in FIGS. 1 through 5, and the same numerals as that in FIGS. 1 through 5 used in FIGS. 34 through 38(b) denote the same elements.

An operation of the passenger airbag apparatus S where the thus constructed airbag 1E is provided is as follows. At a time when the vehicle on which the passenger airbag apparatus S is mounted encounters a collision or the like, the inflator 3 is activated to blow out the gas and the airbag 1E starts to be expanded by the gas from the inflator 3. The airbag 1E pushes open the lid and is expanded and developed from the upper surface of the instrument panel 4 to the occupant seated in the passenger seat.

Because the airbag 1B is folded back in the state that the approximately entire invertible portion 11 is previously intruded into the airbag 1E, the vent 10 is not exposed to the outside of the airbag 1E from an initial stage of an expanding operation of the airbag 1E. As a result, the discharge of the gas from the vent 10 is limited, and thereby the airbag 1E can be rapidly expanded.

The rear surface 1F is developed toward the side of the occupant seated in the passenger seat along with the expanding operation of the airbag 1E, the tether 12 is pulled toward the side of the occupant seated in the passenger seat, and the invertible portion 11 is blocked to be everted outside the airbag 1E. As illustrated in FIGS. 34 and 35, until the occupant seated in the passenger seat contacts the rear surface 1F of the expanded airbag 1E, the vent 10 is kept to be disposed in the airbag 1E and the gas from the vent 10 is limited to be discharged. Therefore, the inside of the airbag 1E can be kept at high inner pressure.

At this moment, the invertible portion 11 disposed in the airbag 1E can be crushed by the gas pressure in the airbag 1E. As illustrated in FIG. 38(*a*), a portion in the invertible portion 11 that faces the vent 10 is pressed to the vent 10 and a closing capability of the vent 10 becomes high.

As illustrated in FIGS. 36 and 37, when the occupant seated in the passenger seat contacts the rear surface 1F of the expanded airbag 1E and the rear surface 1F is retreated by being pressed by the occupant seated in the passenger seat, the invertible portion 11 is allowed to be everted toward the opposite-to-occupant side and the invertible portion 11 is everted outside the airbag 1E by the gas pressure in the airbag 1E. Therefore, the invertible portion 11 is everted outside the airbag 1E and the vent 10 also becomes to be exposed to the outside of the airbag 1E. As a result, the gas becomes to be discharged outside the airbag 1E while passing through the inside of the invertible portion 11 and the vent 10 and the occupant seated in the passenger seat can be softly received by the airbag 1E.

In the airbag 1E, a gas pressure may be comparable to that of the inner pressure of the airbag 1E and also constantly affect the invertible portion 11 from the inside of the airbag 1E to the outside of the airbag 1E. Therefore, the invertible portion 11 is strongly pushed out toward the outside of the airbag 1E with the gas pressure. The vent 10 may be more assuredly exposed to the outside of the airbag 1E and the vent 10 may be more assuredly opened by a predetermined opening amount.

As illustrated in FIG. 38(*a*), the vent 10 is provided at the halfway portion in the everting direction of the invertible portion 11. Therefore, as illustrated in FIGS. 36 and 37, and FIG. 38(*b*), even when the invertible portion 11 is everted outside the airbag 1E until the vent 10 is exposed to the outside of the airbag 1E, the invertible portion 11 may not be completely everted outside the airbag 1E and the tip end side of the invertible portion 11 may still be positioned in the inside of airbag 1E or the inside of the base end side of the invertible portion 11. Because the invertible portion 11 continues to try to be further everted outside the airbag 1E even after the invertible portion 11 is everted outside the airbag 1E until the vent 10 is exposed to the outside of the airbag 1E, the vent 10 is held in state to be assuredly exposed to the outside of the airbag 1E. The vent 10 may be provided at a tip end portion of the invertible portion 11.

Because the lid member for covering the vent 10 may not be necessary, a smaller number of constructional elements of the airbag 1E may be required, and a constructional cost of the airbag 1E may be reduced and the manufacturing process can be simplified.

Although a single vent 10 is illustrated in the invertible portion 11, according to other exemplary embodiments two or more vents 10 may be provided. A constant open type vent that is not opened and closed along with a moving operation of the invertible portion 11 may be provided at a portion in the airbag 1E other than that in the invertible portion 11. Although a single invertible portion 11 is illustrated, according to other exemplary embodiments two or more invertible portions 11 may be provided. Although the invertible portion 11 is provided in the front surface 1R of the airbag 1E and is configured to be everted toward a front side of the vehicle, the disposition and the everting direction of the invertible portion 11 is not limited thereto and, for example, the invertible portion 11 may be provided in a side surface of the airbag 1E and may be configured to be everted toward a lateral side of the airbag 1E.

The priority application, Japanese Patent Application No. 2008-189977, filed Jul. 23, 2008 including the specification, drawings, claims and abstract, is incorporated herein by reference in its entirety.

Although the exemplary embodiments illustrate constructional examples where a vent is provided at an invertible portion in a passenger airbag, the vent may be provided at the invertible portion in an airbag for use in a driver's airbag.

Each of the aforementioned individual exemplary embodiments is only illustrative of the present invention and the present invention is not limited to the aforementioned individual exemplary embodiments. For example, although a single vent is provided, multiple vents may be used. In the aforementioned individual embodiments, a constant open type vent constantly allowing an inside and an outside of the airbag to communicate with each other may be provided.

Although a lid member is configured to close an entire vent, the lid member may be configured to change an opening amount of the vent from a large opening amount to a small opening amount. For example, a construction may be made in such a way that even when the lid member is overlapped with the vent, the vent is partially protruded from the lid member and a gas is allowed to be discharged from the protruded portion. Alternatively, the construction may be made in such a way that a hole having a smaller diameter than that of the vent is formed in the lid member at a position overlapping with the vent and the gas is allowed to be discharged through the hole even in a state that the lid member is overlapped with the vent.

Although each vent is formed to have an approximately round opening, a shape of each vent is not limited thereto, and a shape other than a round shape, for example, a slit shape or the like may be used.

Although the aforementioned exemplary embodiments describe an airbag and an airbag apparatus for use in a passenger seat and a driver's seat of the vehicle, the present invention is also applicable to various airbags and airbag apparatuses other than the above-described, for example, to an airbag and an airbag apparatus for use in a rear seat of the vehicle.

What is claimed is:

1. An airbag, comprising:
   an open-and-close type vent; and
   a gas discharge limitation member configured to limit a gas discharged from the vent, the airbag being constructed in such a way that when the airbag is expanded the gas discharge limitation member closes the vent or opens the vent by a small amount when an occupant is not in contact with an occupant-facing surface of the airbag and when the occupant is brought into contact with the occupant-facing surface of the expanded airbag, thereby the occupant-facing surface retreats in an opposite-to-occupant direction, the gas discharge limitation member opening the vent by at least a large amount and discharging the gas from the airbag through the vent, the gas discharge limitation member comprising:

at least one invertible portion provided in a surface on a side opposite to the occupant-facing surface of the airbag or a side surface of the airbag when the airbag is expanded and capable of being everted toward the outside of the airbag;

an interlocking member for interlocking a moving operation of the occupant-facing surface in an occupant direction and an opposite-to-occupant direction and for interlocking a moving operation of the invertible portion inwardly of the airbag and outwardly of the airbag when the airbag is expanded; and a lid member covering the vent and capable of being pulled by the invertible portion when the invertible portion is everted towards the outside of the airbag, wherein the lid member is constructed to close the vent or open the vent by a small amount until the lid member is pulled by the invertible portion and is constructed to open the vent by at least a large amount by pulling the lid member with the invertible portion, and wherein in a state that an approximately entire invertible portion is everted outside the airbag, a length in an everting direction of the invertible portion is formed to be larger than a moving distance where the lid member moves from a position at which the lid member closes the vent or opens the vent by a small amount to a position at which the lid member opens by at least a large amount.

2. The airbag according to claim 1, wherein in the state that the approximately entire invertible portion is everted outside the airbag, the length in the everting direction of the invertible portion is formed to be larger than the moving distance where the lid member moves from the position at which the lid member closes the vent or opens the vent by the small amount to the position at which the lid member opens the vent by an amount between 10 mm to 300 mm.

3. The airbag according to claim 1, wherein the interlocking member comprises a tether for connecting the occupant-facing surface and a tip end side in the everting direction of the invertible portion.

4. An airbag, comprising:

an open-and-close type vent; and a gas discharge limitation member configured to limit a gas discharged from the vent, the airbag being constructed in such a way that when the airbag is expanded the gas discharge limitation member closes the vent or opens the vent by a small amount when an occupant is not in contact with an occupant-facing surface of the airbag and when the occupant is brought into contact with the occupant-facing surface of the expanded airbag, thereby the occupant-facing surface retreats in an opposite-to-occupant direction, the gas discharge limitation member opening the vent by at least a large amount and discharging the gas from the airbag through the vent, the gas discharge limitation member comprising:

at least one invertible portion provided in a surface on a side opposite to the occupant-facing surface of the airbag or a side surface of the airbag when the airbag is expanded and capable of being everted toward the outside of the airbag;

an interlocking member for interlocking a moving operation of the occupant-facing surface in an occupant direction and an opposite-to-occupant direction and for interlocking a moving operation of the invertible portion inwardly of the airbag and outwardly of the airbag when the airbag is expanded; and a lid member covering the vent and capable of being pulled by the invertible portion when the invertible portion is everted towards the outside of the airbag, wherein the lid member is constructed to close the vent or open the vent by a small amount until the lid member is pulled by the invertible portion and is constructed to open the vent by at least a large amount by pulling the lid member with the invertible portion, wherein the interlocking member comprises a tether for connecting the occupant-facing surface and a tip end side in the everting direction of the invertible portion, and wherein the lid member is integrally constructed with the tether.

5. The airbag according to claim 4, wherein the lid member comprises a halfway portion of the tether in a longitudinal direction that is overlapped with the vent.

6. The airbag according to claim 3, wherein the lid member is coupled with a halfway portion of the tether in the longitudinal direction.

7. The airbag according to claim 3, wherein the lid member is coupled with a tip end side of the invertible portion via a coupling portion.

8. An airbag, comprising:

an open-and-close type vent; and a gas discharge limitation member configured to limit a gas discharged from the vent, the airbag being constructed in such a way that when the airbag is expanded the gas discharge limitation member closes the vent or opens the vent by a small amount when an occupant is not in contact with an occupant-facing surface of the airbag and when the occupant is brought into contact with the occupant-facing surface of the expanded airbag, thereby the occupant-facing surface retreats in an opposite-to-occupant direction, the gas discharge limitation member opening the vent by at least a large amount and discharging the gas from the airbag through the vent, the gas discharge limitation member comprising:

at least one invertible portion provided in a surface on a side opposite to the occupant-facing surface of the airbag or a side surface of the airbag when the airbag is expanded and capable of being everted toward the outside of the airbag;

an interlocking member for interlocking a moving operation of the occupant-facing surface in an occupant direction and an opposite-to-occupant direction and for interlocking a moving operation of the invertible portion inwardly of the airbag and outwardly of the airbag when the airbag is expanded; and a lid member covering the vent and capable of being pulled by the invertible portion when the invertible portion is everted towards the outside of the airbag, wherein the lid member is constructed to close the vent or open the vent by a small amount until the lid member is pulled by the invertible portion and is constructed to open the vent by at least a large amount by pulling the lid member with the invertible portion, and wherein an opening on a rear end side of the lid member in the moving direction overlaps the vent when the lid member is pulled by the invertible portion.

9. The airbag according to claim 8, wherein there are a plurality of openings that displace respective positions in the moving direction of the lid member.

10. The airbag according to claim 1, wherein the lid member is combined with the airbag to releasably cover the vent, the combination being released when the lid member is pulled by the invertible portion with at least a predetermined tension force.

11. An airbag apparatus, comprising:
the airbag according to claim 4; and
an inflator for expanding the airbag.

* * * * *